US012283733B2

(12) United States Patent
Draghia

(10) Patent No.: US 12,283,733 B2
(45) Date of Patent: Apr. 22, 2025

(54) MULTI-TAP TRANSMISSION LINE SYSTEM AND METHODS THEREOF

(71) Applicant: Radio Wires Inc., Ottawa (CA)

(72) Inventor: Marius Draghia, Ottawa (CA)

(73) Assignee: Radio Wires Inc., Ottawa (CA)

( * ) Notice: Subject to any disclaimer, the term of this patent is extended or adjusted under 35 U.S.C. 154(b) by 0 days.

(21) Appl. No.: 18/678,562

(22) Filed: May 30, 2024

(65) Prior Publication Data

US 2024/0356188 A1 Oct. 24, 2024

Related U.S. Application Data

(63) Continuation of application No. PCT/CA2024/005043, filed on Apr. 3, 2024.

(60) Provisional application No. 63/458,967, filed on Apr. 13, 2023.

(51) Int. Cl.

| | |
|---|---|
| ***H01P 1/04*** | (2006.01) |
| ***H01P 1/12*** | (2006.01) |
| ***H01P 5/19*** | (2006.01) |

(52) U.S. Cl.

CPC .............. *H01P 1/047* (2013.01); *H01P 1/127* (2013.01); *H01P 5/19* (2013.01)

(58) Field of Classification Search

CPC ............. H01P 1/047; H01P 1/127; H01P 5/19

See application file for complete search history.

(56) References Cited

U.S. PATENT DOCUMENTS

| | | | | |
|---|---|---|---|---|
| 3,660,675 | A | 5/1972 | Andrews, Jr. | |
| 4,271,503 | A * | 6/1981 | Eumurian | H03G 3/005 455/249.1 |
| 5,282,072 | A * | 1/1994 | Nazarathy | H04B 10/58 327/100 |
| 5,963,110 | A * | 10/1999 | Ihara | H04L 25/03878 333/167 |
| 6,181,922 | B1 * | 1/2001 | Iwai | H03H 11/245 455/249.1 |

(Continued)

OTHER PUBLICATIONS

International Search Report and Written Opinion mailed Jun. 7, 2024 in related International Patent Application No. PCT/CA2024/050431, 13 pages.

(Continued)

*Primary Examiner* — Jinsong Hu
*Assistant Examiner* — Rui M Hu

(57) ABSTRACT

Various embodiments are described herein for a multi-tap transmission line. The multi-tap transmission line can comprises: a first end and at least one second end; the transmission line having a corresponding characteristic impedance value (Zc); the first end with a corresponding first end impedance, the first end impedance being same as the characteristic impedance; the at least one second end with a corresponding at least one second end impedance, the corresponding at least one second end impedance being same as the characteristic impedance; at least two tap circuits connected to the transmission line, wherein each tap circuit comprises a tap port and wherein each tap port has a corresponding tap impedance value (Zo). The characteristic impedance value Zc is lower, and in some cases substantially lower, than each tap impedance value Zo.

26 Claims, 39 Drawing Sheets

(56) References Cited

U.S. PATENT DOCUMENTS 6,281,765 B1 * 8/2001 Hakki .................. H03H 11/265 333/140
6,838,832 B1 * 1/2005 Howald ........... H01J 37/32082 315/111.21
8,131,485 B2 * 3/2012 Balcerek .............. G01R 31/086 702/59
8,848,722 B2 9/2014 Chapel et al.
9,118,511 B1 * 8/2015 Ransijn .................. H04B 3/145
9,306,530 B2 * 4/2016 Alkan .................. H03H 7/1758
9,608,683 B2 3/2017 Kawasaki
11,171,623 B2 11/2021 Chayat et al.
11,201,381 B1 * 12/2021 Mruk ................. H01Q 21/0006
11,251,512 B2 2/2022 Dogiamis et al.
11,329,407 B2 5/2022 Krapp et al.
11,575,749 B2 2/2023 Dogiamis et al.
2003/0102939 A1 * 6/2003 Humann ........... H04L 25/03878 333/167
2003/0210067 A1 * 11/2003 Miller ................ G01R 1/07378 324/754.07
2004/0113727 A1 * 6/2004 Kawai ..................... H01P 1/127 335/78
2004/0119553 A1 * 6/2004 Nishimura ........... H05K 1/0246 333/22 R
2007/0040025 A1 * 2/2007 Goel .................. G06K 19/0723 235/383
2008/0136554 A1 6/2008 He et al.
2008/0144546 A1 6/2008 Binder et al.
2011/0095927 A1 * 4/2011 Pagnanelli ............ H03M 3/468 341/166
2012/0143394 A1 * 6/2012 Tollkuehn ................ H04Q 9/00 701/1
2012/0250739 A1 * 10/2012 Nagaki ................... H04J 3/085 375/219
2014/0211834 A1 * 7/2014 Park .................... H04L 25/0298 375/219
2014/0239994 A1 * 8/2014 Alves Moreira ...... G01R 1/067 324/754.03
2018/0302058 A1 10/2018 Hershberg et al.
2018/0316375 A1 11/2018 Kamgaing et al.
2019/0089036 A1 3/2019 Kamgaing et al.
2019/0228896 A1 7/2019 Lacey et al.
2020/0076034 A1 * 3/2020 Abdo ....................... H03H 7/24
2020/0127631 A1 * 4/2020 Chayat ................... H03H 7/004
2020/0161737 A1 * 5/2020 Kawamura ............... H01P 5/19
2021/0143633 A1 5/2021 Naidu et al.
2021/0350237 A1 11/2021 Litichever et al.
2022/0070997 A1 * 3/2022 Clark ........................ H01P 3/08
2023/0259123 A1 * 8/2023 Suehiro .................. G08C 17/02
2024/0072769 A1 * 2/2024 Mantha .................... H03H 7/48
2024/0094791 A1 * 3/2024 Yu .......................... G05D 1/249
2024/0267263 A1 * 8/2024 Chen ................... H04L 25/0272

OTHER PUBLICATIONS

MachX03 Family Data Sheet. Datasheet [online]. Lattice Semiconductor, Jul. 2021 (Jul. 2021). Retrieved from <https://mm.digikey.com/Volume0/opasdata/d220001/medias/docus/925/MachX03 Family DataSheet.pdf>, 96 pages.

* cited by examiner

MULTI-TAP TRANSMISSION LINE SYSTEM AND METHODS THEREOF

CROSS-REFERENCE TO RELATED APPLICATION

This application is a continuation of PCT Application No. PCT/CA2024/050431 filed Apr. 3, 2024, which claims priority from the U.S. Provisional Patent Application No. 63/458,967 filed Apr. 13, 2023, and the entire contents of the PCT Application No. PCT/CA2024/050431 and U.S. Provisional Patent Application No. 63/458,967 are hereby incorporated herein in their entirety.

FIELD

The various embodiments described herein generally relate to waveguides connected in networks for wireless terminals and methods thereof.

BACKGROUND

FIG. 1A is a diagram showing a plurality of devices, or nodes, communicating to each other wirelessly, using a conventional method known in prior art. A plurality of devices, such as high throughput Wi-Fi transceivers 101, are communicating to each other over wireless networks 102. However, communication over a wireless network 102 can pose a number of constraints and impairing factors. Some of the constraints and impairing factors can include, propagation variability, spectrum availability, interferences, and potential attacks from cyber threats.

On the other hand, high throughput peripheral component interconnect express (PCIe) or other baseband serial communication, such as, ethernet local area networks, while more robust, and immune to the constraints and impairing factors seen in wireless networks, can work only in point-to-point communications, requiring data switches and massive wiring leading to significant issues related to design, manufacturing and installation cost interconnect.

Accordingly, an improved solution is required that can address the shortcomings of wireless networks such as Wi-Fi, and baseband data switched networks such as PCIe, while retaining the benefits of such technologies, especially for high node density networks.

SUMMARY OF VARIOUS EMBODIMENTS

In at least one aspect, a multi-tap transmission line is provided. In at least one embodiment, the multi-tap transmission line comprises: a first end and at least one second end; the transmission line having a corresponding characteristic impedance value (Zc); the first end with a corresponding first end impedance, the first end impedance being same as the characteristic impedance; the at least one second end with a corresponding at least one second end impedance, the corresponding at least one second end impedance being same as the characteristic impedance; at least two tap circuits connected to the transmission line; wherein each tap circuit comprises a tap port, wherein each tap port has a corresponding tap impedance value (Zo); and wherein the characteristic impedance value Zc is lower than each tap impedance value Zo.

In at least one embodiment, the multi-tap transmission line further comprises, for each tap circuit: a first resistive element corresponding to a first port of the tap circuit, and having a corresponding first resistance value; and a second resistive element corresponding to a second port of the tap circuit, and having a second resistance value, the first and the second resistive values being substantially equal to a series resistance value (Rs); a corresponding tap device connected to the corresponding tap port; and a tap resistive element corresponding to the tap port, the tap resistive element having a tap resistance value (Rt); wherein the first resistance element, the second resistive element and the tap resistive element are connected at a connection point in a T-configuration.

In at least one embodiment, the tap devices are selected from the group consisting of an output RF transmitter, an input RF receiver, a combined input and output RF transceiver, an RC transceiver, a plurality of RF transceivers, a test port of a vector network analyzer VNA, a test port of a time domain reflectometry TDR analyzer, a tap of another multi-tap transmission line, any RF device, and a termination.

In at least one embodiment, the first end impedance and second end impedance remain matched to the transmission line as the tap devices are connected to the multi-tap transmission line.

In at least one embodiment, the transmission line comprises a splitter configuration, and the at least one second end comprises two second ends. In at least one embodiment, the multi-tap transmission line is implemented as a rigid printed circuited board. In at least one embodiment, the multi-tap transmission line is implemented as a discrete flexible printed circuits board. In at least one embodiment, the multi-tap transmission line is constructed as a flexible printed circuit board having a self-adhesive tape. In at least one embodiment, the multi-tap transmission line is constructed in a branched configuration.

In at least one embodiment, the multi-tap transmission line is operated with at least one of a tap device being disconnected, shorted, or damaged. In such embodiments, the multi-tap transmission line operates with the remaining tap devices.

In at least one embodiment, the first and second resistive elements have a corresponding series resistance value of approximately 0 ohms.

In at least one aspect, a method of optimizing the multi-tap transmission line is provided. In at least one embodiment, method comprises: for each corresponding tap impedance value (Zo), and for a total number of tap ports in the transmission line: determining an optimal characteristic impedance value (Zc); based on the optimal characteristic impedance value (Zc), determining the series resistance value (Rs) and the tap resistance value (Rt) value such that a loss between a first tap circuit and a last tap circuit is minimized.

In at least one embodiment, determining the optimal characteristic impedance value (Zc) comprises: selecting a candidate impedance value, the candidate impedance value being selected from a range of values between 0 and an end impedance value; for each candidate impedance value: determining a worst-case insertion loss between the first tap circuit and the last tap circuit based on the candidate impedance value and a tap impedance value corresponding to a tap port, the worst-case insertion loss being determined based on determining a longitudinal insertion loss and a transverse insertion loss according to:

$$TTLN\ [dB]=TIL(1)+LIL(2)+LIL(3)+\ldots+LIL(j)+\ldots LIL(N-1)+TIL(N);$$

wherein LIL is a longitudinal insertion loss value determined according to:

$$LIL\ (j)=20\ LOG\ 10(1\text{-}Zc/2Zo(j)),$$

where j is a range of values indicative of tap index, ranging from 2 to (N−1),

N representing the total number of tap ports; wherein TIL is a transverse insertion loss value determined according to: TIL (j)=10 LOG 10(Zc/4Zo(j)), wherein j is 1 or N,—determining the optimal characteristic impedance value (Zc) based on the candidate impedance value which minimizes the worst-case insertion loss.

In at least one embodiment, the series resistance value (Rs) is determined according to:

$$R_S(j) = \frac{Z_c^2}{4Z_O(j) - Z_C};$$

wherein Zo(j) is a tap impedance value of a tap port j; j is a range of values indicative of tap index, ranging from 1 to N, N representing the total number of tap ports; and Zc is the optimal characteristic impedance value.

In at least one embodiment, the tap resistance value (Rt) is determined according to:

$$R_t(j) = \frac{4(Z_{O(j)})^2 - 3Z_C Z_{O(j)}}{4Z_O(j) - Z_C};$$

wherein Zo(j) is a tap impedance value of a tap port j; j is a range of values indicative of tap index, ranging from 1 to N, N representing the total number of tap ports; and Zc is the optimal characteristic impedance value.

In at least one embodiment, the method further comprises choosing an alternative characteristic impedance value (Zc) from a range between −30% to +30% of the optimal characteristic impedance value.

In at least one embodiment, determining the optimal characteristic impedance value (Zc) is done by graphical analysis by plotting, as a function of candidate impedance value, a loss function according to:

TTLN(Zc)=TIL(1)+LIL(2)+LIL(3)+ . . . +LIL(j)+ . . . LIL(N−1)+TIL(N); and selecting the optimal characteristic impedance value based on the candidate impedance value corresponding to a minimum value of the loss function.

In at least one aspect, a multi-tap transmission line for use in an automotive vehicle is provided.

In at least one embodiment, the multi-tap transmission line comprises: a first end and at least one second end; the transmission line having a corresponding characteristic impedance value (Zc); the first end with a corresponding first end impedance, the first end impedance being same as the characteristic impedance; the at least one second end with a corresponding at least one second end impedance, the corresponding at least one second end impedance being same as the characteristic impedance; at least two tap circuits connected to the transmission line; wherein each tap circuit comprises a tap port, wherein each tap port has a corresponding tap impedance value (Zo); and wherein the characteristic impedance value Zc is lower than each tap impedance value Zo. In at least one embodiment, the multi-tap transmission line further comprises, for each tap circuit: a first resistive element corresponding to a first port of the tap circuit, and having a corresponding first resistance value; and a second resistive element corresponding to a second port of the tap circuit, and having a second resistance value, the first and the second resistive values being substantially equal to a series resistance value (Rs); a corresponding tap device connected to the corresponding tap port; and a tap resistive element corresponding to the tap port, the tap resistive element having a tap resistance value (Rt); wherein the first resistance element, the second resistive element and the tap resistive element are connected at a connection point in a T-configuration.

In at least one embodiment, the multi-tap transmission line further comprises at least 24 tap devices. In at least one embodiment, the tap devices are selected from the group consisting of: vehicle sensors, an Engine Control Unit (ECU), a gateway, and an AI node. In at least one embodiment, the multi-tap transmission line is constructed as a flex printed circuit board having a self-adhesive tape. In at least one embodiment, the multi-tap transmission line further comprises a secondary multi-tap transmission line to provide redundancy. In at least one embodiment, the tap device switches from the multi-tap transmission line to the secondary multi-tap transmission line.

In at least one aspect, a multi-tap transmission line for use in a remotely operated vehicle (ROV) is provided. In at least one embodiment, the tap devices are selected from the group consisting of: ROV sensors, an ROV Engine Control Unit (ECU), am ROV gateway, and an ROV AI node. In at least one embodiment, the multi-tap transmission line is constructed in a branched configuration. In at least one embodiment, the multi-tap transmission line comprises a resistive power splitter to branch the multi-tap transmission line into a plurality of lines.

In at least one aspect, a multi-tap transmission line for use in a server rack is provided. In at least one embodiment, the tap devices are servers.

In at least one aspect, a multi-tap transmission line for use with a plurality of processor chips in an inter-chip configuration is provided. In at least one embodiment, the multi-tap transmission line is external to the plurality of processor chips and coupled to nodes within the plurality of processor chips. In at least one aspect, the multi-tap transmission line is implemented as a rigid printed circuited board. In at least one aspect, the multi-tap transmission line is implemented as a discrete flexible printed circuits board. In at least one aspect, the multi-tap transmission line is implemented in at least one of: chip silicon substrates, chiplets and interposers.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

DETAILED DESCRIPTION OF THE EMBODIMENTS

Figure 1B:
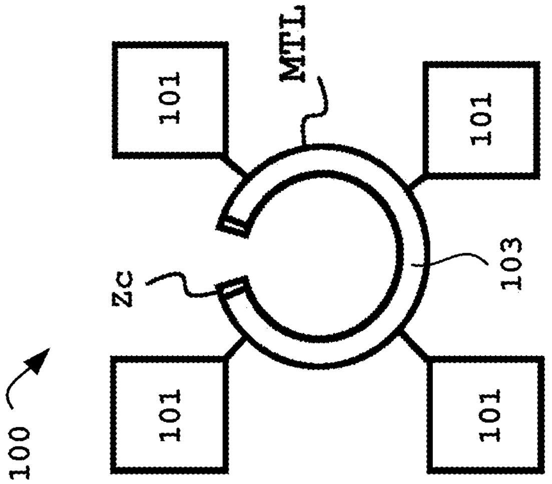
FIG. 1B is a diagram showing a plurality of devices communicating to each other using a multi-tap transmission line, according to an embodiment.
Figure 1A:
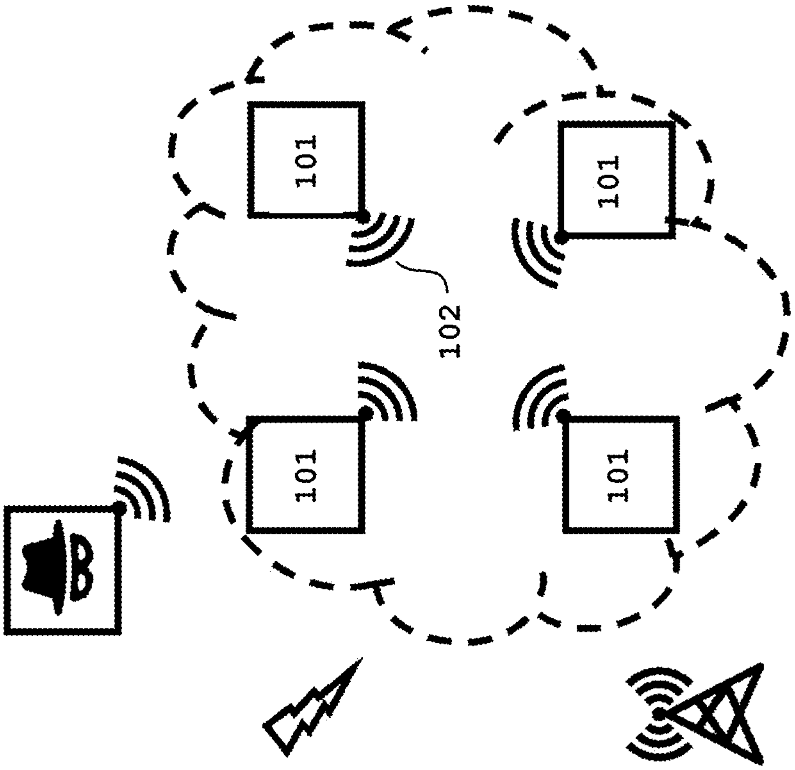
PRIOR ART FIG.1A
FIG. 1A is a diagram showing a plurality of devices communicating to each other wirelessly, using a conventional method known in prior art.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

It should also be noted that the terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, an electrical signal, a light signal or a mechanical element depending on the particular context.

It should also be noted that, as used herein, the wording "and/or" is intended to represent an inclusive-or. That is, "X and/or Y" is intended to mean X or Y or both X and Y, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by end-points herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

Similarly, throughout this specification and the appended claims the term "communicative" as in "communicative pathway", "communicative coupling", and in variants such as "communicatively coupled" is generally used to refer to any engineered arrangement for transferring and/or exchanging information. Examples of communicative pathways include, but are not limited to, electrically conductive pathways (e.g., electrically conductive wires, physiological signal conduction), electromagnetically radiative pathways (e.g., radio waves, optical signals, etc.), or any combination thereof. Examples of communicative couplings include, but are not limited to, electrical couplings, magnetic couplings, radio couplings, optical couplings or any combination thereof.

A portion of the example embodiments of the systems, devices, or methods described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including volatile and/or non-volatile memory). These devices may also have at least one input device (e.g., a keyboard, a mouse, a touchscreen, an input pin, an input port and the like for providing at least one input such as an input signal, for example) and at least one output device (e.g., a display screen, a printer, a wireless radio, an output port, an output pin and the like for providing at least one output such as an output signal, for example) depending on the nature of the device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media or a device that is readable by a general or special purpose programmable device. The software program code, when read by the programmable device, which may also be referred to as a computing device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, memory chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Any module, unit, component, server, computer, terminal or computing device described herein that executes software instructions in accordance with the teachings herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto.

It should be noted that the term "coupled" used herein indicates that two elements can be directly coupled to one another or coupled to one another through one or more intermediate elements.

The following terminologies and semantic clarifications are provided in the context of the various embodiments disclosed herein:

(1) the terms wireless and radiofrequency (RF) are used interchangeably, (2) a RF transceiver is the front end of a RF terminal, (3) a terminal is short for data terminal, (4) a tap device is what is connected to a tap port; an RF terminal is a subclass of tap device, (5) Wi-Fi is a representative technology for the wireless class supporting multipoint connectivity, (6) PCIe (PCI Express) is a representative technology for the wired point to point connectivity, (7) MTL is an acronym for Multi-tap Transmission Line, (8) PMTL is an acronym for Planar Multi-tap Transmission Line, (9) bPMTL is an acronym a backplane Planar Multi-tap Transmission Line,

(10) CMTL is an acronym for Coaxial Multi-tap Transmission Line,

(11) in the schematic diagrams, the strings in square brackets such as [Rs] or [Zc] denote the value of the parameter for that specific circuit element,

(12) LAN is an acronym used for Local Area Network,

(13) TRX is an acronym for transceiver,

(14) AI is an acronym for Artificial Intelligence.

Currently, methods of communicatively connecting a first device to another device in systems with a plurality of such devices can be achieved using wireless or wired networking technology such as Wi-Fi links, PCIe links, and the like. Wireless links such as Wi-Fi links offer the ability to connect a high number of devices or nodes in multi-point networks, but can be limited by certain disadvantages, such as, propagation variability, spectrum availability, interferences, and potential attacks from cyber threats. On the other hand, wired baseband communication systems such as PCIe or Ethernet links provide high throughput but their connectivity is constrained by their point-to-point physical links, requiring data switches and excessive wiring.

In one experiment, the performances of the PCIe and Wi-Fi data links were compared. For the experiment, the same medium of 8 GHz was used for both data links. The frequency constraint of 8 Ghz is defined by the performance of the printed circuit cards and connectors currently available for PCIe transmission at 16 Gbps. It is noted that 8 GHz is the Nyquist frequency for a 16 Gbps NRZ (Non-Return to Zero) signal, reflecting the frequency of a sinewave required to transmit a binary sequence (10101 . . . ) at the maximum data rate of 16 Gbps. Furthermore, the 8 GHz constraint aligns with the maximum frequency of 7.125 GHz as used by a WiFi-7 transceiver. For the experiment, a point-to-point transmission line with 8 GHz bandwidth, equipped at both ends with Wi-Fi or PCIe transceivers, is constructed. For the purpose of the experiment, the line impedance and modes were ignored.

Using this 8 GHz transmission line, the PCIe is found to transmit (1) 16 GBps with normal PCIe transceivers or (2) 32 Gbps with PCIe transceivers modified to use PAM4 modulation, a technique introduced for PCIe-6.

Over the same transmission line, WiFi-7 is found to transmit (1) 46 Gbps using one normal transceiver at each endpoint over one channel of 320 MHz, (2) 138 Gbps using three combined normal transceivers at each endpoint to use all 3×320 MHz channels available in WiFi-7, or (3) 1150 Gbps using 25 combined modified transceivers at each endpoint to use 25×320 MHz channels, wherein these transceivers are modified to use the entire spectrum of 8 GHz, as they are no longer limited by the spectral constraints imposed while operated in true wireless mode.

Based on the experiment, it can be concluded that Wi-Fi technology provides a better usage of the transmission line, offering a competitive alternative to PCIe.

In order to balance the benefits and disadvantages of the Wi-Fi and the PCIe technologies, a multi-tap transmission line is proposed and disclosed in various embodiments herein. The multi-tap transmission line replaces air as the propagation medium for wireless terminals, thereby blocking out the constraints and impairing factors prevalent in wireless communications, such as propagation variability, spectrum availability, interferences, or potential attacks. Further, the multi-tap transmission line brings in the reliability of wired links. Accordingly, the multi-tap transmission line disclosed herein provides the advantage of multi-point connectivity of wireless transceivers.

A multi-tap transmission line having the ability to communicatively couple a plurality of devices is provided herein, as shown in FIG. 1B. The multi-tap transmission line 100 provides a propagation medium 103 which can reduce the constraints and impairing factors prevalent in wireless communications, while introducing the flexibility of multi-point connectivity, as with wireless transceivers, and reliability of wired links. The multi-tap transmission line can provide a broadband RF transmission line using waveguides and taps to connect a plurality of radiofrequency terminal devices and create data networks over which the terminal devices can communicate. In at least one embodiment, an optimized broadband RF multi-tap transmission line is provided, wherein the transmission line can be coupled to a plurality of RF terminals to create data networks. The transmission line can be constructed as a terminated concatenation of tap circuits including resistive elements and transmission lines.

Methods of optimizing a multi-tap transmission line are also provided herein. In at least one embodiment, the method of optimizing a multi-tap transmission line is used to determine a characteristic impedance of the multi-tap transmission line and values of the resistive elements of the tap circuits. The optimization method for the impedance and resistive elements of said transmission line can be based upon the impedance of tap devices and the number of taps of the line.

Various configurations of the multi-tap transmission line are also provided herein. In at least one embodiment, the multi-tap transmission line is implemented in a planar configuration using stripline or microstrip waveguides. The multi-tap transmission line in planar configuration using stripline or microstrip waveguides can be constructed on printed circuit boards or other planar substrates. Furthermore, the unibody embodiment can also be realized in rigid-flex PCB technologies.

In at least one embodiment, the multi-tap transmission line is implemented in a backplane arrangement of a plurality of planar multi-tap transmission lines. In one example, the plurality of multi-tap transmission lines in a backplane arrangement reuse or repurpose PCIe connectors, backplanes, and plugin cards, as described herein in accordance with at least one embodiment.

In another embodiment, the multi-tap transmission line is implemented in a coaxial configuration using coaxial waveguides realized with coaxial standoffs and coaxial structures in printed circuit boards. In some cases, this multi-body implementation can provide an easy to reconfigure construction useful in stackable computers.

Various use-cases of the multi-tap transmission line are also provided herein. In at least one embodiment, the multi-tap transmission line is implemented in an automotive vehicle. In another embodiment, the multi-tap transmission line is implemented in a remotely operated vehicle (ROV). In further embodiments, the multi-tap transmission line is implemented in a server rack. In yet another embodiment, the multi-tap transmission line is implemented in a processor chip.

The Multi-Tap Transmission Line (MTL)

Figure 2:
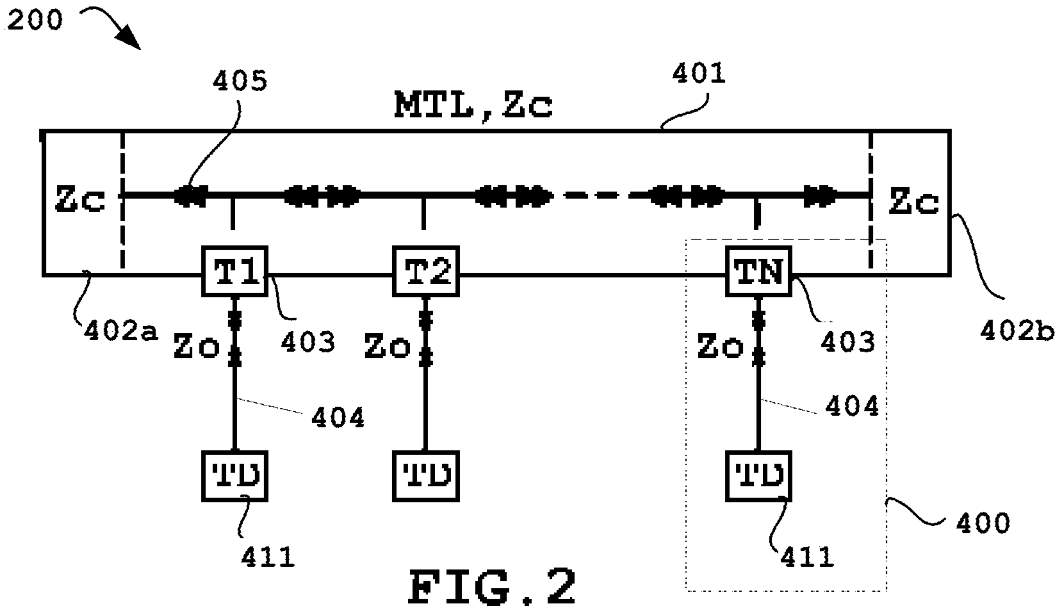
FIG. 2 is a block diagram of an embodiment of a multi-tap transmission line.

Reference is now made to FIG. 2, to illustrate a high-level block diagram of a multi-tap transmission line 200 according to an embodiment. In the illustrated embodiment, the multi-tap transmission line 200 is terminated at both ends with termination points 402. As shown, the transmission line 200 is terminated at a first end 402*a* and a second end 402*b*. As shown below, the transmission line can branch into multiple termination points, and accordingly have multiple second ends.

In the illustrated embodiment, the transmission line has corresponding characteristic impedance of value Zc. Both ends of the transmission line 402*a*, 402*b* have a respective first end impedance and a second end impedance. In an optimized transmission line 200, the first end impedance and the second end impedance have the same value as the transmission line characteristic impedance value Zc. This provides the advantage of mitigating or eliminating signal reflections of signal 405 back into the transmission line.

The transmission line 200 serves as a communication medium between a plurality of tap devices (TD) 411, which are connected to multi-tap transmission line through a plurality of tap ports (T) 403, indexed 1 through N. A tap circuit, comprising a tap port 403 and a tap device 411, is shown as reference 400. Each tap port 403 is characterized by a tap impedance value of Zo.

In the various embodiments disclosed herein, the characteristic impedance value Zc is lower than, and in some cases, substantially lower than, each tap impedance value Zo.

In an optimized transmission line, the first end impedance and second end impedance remain matched to the transmission line as the tap devices 411 are connected to the multi-tap transmission line 200. The matching of the first and second end impedance value to the impedance value of the transmission line eliminates wave reflections at the end points of the line.

The tap devices 411 may come in the form of a RF transmitter output, a RF receiver input, combined input and output of a RF transceiver, combined streams of one or multiple RF transceivers, a test port of a vector network analyzer (VNA), a test port of a time domain reflectometry (TDR) analyzer, a termination point, a tap of another multi-tap transmission line, and/or or any RF device.

Figure 3:
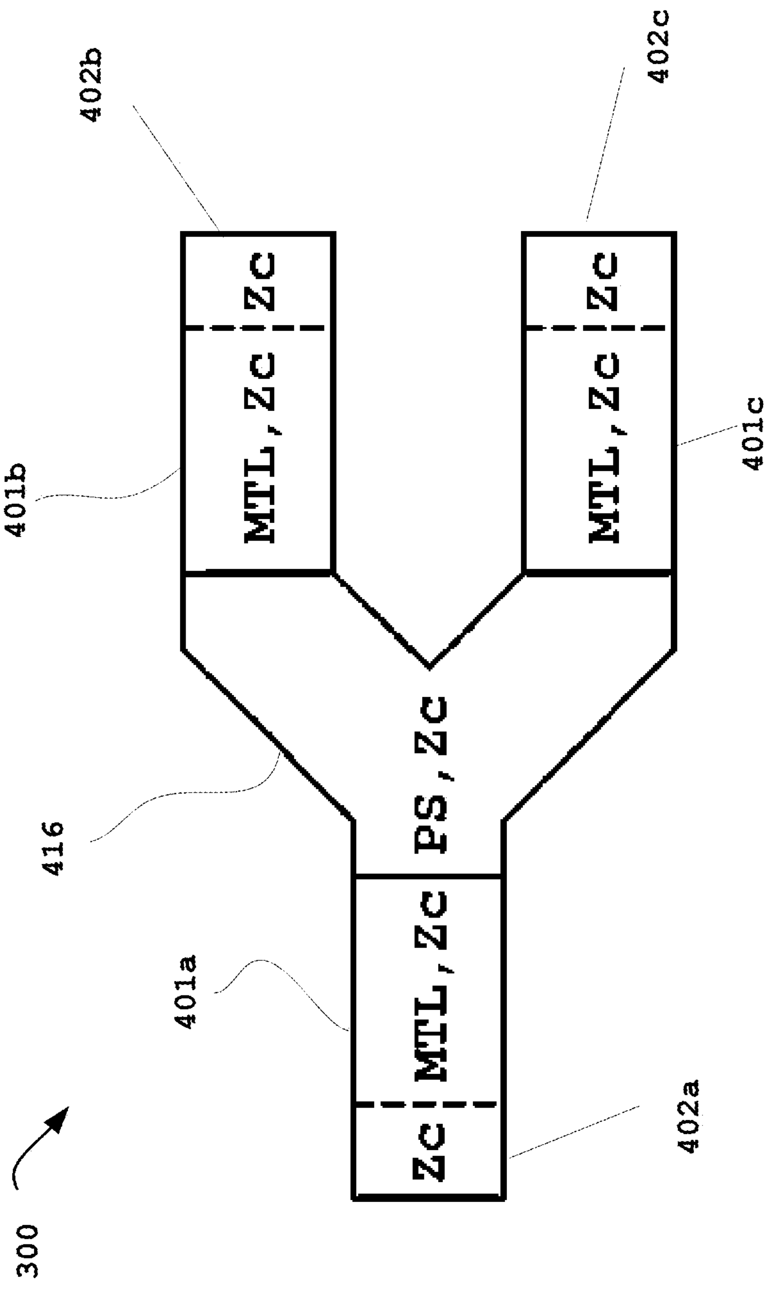
FIG. 3 is a block diagram of an embodiment of a branched multi-tap transmission line.

FIG. 3 shows a block diagram of a branched multi-tap transmission line 300 according to another embodiment of the disclosure. In this embodiment, a power splitter 416 (PS) of same characteristic impedance Zc as the multi-tap transmission line is used to construct various networks topologies. In the embodiment, shown in FIG. 3, there are two termination points for the second end, such as a first second end 402*b* and another second end 402*c*. The power splitter configuration can include any number of splits 416 in the transmission line, such as 2, 3, 4, 5, 6 . . . N, N being any positive integer.

In another embodiment, the multi-tap transmission line can have multiple first ends 402*a*. Similarly, in a further embodiment, the multi-tap transmission line can be multiply branched, where a first line 401*a* is branched into a plurality of lines 401*b* and 401*c*, and at least one of the plurality of lines 401*b* and/or 401*c* is further branched into a plurality of ends.

While a 3-port power splitter 416 is shown in FIG. 3, it is understood that any N-point power splitter can be used to enable N branches of the transmission line. Any such embodiment of a transmission line may be limited in performance by regular power loss at each splitter.

In some cases, the multi-tap transmission line can be implemented as a rigid printed circuited board. In some other cases, the multi-tap transmission line can be implemented as a discrete flexible printed circuit board. The multi-tap transmission line can also be implemented as a flexible printed circuit board having a self-adhesive tape.

Figure 55:
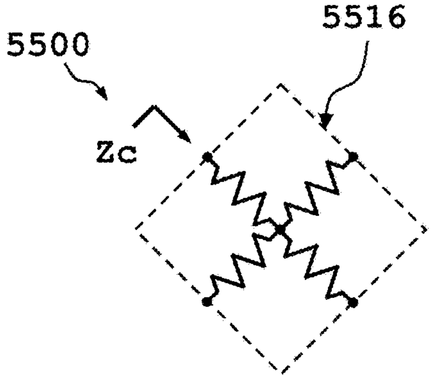
FIG. 55 is a schematic diagram of a power splitter used in a branched configuration of a multi-tap transmission line.

Similarly, the multi-tap transmission line can be implemented as a branched configuration, as shown, for example, in FIGS. 3 and 55. In FIG. 3, an embodiment of the branched configuration is shown with a 3-port power splitter in the middle. In FIG. 55, an embodiment of the branched configuration is shown with a 4-port power splitter.

In one embodiment, the transmission line is shielded, such that the transmission "hot" line is sandwiched between two ground planes. The shielded configuration can be equivalent to the stripline configuration described herein.

For greater clarity, the stripline embodiment refers to a shielded, transmission line sandwiched between two ground/shield layers. The microstrip embodiment refers to an unshielded line where the transmission line sits above a ground layer, and is exposed above, having a substrate configuration. In one embodiment, the entire substrate can be shielded, with some cautions, to shield the MTL at an "outer" level.

Figure 4:
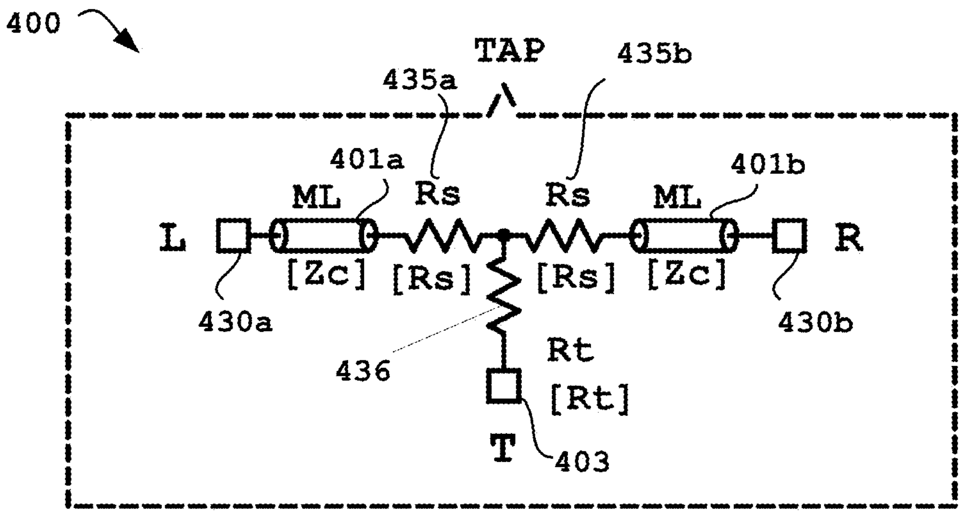
FIG. 4 is a schematic diagram of an embodiment of a tap of the multi-tap transmission line.

Reference is now made to FIG. 4, which illustrates a schematic diagram of a tap circuit 400 according to an example. As shown, the tap circuit 400 includes a left port (L) 430*a* and a right port (R) 430*b*. The left port 430*a* is coupled to a first transmission line 401*a*. The first transmission line 401*a* is coupled to a first resistive element (Rs)

435*a*, which is coupled to a second resistive element (Rs) 435*b*. The second resistive element 435*b* is coupled to a second transmission line 401*b*, which is coupled to the right port 430*b*. Connected to the common point between the first resistive element 435*a* and the second resistive element 435*b* is a tap resistive element (Rt) 436. The three resistive elements are connected in a T-configuration as shown. The first and the second resistive elements are also referred to herein as series resistive elements.

In the illustrated embodiment, each transmission line 401*a*, 401*b* has a characteristic impedance Zc. Each of the first resistive element 435*a* and the second resistive element 435*b* has the same resistance value or substantially same resistance value, Rs. The tap resistive element 436 has a resistance value, Rt. The tap resistive element 436 is coupled to the tap port 403.

Figure 5:
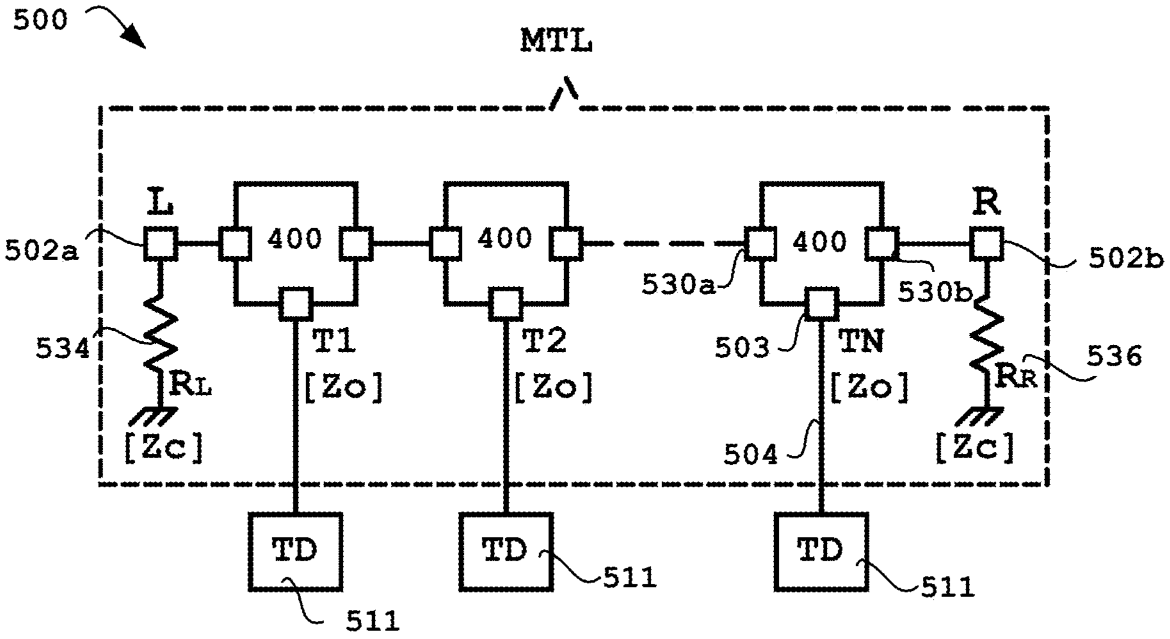
FIG. 5 is a schematic diagram of an embodiment of a multi-tap transmission line.

FIG. 5 provides a schematic diagram illustrating an embodiment of the multi-tap transmission line 500. Transmission line 500 comprises a first end 502*a*, shown as a left port L terminated with a resistive element (RL) 534 of resistance value Zc The transmission line 500 also has a second end 502*b*, shown as a right port R terminated with a resistive element (RR) 536 of resistance value Zc. N concatenated tap circuits 400, such as those illustrated in FIG. 4, are also shown. As shown, each tap circuit 400 is coupled to a respective external tap device 511 through a respective tap port 503. Tap port 503 is analogous to tap port 403 of FIG. 4. Left port (L) 530*a* is analogous to left port 430*a* of FIG. 4, and right port (R) 530*b* is analogous to the right port (R) 430*b* of FIG. 4.

As shown in FIG. 5, the tap devices 511 are connected to the multi-tap transmission line 500 at corresponding tap ports through a corresponding tap line 504. In one embodiment, if one of the tap devices 511 becomes disconnected, cut-off, shorted, or damaged, or otherwise is not connected to the multi-tap transmission line, the multi-tap transmission line still operates with the remaining tap devices 511. Similarly, in some other embodiments, if the tap line 504 is disconnected, cut-off, shorted, or damaged, the multi-tap transmission line continues to operate with the remaining tap devices 511 and tap lines 504.

Optimization Method

Methods of optimizing the multi-tap transmission line are provided herein. In at least one embodiment, the method of optimizing a multi-tap transmission line, such as the multi-tap transmission lines of FIGS. 4 and 5, is used to determine a characteristic impedance Zc of the multi-tap transmission line and the resistance values of the various resistive elements of the tap circuits 400. In such embodiment, the optimization method for the impedance and resistive elements of said transmission line is based upon the impedance values of the tap devices 511 (Zo) and the number of tap ports, N, connected to the multi-tap transmission line.

In at least one embodiment, the method of optimizing a multi-tap transmission line includes determining a tap impedance value (Zo) associated with each tap device, such as tap device 511. In one embodiment, the tap impedance value (Zo) is a given data value. The input data can be available from a tap device manufacturer or a system designer, and may be selected to optimize system performance. In various embodiments, a tap impedance value Zo is typically around 50 Ohms.

The method further includes determining a total number of tap ports coupled to the transmission line. Next, the method includes determining an optimal characteristic impedance value (Zc) for the multi-tap transmission line. Determining the optimal characteristic impedance comprises determining a characteristic impedance value Zc that causes the lowest insertion loss between the first and last tap devices. As discussed below, the Zc value is typically lower, and in some cases, substantially lower than the tap impedance value Zo.

Further, the method includes determining, based on the determined optimal characteristic impedance value (Zc), the series resistance value (Rs) and the tap resistance value (Rt) of the various resistive elements of the tap port, such as tap circuit 400 of FIG. 4. The characteristic impedance value (Zc) is determined such that a loss between the first tap circuit and the last tap circuit coupled to the transmission line is minimized.

In some embodiments, determining the optimal characteristic impedance value (Zc) includes selecting a candidate impedance value (Zc'), where the candidate impedance value is selected from a range of values between 0 and an end impedance value. The end impedance value is less than the tap impedance value (Zo) associated with the tap device. The method further includes, for each candidate impedance value, determining a worst-case insertion loss between the first tap circuit and the last tap circuit based on the candidate impedance value (Zc') and a tap impedance value (Zo) corresponding to a tap port. In some cases, the worst-case insertion loss is determined based on determining a longitudinal insertion loss and a transverse insertion loss according to the following equation. The optimal characteristic impedance value (Zc) based on the candidate impedance value (Zc') which minimizes the worst-case insertion loss.

$$TTLN\ [\mathrm{dB}] = TIL(1) + LIL(2) + LIL(3) + \ldots + LIL(j) + \ldots LIL(N-1) + TIL(N) \tag{1}$$

TTLN represents the worst-case insertion loss between the first tap circuit (1) and the last tap circuit (N).

In Eq. (1), LIL represents the longitudinal insertion loss value determined according to the following equation:

$$LIL\ (j) = 10\mathrm{LOG}10\left(\frac{PR}{PL}\right) = 20\mathrm{LOG}10\left(1 - Zc/2Zo(j)\right) \tag{2}$$

where j is a range of values indicative of tap index, ranging from 2 to (N−1), N representing the total number of tap ports, PR and PT represents the maximum power conditions at the left and the right ports, such as 502*a* and 502*b*, respectively.

In Eq. (1), TIL is a transverse insertion loss value determined according to:

$$TIL\ (j) = 10\mathrm{LOG}10\left(\frac{PT}{PR}\right) = 10\mathrm{LOG}10\left(Zc/4Zo(j)\right),\ \text{where } j \text{ is 1 or } N \tag{3}$$

where PT and PR represents the maximum power conditions on respective tap port and right port, such as, 503 and 502*b*, respectively.

In at least one embodiment, the series resistance value (Rs) corresponding to the first and second resistive tap in a tap circuit, such as resistive elements 435*a*, 435*b* is determined according to the following equation.

$$R_t(j) = \frac{4(Z_{O(j)})^2 - 3Z_C Z_{O(j)}}{4Z_O(j) - Z_C} \quad (5)$$

where Zo(j) is a tap impedance value of a tap port j; j is a range of values indicative of tap index, ranging from 1 to N, N representing the total number of tap ports; and Zc is the optimal characteristic impedance value.

In at least one embodiment, the tap resistance value (Rt) of the third resistive element, such as tap resistive element 436 of FIG. 4, is determined according to the following equation.

$$R_t(j) = \frac{4(Z_{O(j)})^2 - 3Z_C Z_{O(j)}}{4Z_O(j) - Z_C} \quad (5)$$

where Zo(j) is a tap impedance value of a tap port j; j is a range of values indicative of tap index, ranging from 1 to N, N representing the total number of tap ports; and Zc is the optimal characteristic impedance value.

As mentioned above, equations (4) and (5) are derived from maximized power transfer conditions on left port L, the right port R, and the tap port T.

In at least one embodiment, an alternative characteristic impedance value (Zc) is chosen from a range between −30% to +30% of the optimal characteristic impedance value. In some other cases, the alternative characteristic impedance value (Zc) is chosen from a range between approximately −30% to +30% of the optimal characteristic impedance value. Depending on the use-case for which the multi-tap transmission line, optimized according to the methods herein, is used, the characteristic impedance value selected for use can range approximately −35% to +35%, −40% to +40% or some other range about the optimal characteristic impedance value.

In at least one embodiment, the optimal characteristic impedance value (Zc) is determined by graphical analysis, such as, for example by plotting, as a function of candidate impedance value, a loss function according to equation (1). The optimal characteristic impedance value is based on the candidate impedance value corresponding to a minimum value of the loss function of equation (1).

In this embodiment, the first step of the method includes determining series resistance value (Rs) and tap resistance value (Rt) of a tap circuit, such as circuit 400 of FIG. 5, as function of Zc and Zo under maximized power transfer conditions on all ports. Referring to FIG. 5, the end ports 502*a* and 502*b* are terminated each into Zc, the port T is terminated into Zo, and, for simplification, the transmission line ML has zero length. In this embodiment, the series resistance value (Rs) is determined according to Eq. (6), which is a simplified version of Eq. (4); and the tap resistance value (Rt) is determined according to Eq. (7), which is a simplified version of Eq. (5).

$$R_S = \frac{(Z_c)^2}{4Z_O - Z_C} \quad (6)$$

$$R_t = \frac{4(Z_O)^2 - 3Z_C Z_O}{4Z_O - Z_C} \quad (7)$$

Figure 6:
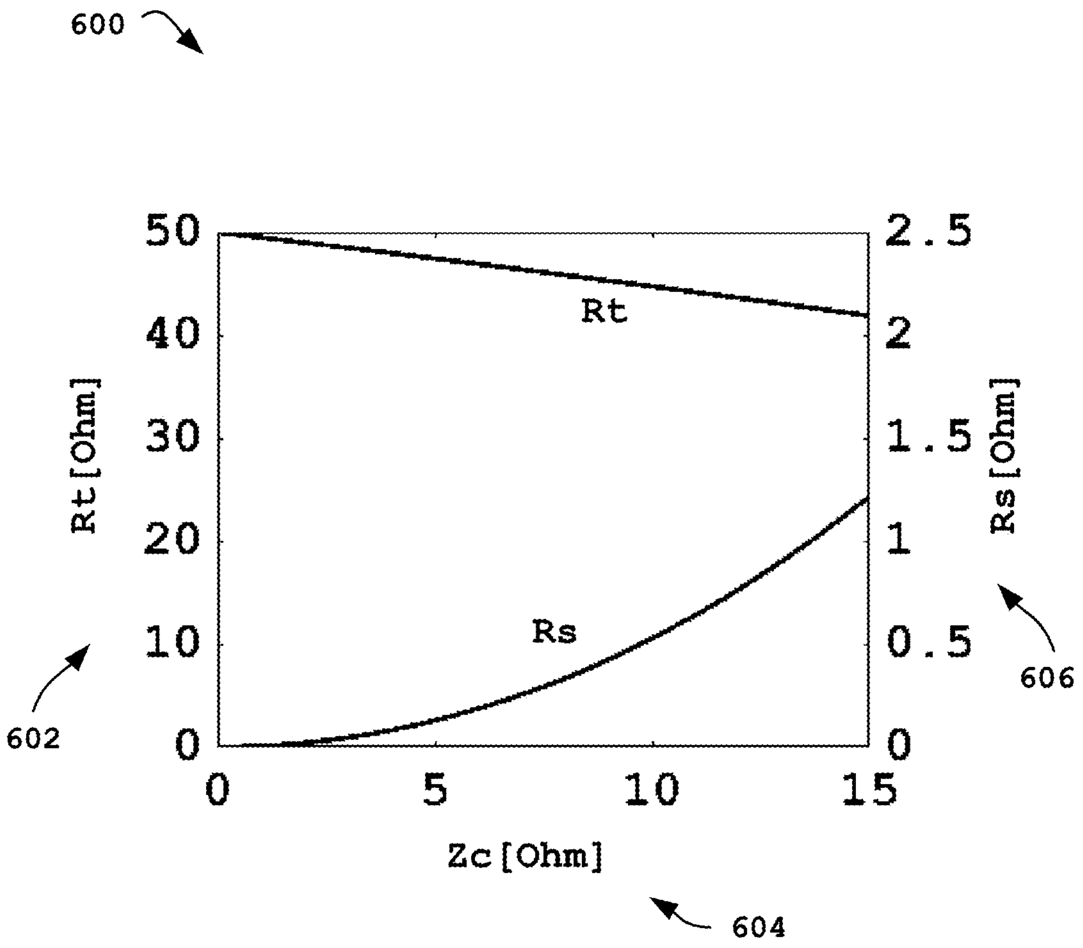
FIG. 6 is a plot showing the dependence of tap resistances (Rt) and series resistance (Rs) on the characteristic impedance (Zc) of the multi-tap transmission line.

Reference is next made to FIG. 6, to show a graphical analysis and determination of the optimal tap resistance values (Rt) and series resistance value (Rs) based on the characteristic impedance value (Zc) of the multi-tap transmission line. FIG. 6 illustrates a plot 600 showing the tap resistance values (Rt) 602 and series resistance value (Rs) 606 as a function of the characteristic impedance (Zc) 604. In this embodiment, the first step involves calculating values of Rt and Rs using equations (6) and (7), as an example. In this embodiment, a tap impedance of Zo=50 Ohms was used since 50 Ohms is the impedance value used by most RF transceivers, however any suitable tap impedance value Zo can be used. The resulting equations for Rs and Rt were then plotted as shown in plot 600, as a function of the characteristic impedance Zc.

Figure 7:
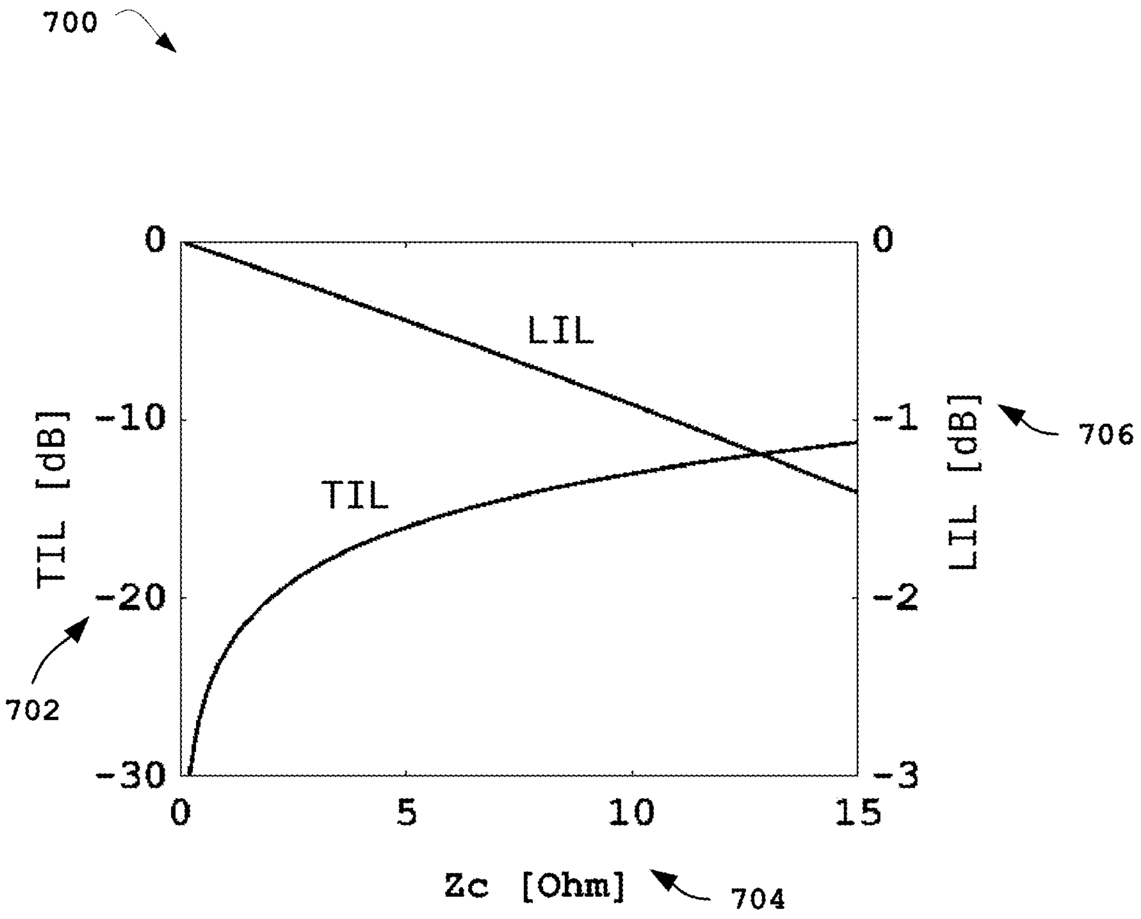
FIG. 7 is a plot showing the dependence of longitudinal insertion loss (LIL) and transverse insertion loss (TIL) on the characteristic impedance (Zc) of the multi-tap transmission line.

In the second step of the method, for same number of tap circuits and same conditions, a longitudinal insertion loss (LIL) is determined using equation (8) between a first terminal port 502*a* (L port) and last terminal port 502*b* (R port). A transversal insertion loss TIL can be determined using equation (9) between the tap port 503 (T port) and last terminal port 502*b* (R port) as functions of impedance Zc and Zo. Eqs. (8) and (9) are simplifications of equations (2) and (3), respectively. Any suitable tap impedance value Zo can be used, such as, but not limited to 25 Ohms, 50 Ohms, 75 Ohms, etc.

$$LIL\,[\text{dB}] = 20\text{LOG}10(1 - Zc/2Zo) \quad (8)$$

$$TIL\,[\text{dB}] = 10\text{LOG}10(Zc/4Zo) \quad (9)$$

where PL, PR and PT are powers on respective L, R and T ports;

The function LIL and TIL can be analyzed graphically by plotting the functions, as shown in FIG. 7. FIG. 7 shows a first plot 702 and a second plot 706, representing the TIL and LIL, respectively, as a function of characteristic impedance value (Zc) 704 for a tap impedance value (Zo) of 50 Ohm.

In the third step in determining an optimized characteristic impedance, LIL and TIL can be applied to the multi-tap transmission line schematic in FIG. 5 to determine the insertion loss between two tap ports as shown by Eq. (10).

$$TTL\,[\text{dB}] = k\,LIL + 2TIL \quad (10)$$

In some cases, k is a positive integer greater than 2, representing the number of taps between the ports under test.

In a subsequent step, the worst-case insertion loss can be determined for the multi-tap transmission line of N taps in FIG. 5, between port T1 and port TN, using Equation (11). Eq (11) is a particular case of Eq (1), where all taps are of Zo impedance.

$$TTLN\,[\text{dB}] = (N-2)LIL + 2TIL \quad (11)$$

Figure 8:
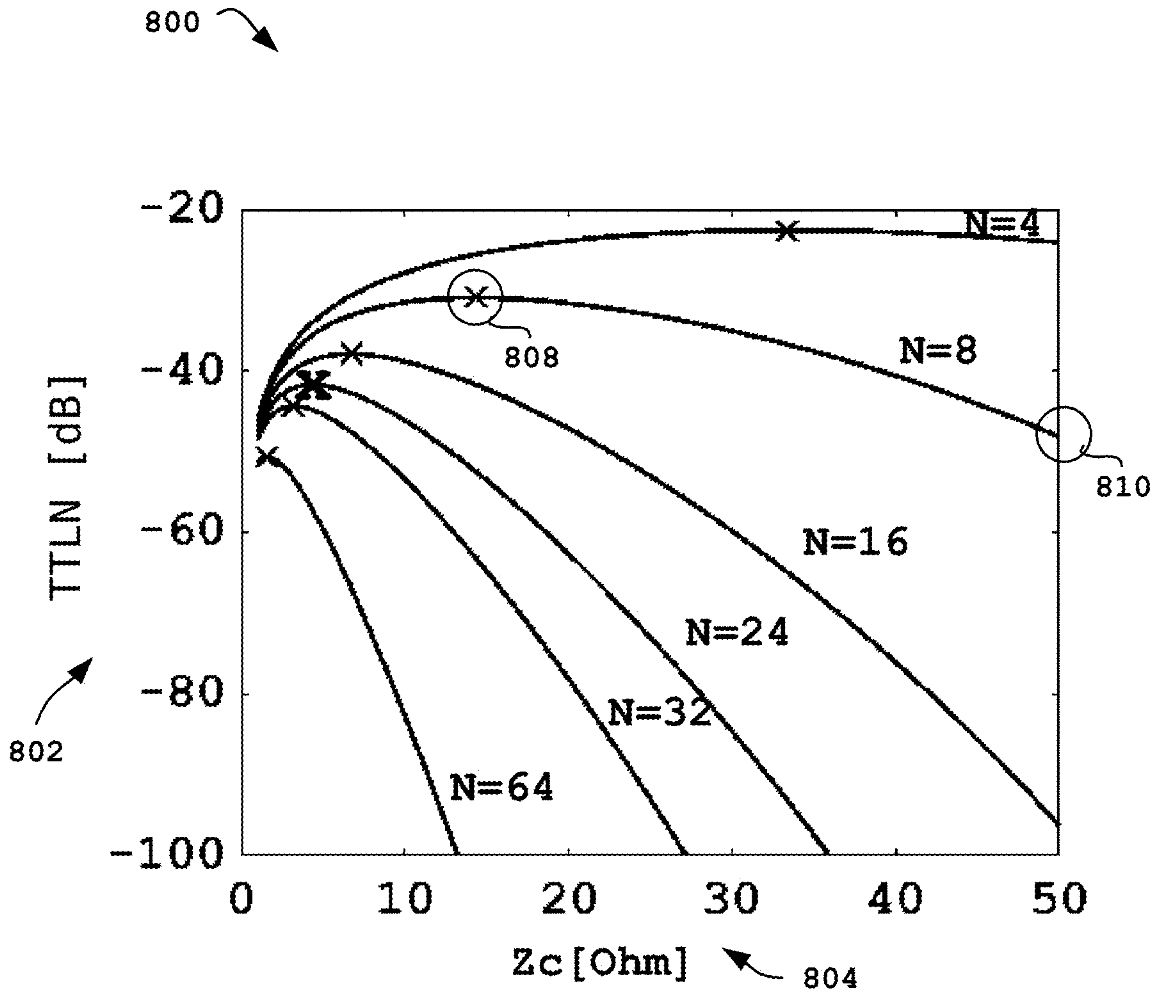
FIG. 8 is a plot showing the dependence of the worst-case insertion loss (TTLN) based on the characteristic impedance (Zc) of the multi-tap transmission line and N, the number of taps of the transmission line.

FIG. 8 is a graph 800 showing the dependency of the worst-case insertion loss (TTLN) 802 based on the characteristic impedance (Zc) 804 of the multi-tap transmission line, for a plurality of N values ranging between 4 taps to 64 taps, where N is the number of taps of the transmission line.

Figure 9:
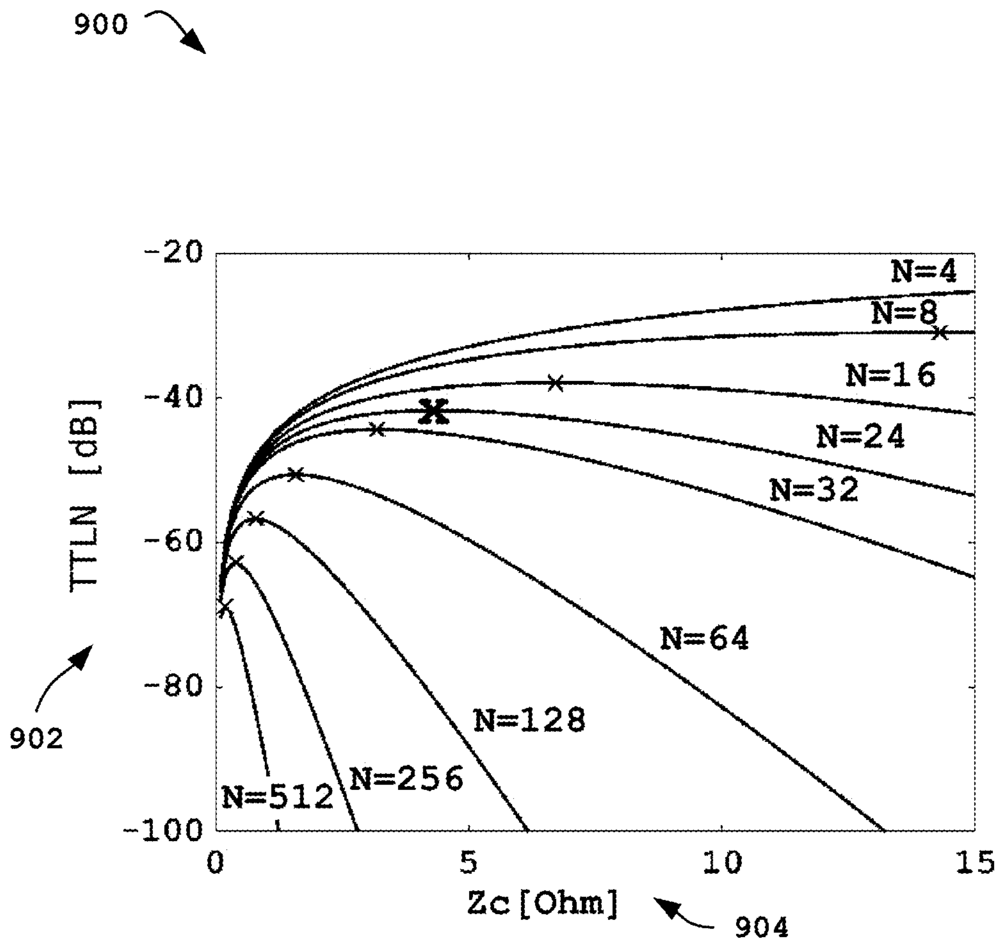
FIG. 9 is a plot showing the dependence of the worst-case insertion loss (TTLN) based on the characteristic impedance (Zc) of the multi-tap transmission line and N, the number of taps of the transmission line.

FIG. 9 is a plot 900 showing the dependence of the worst-case insertion loss (TTLN) 902 based on the characteristic impedance (Zc) 904 of the multi-tap transmission line, for a plurality of N values ranging between 4 taps to 512 taps, where N is the number of taps of the transmission line.

In the plots of FIG. 8 and FIG. 9, the TTLN is calculated dependent on Zc for various N values. A Zo value of 50 Ohm was used as an example, but any tap impedance value can be used. The plots 800, 900 are analyzed to determine the lowest insertion loss for each TTLN plot. For instance, this can be done graphically, by marking the lowest loss point with x, as shown in the plots of FIGS. 8 and 9. Optionally, the lowest insertion loss for each TTLN plot can be determined using any suitable method of locating a global or local maxima or minima. While the graphs of FIG. 8 and FIG. 9 are based on Equation (11) where all taps have the same tap impedance value (Zo), it is understood that graphs of FIGS. 8 and 9 can be generated for other scenarios where various taps have distinct respective impedance values (Zo).

Several methods can be used to find global or local extrema of a function. A first method can include a derivative test, which involves setting the derivative of the function equal to zero and then using the second derivative test to determine if each critical point corresponds to a local minimum, local maximum, or neither. Another method can include graphical analysis, which involves plotting the function to obtain a visual indication of where the extrema might be located. Yet another method can include optimization techniques, where a certain quantity can be maximized or minimized, such as by using Lagrange multipliers and the like.

As shown in FIGS. 8 and 9, for N=8, the insertion loss penalty caused by using a typical 50 Ohm characteristic impedance instead of the optimal impedance value (Zc), can be determined as the insertion loss difference between points 810 and 808 on FIG. 8 to be about 15 dB. For greater certainty, it is noted that if the characteristic impedance value (Zc) of 50 ohms is used (where 50 Ohms is a typical tap impedance value), instead of the optimal Zc value of 14 Ohms, then the insertion loss penalty is the extra attenuation determined by: TTLN (at point 810)−TTLN (at point 808)=47 dB-31 dB (approximately)=15 cB (approximately).

The optimal characteristic impedance (Zc) is determined by determining the point at which the insertion loss is minimized or is at a global maxima or minima. In this example, the lowest loss is determined to be when the characteristic impedance Zc is about 14 Ohms, as shown by point 808 in FIG. 8. Therefore, the optimal characteristic impedance Zc is determined to be about 14 Ohms in an example with 8 tap devices. It should be noted that an alternative characteristic impedance value (Zc) can also be chosen from a range, such as a range between −30% to +30%, of the optimal characteristic impedance value. The alternative characteristic impedance values can also produce multi-tap transmission lines with multiple devices; although the insertion loss may be more than if the optimal characteristic impedance value Zc is selected.

In another example, for a particular case of N=24 taps and Zo=50 Ohms, the optimal impedance Zc can be determined to be about 4.3 Ohms by the methods described such as analytically or from the plot on FIG. 9. For Zc=4.3 Ohm, the optimal resistances Rs can be determined as about 0.094 Ohm; and the tap resistances Rt can be determined as about 47.8 Ohm from the plots in FIG. 6 or by determining using equations 4 and 5, or 6 and 7. As such, the optimal solution of {Zc, Rs, Rt} for a multi-tap transmission line with 24 taps, each of tap impedance Zo=50 Ohm, can be determined as {4.3 Ohms, 0.094 Ohms, 47.8 Ohms}.

Table 1 below examples of some optimal solutions of {Zc, Rs, Rt} for a multi-tap transmission line with N taps, with the tap impedance value Zo ranging between 25 Ohms, 50 Ohms, and 75 Ohms.

TABLE 1

| Number of taps N | Zo [Ohm] | Zc [Ohm] | Rt [Ohm] | Rs [Ohm] |
|---|---|---|---|---|
| 8 | 25 | 7.2 | 21.12 | 0.559 |
| 24 | 25 | 2.1 | 23.93 | 0.045 |
| 32 | 25 | 1.6 | 24.19 | 0.026 |
| 128 | 25 | 0.4 | 24.80 | 0.002 |
| 8 | 50 | 14.3 | 42.30 | 1.101 |
| 24 | 50 | 4.3 | 47.80 | 0.094 |
| 32 | 50 | 3.2 | 48.37 | 0.052 |
| 128 | 50 | 0.8 | 49.60 | 0.003 |
| 8 | 75 | 21.5 | 63.42 | 1.660 |
| 24 | 75 | 6.5 | 71.68 | 0.144 |
| 32 | 75 | 4.8 | 72.56 | 0.078 |
| 128 | 75 | 1.4 | 74.60 | 0.005 |

It should be noted that an alternative resistance values for Rs and Rt can also be chosen from a range between −30% to +30% of the optimal resistance values, as these alternative resistance values can also produce multi-tap transmission lines with multiple devices.

While it can be more convenient to operate with all of the tap device on the same tap impedance Zo, the multi-tap transmission line disclosed herein can operate with tap port impedances (Zo) of different values. In such cases, resistive elements (Rs, Rt) of respective tap circuits are computed for that specific tap impedance (Zo) based on the above-noted equations. In such cases, a common characteristic impedance (Zc) for the entire multi-tap transmission line is used.

In some embodiments, the multi-tap transmission line model can be further refined by considering real delays and losses for the ML transmission lines of each tap circuit. For example, in such embodiments, the multi-tap transmission line disclosed herein, such as transmission line of FIG. 4 or FIG. 5, can be implemented as a stripline with a dielectric of relative constant (DK) of 3.74, a dielectric loss factor (DF) of various values, a line width of 3.6 mm between two ground layers for a characteristic impedance of 4.3 Ohm, while the length of the ML is chosen at 9 mm each for a total tap pitch of 18 mm. The number of taps in this multi-tap transmission line model is set to N=24. The configuration and geometry of the transmission line can also be optimized for the number of taps.

To demonstrate how the real delays and losses are determined, four cases were analyzed as an example. The four example cases are seen as follows, including but not limited to: (A) very low loss with DF=0.001 and Rs=0.094 Ohm, (B) very low loss DF=0.001 and Rs=0, (C) low loss DF=0.01 and Rs=0 and (D) high loss DF=0.02 and Rs=0.

Figure 10:
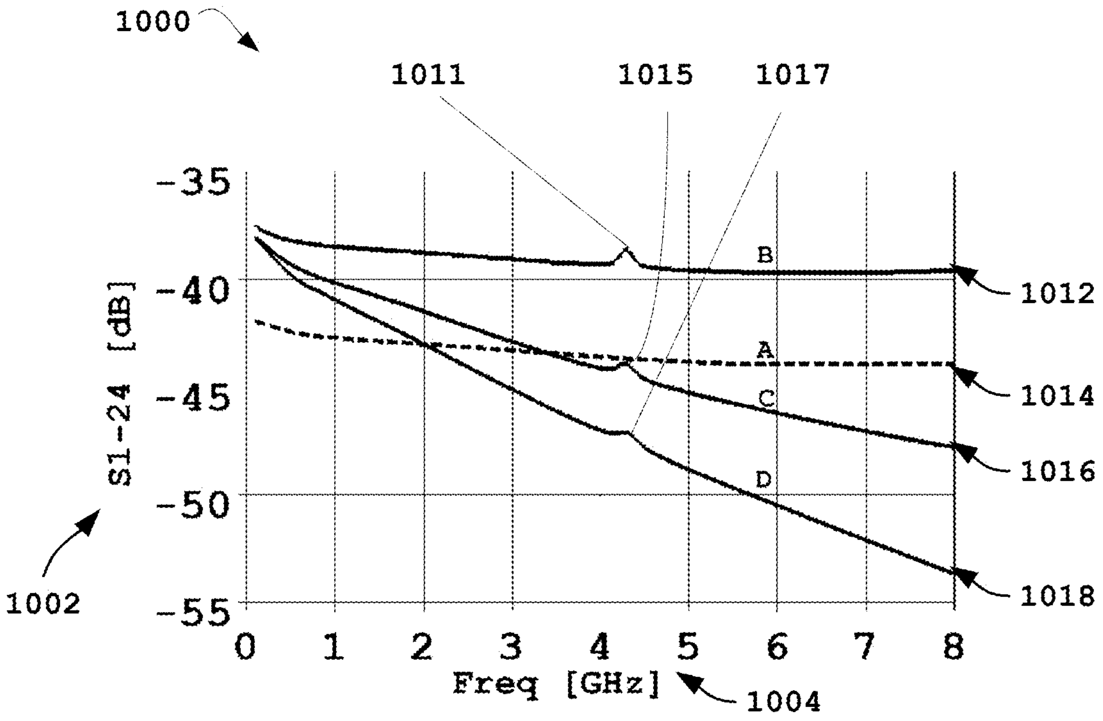
FIG. 10 is a plot showing the frequency dependence of S1-24 for four sample cases.

FIG. 10 is a graph 1000 showing the frequency dependence of the insertion loss S1-24 between tap T1 and tap T24 for the multi-tap transmission line described above for cases (A), (B), (C) and (D). Plot A is represented using reference number 1014. Plot B is represented using reference number 1012. Plot C is represented using reference number 1016 and plot D is represented using reference number 1018. Plots A-D indicate insertion losses 1002 in different scenarios as a function of frequency 1004.

As seen in graph 1000, the plot A 1014 for the insertion loss matches the previously computed value for TTLN from equations (8) to (11), or graphically from FIG. 9. The comparison point can be taken at very low frequencies, as this plot A shows a small downward slope due to the non-zero dissipation factor. Each of the plots 1012 (B), 1016 (C) and 1018 (D) show peaks 1011, 1015 and 1017, respectively, at about 4.3 GHz caused by the waves reflections over the repetitive structure formed by the equally spaced taps at 18 mm due to Rs=0 deviation from theoretical Rs=0.094 Ohm. It can be seen the peak is missing from plot A 1014, as expected, as there are no reflections. Plot B 1012 shows, as expected, the lowest insertion loss, while the difference between plot B 1012 and plot A 1014 provides a measure for the insertion loss penalty caused by the series resistive elements Rs. Plot D 1018 shows the expected highest insertion loss, due to highest dielectric losses and pointing to the limitations of the overall performance of the multi-tap transmission line. Plot C 1016 points to a tolerable compromise between the insertion loss of a good quality FR4 class printed circuit board (PCB) versus eliminating the series resistive element Rs from the tap circuit as plots C 1016 and A 1014 are crossing at about the middle of the target frequency range at about 3.5 GHz. As such, it may be advantageous to use the intrinsic PCB insertion loss caused by a combination of dielectric and electric losses to emulate the effect of the series resistive element Rs.

Figure 11:
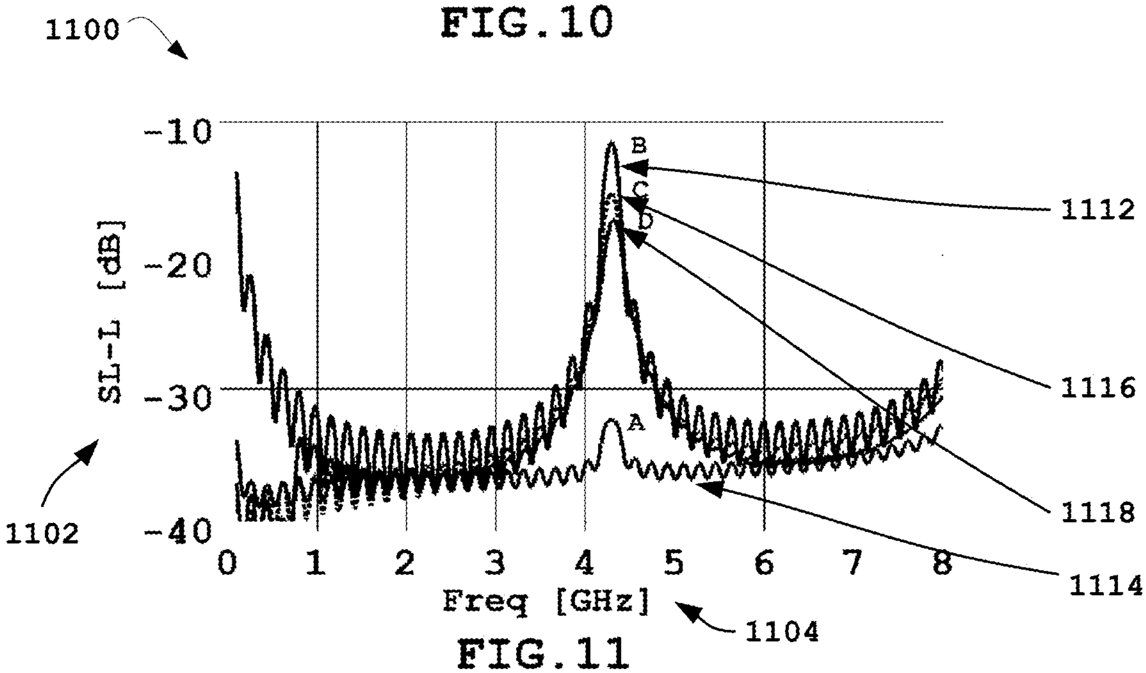
FIG. 11 is a plot showing the frequency dependence of SL-L for four sample cases.

FIG. 11 is a plot 1100 showing the frequency dependence of the return loss SL-L for the above-noted four cases (A), (B), (C) and (D). This return loss is a measure of the standing waves along the multi-tap transmission line and serves as a comparative measure for the radiated emissions or immunity against external interference between the four cases. Plot A is represented using reference number 1114. Plot B is represented using reference number 1112. Plot C is represented using reference number 1116 and plot D is represented using reference number 1118. Plots A-D indicate return losses 1102 in different scenarios as a function of frequency 1104.

Plots B 1112, C 1116 and D 1118 show a higher swing at about 4.3 GHz caused by the waves reflections over the repetitive structure formed by the equally spaced taps at 18 mm due to Rs=0 deviation from theoretical Rs=0.094 Ohm. Plot A 1114 shows a much smaller swing that decreases even further if the Rs and Rt are specified with higher precision. The swing at 4.3 GHz can be lowered by lowering the number of taps or spreading the length of ML lines to use different values, thus reducing their cumulative effect on the overall quality (Q) factor for the entire multi-tap transmission line.

The swing at 4.3 GHz shifts in frequency if the pitch of the tap structure changes from current value of 18 mm, increasing its frequency if the pitch lowers. The swing at 4.3 GHz repeats over the entire spectrum with a periodicity of 4.3 GHz, next swing being observed at 8.6 GHz, not visible in the plot. The small ripple of about six peaks over 1 GHz frequency span is observed for all plots with various amplitudes and is generated by the wave reflection over the entire length of 24×18 mm of the multi-tap line. This ripple is the highest, as expected, for plot B 1112, due to its poorest matching. The lowest value for this ripple observed for plot D 1118 is a result of the higher insertion loss progressively reducing the amplitude of reflected waves. In other words, higher insertion loss of the multi-tap transmission line may have some advantages on minimizing the reflections.

A Planar Multi-Tap Transmission Line PTML

FIG. 12 through FIG. 20 illustrate the planar multi-tap transmission line (PMTL) according to an embodiment.

Figure 12:
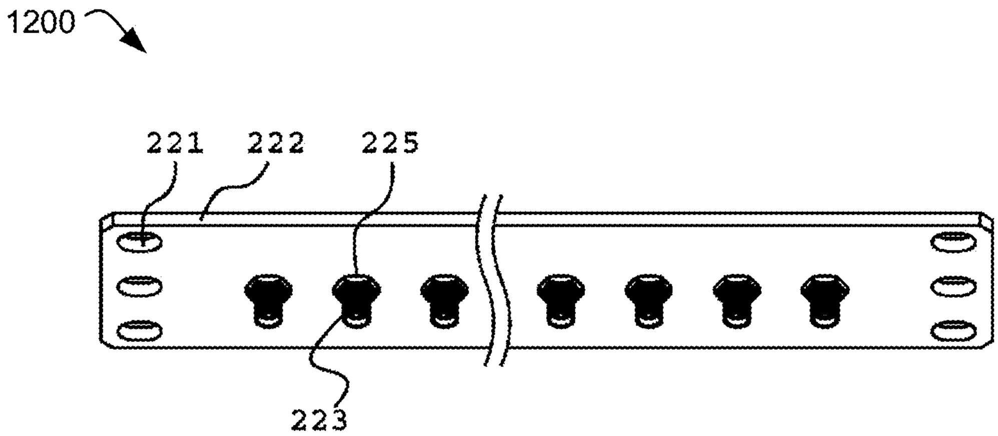
FIG. 12 is a front perspective view of an embodiment for a rack mountable planar multi-tap transmission line.
Figure 13:
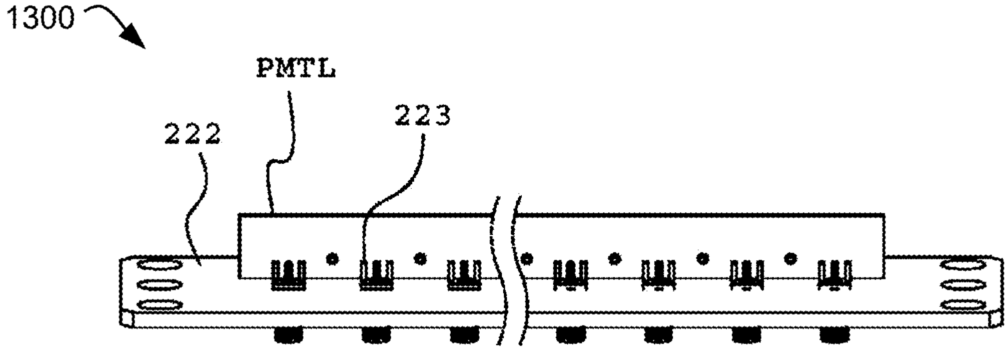
FIG. 13 is a rear perspective view of an embodiment for the rack mountable planar multi-tap transmission line of FIG. 12.

As shown in FIGS. 12-13, the PMTL consists of a front plate 222 having a plurality of mounting holes 221. A plurality of tap connectors 223 are mounted to the front plate using a plurality of nuts 225. The PMTL, as detailed in FIGS. 15-20, comprises ground planes 237 and 238, via structures 239A, 239B and 239C, a tap connector central pin 230B3 of the tap connector 223, a tap pin pad 233 surrounded by a gap 230B2, a transmission stripline 232, a termination resistive element 230D3, a ground termination pad 230D1, a termination microvia set 230D2, a pad 230D1, a tap resistive element 230E1, a tap stripline 230E3, a tap pad 230E2, and a tap microvia set 230E4.

The PMTL of this embodiment can be used in a server rack environment. In such a use case, the tap connectors 223 connect the PMTL to the Wi-Fi connectors of the servers in the rack over coaxial cables.

Figure 14:
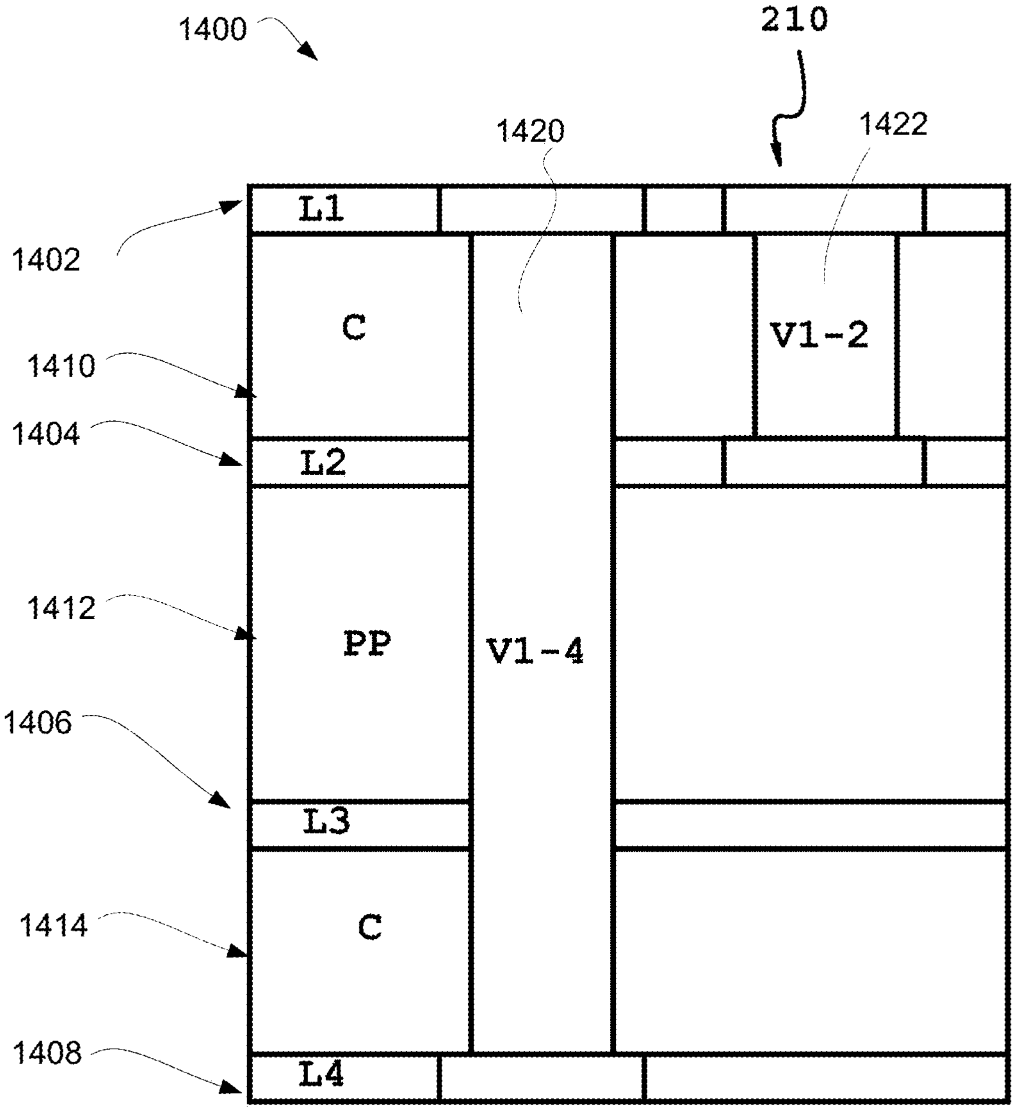
FIG. 14 is a stack-up used to manufacture a printed circuit board.

Reference is made to FIG. 14, which illustrates a stack-up 210 used to manufacture a printed circuit board. The stack-up 210 shows a first copper layer (L1) 1402, a first core layer (C) 1410, a second copper layer (L2) 1404, an insulating layer (PP) 1412, a third copper layer (L3) 1406 a second core layer (C)1414 and a fourth copper layer (L4) 1408. A through-hole via type (V1-4) 1420 is included between layer (L1) 1402 and layer (L4) 1408 and a microvia via type (V1-2) 1422 is included between layer (L1) 1402 and layer (L2) 1404.

In one example, the first copper layer 1402 has a thickness of 35 μm and the core laminate 1410 is made of FR408HR material with a thickness of about 0.089 mm, a dielectric constant (DK) about 3.74 and a dissipation factor (DF) about 0.009. The core laminate 1410 may be made by Isola Group or another similar supplier. The second copper layer 1404 has a thickness of about 18 um combined with an embedded resistive thin-film layer of 25 Ohm per square, such as one made by Quantic Ticer, Quantic Ohmega or another supplier. The insulating layer 1412 consists of a stack of prepregs (PP) and cores with a thickness adjusted for a total PCB thickness of 1.6 mm and made of same FR408HR material type as used for the core 1410. The third copper layer 1406 is an empty (etched-out) copper layer. The empty copper layer 1406 preserves the stack-up symmetry needed for a convenient manufacturing. The second core layer 1414 can have the same configuration as the first core layer 1410. Next, the fourth copper layer (L4) 1408 can have the same thickness as layer 1402.

It can be appreciated that various changes are often made during the manufacturing of the PCB based on 210 to meet local process capabilities and material availability. Such changes need to be coordinated with the geometries and parameters of the PMTL described herein. However, non-essential PCB layers, such as, plating, solder-mask or silkscreen employed in PCB manufacturing are not shown here, but can be completed according to what is typically used.

Figure 15:
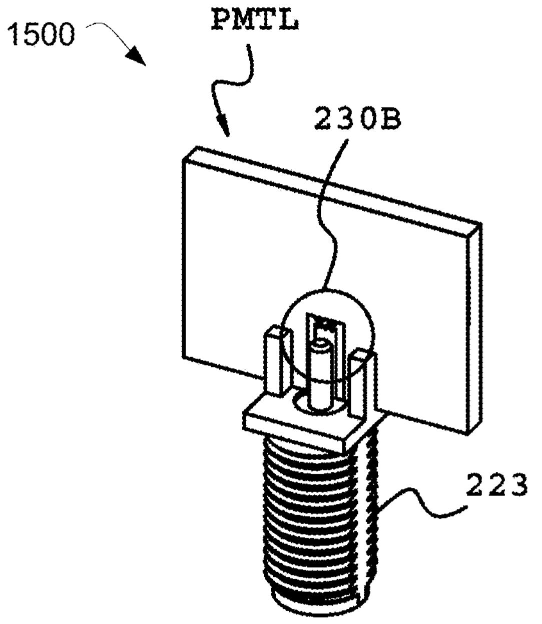
FIG. 15 is a rear perspective view of a tap of a planar multi-tap transmission line.
Figure 16:
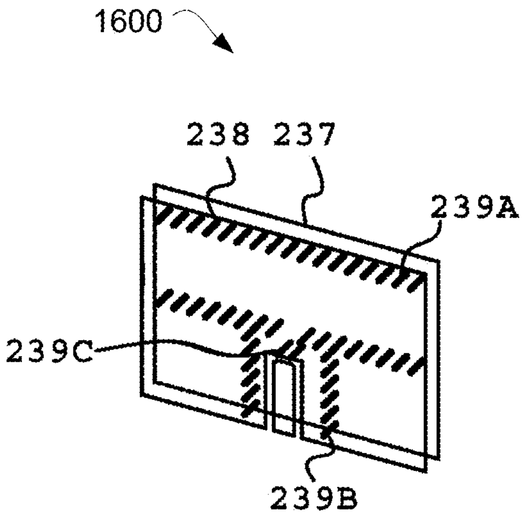
FIG. 16 is a front perspective view of the features on the outer layers and a via structure of the tap of FIG. 15.
Figure 17:
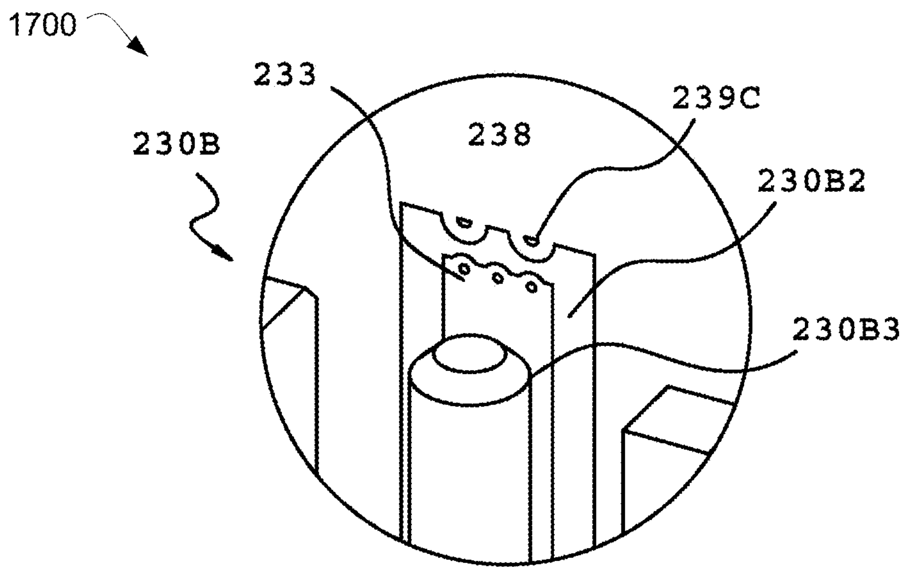
FIG. 17 is a magnified view of detail 230B in FIG. 15.
Figure 18:
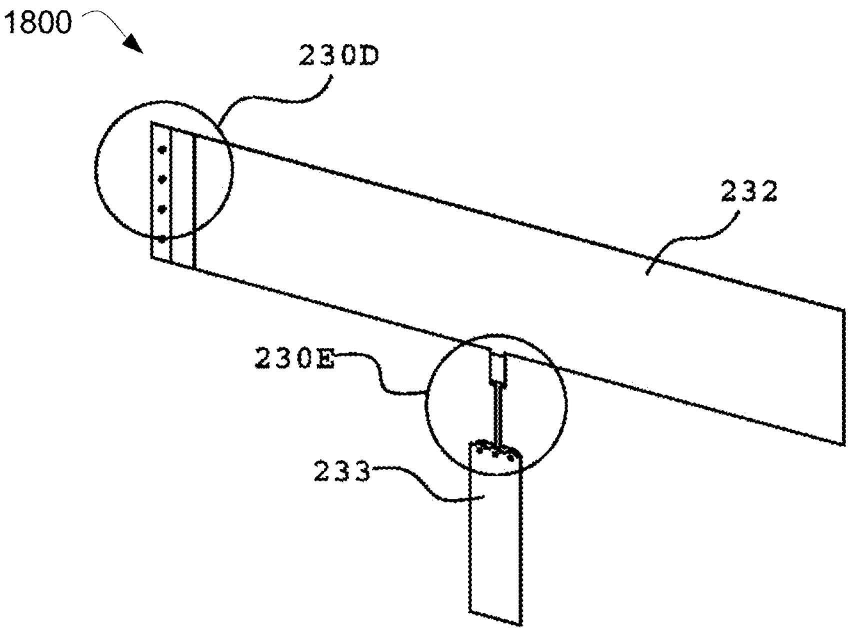
FIG. 18 is a magnified view of active conductive features of the tap in FIG. 15.
Figure 19:
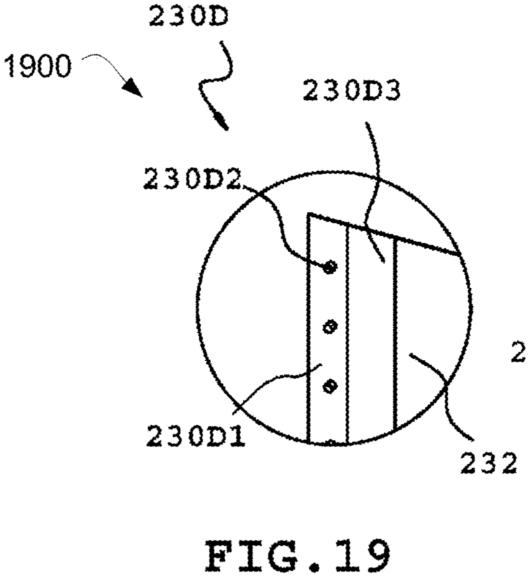
FIG. 19 is a magnified view of detail 230D in FIG. 18.
Figure 20:
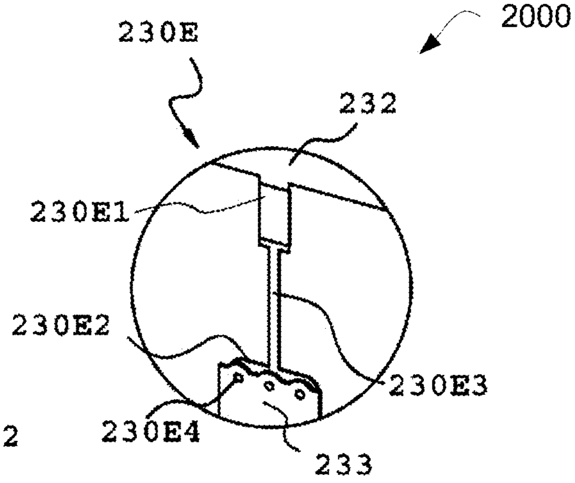
FIG. 20 is a magnified view of a detail identified as 230E in FIG. 18.

Turning now to FIGS. 15-20, which provide various embodiments of the tap of a planar multi-tap transmission line. FIG. 15 provides a rear perspective view of a tap 1500 of a planar multi-tap transmission line. FIG. 16 provides a front perspective view of the features 1600 on the outer layers and a via structure of the tap of FIG. 15. FIG. 17 provides a magnified view 1700 of detail 230B in FIG. 15. FIG. 18 provides a magnified view 1800 of active conductive features of the tap in FIG. 15. FIG. 19 provides a magnified view 1900 of detail 230D in FIG. 18. FIG. 20 provides a magnified view 2000 of a detail identified as 230E in FIG. 18.

In at least one embodiment, the transmission stripline 232 is on the second copper layer L2 1404 and is manufactured as a controlled impedance of Zc=4.3 Ohm with reference to the ground plane 238 on the first copper layer L1 1402 and ground plane 237 on the fourth copper layer L4 1408, and has a nominal width of 3.6 mm. In such embodiments, the termination resistive element 230D3 can be constructed analogously to the left and right ends of the entire transmission stripline 232 and can be realized through sequential etching on a thin-film resistive layer of 25 Ohms per square embedded with second copper layer L2 1404 and having same width as the transmission stripline 232 and a length of 0.62 mm for a final resistance of 4.3 Ohms.

The termination pad 230D1 is built on the second copper layer L2 1404 with same width as the transmission stripline 232 and the termination resistive element 230D3 and connects the latter to the ground plane 238 on the first copper layer L1 1402 through the low impedance of the termination microvia set 230D2.

The via structures 239A and 239B use vias of type V1-4 1420 constructed with a hole of about 0.16 mm diameter, pads of 0.55 mm and a distance between them of about 1 mm connect the ground plane 237 on the fourth copper layer L4 1408 and ground plane 238 on first copper layer L1 1402 to create a shielding cage around the transmission lines.

The microvia used in the termination microvia set 230D2 and in the tap microvia set 230E4 are of type V1-2 1422 with a hole of about 0.1 mm and landing pads of 0.35 mm on first copper layer L1 1402 and 0.325 mm on second copper layer L2 1404.

The tap resistive element 230E1 is realized through sequential etching on a thin-film resistive layer of 25 Ohms per square embedded with the second copper layer L2 1404 and has a finished length of 0.733 mm and width of 0.383 mm for a final resistance of 47.8 Ohm.

The tap stripline 230E3 is realized as a controlled impedance of 50 Ohm on second copper layer L2 1404 to match the impedance of the tap connector 223 and has a nominal width of 0.125 mm and an approximate length of 1.6 mm. There may be advantages in reducing the length of the tap stripline as much as possible.

The tap pad 230E2 has a width of about 0.35 mm and length of about 0.8 mm and fits the tap microvia set 230E4.

The tap resistive element 230E1 is connected to and realized as close as possible to the transmission stripline 232 and is connected to its other end to the tap stripline 230E3 further connected to the tap pad 230E2 further connected through the tap microvia set 230E4 to the tap pin pad 233.

The gap 230B2 has an optimal opening of 0.5 mm around the tap pin pad 233. The tap connector central pin 230B3, surrounded by four ground pins of the same connector, the tap pin pad 233, the gap 230B2, the tap microvia set 230E4, the tap pad 230E2, the ground plane 238 on first copper layer L1 1402, the ground plane 237 on fourth copper layer L4 1408, and the via structure 239C between ground plane 238 on first copper layer L1 1402 and ground plane 237 on fourth copper layer L4 1408 straddling the tap stripline 230E3 on second copper layer L2 1404 form a critical transition from the coaxial waveguide of the tap connector 223 into the tap stripline 230E3.

The other taps of the PMTL have an identical construction as the one described, with the transmission stripline 232 being a continuous line of same width over the length of the entire PMTL. It should be noted that an alternative geometry values can also be chosen from a range of the suitable geometry, as these alternative geometries can also produce multi-tap transmission lines with multiple devices. The range can be any suitable range, such as, for example, between −30% to +30%, between −35% to +35%, etc.

Modeling and Simulations for the PMTL

Figure 21:
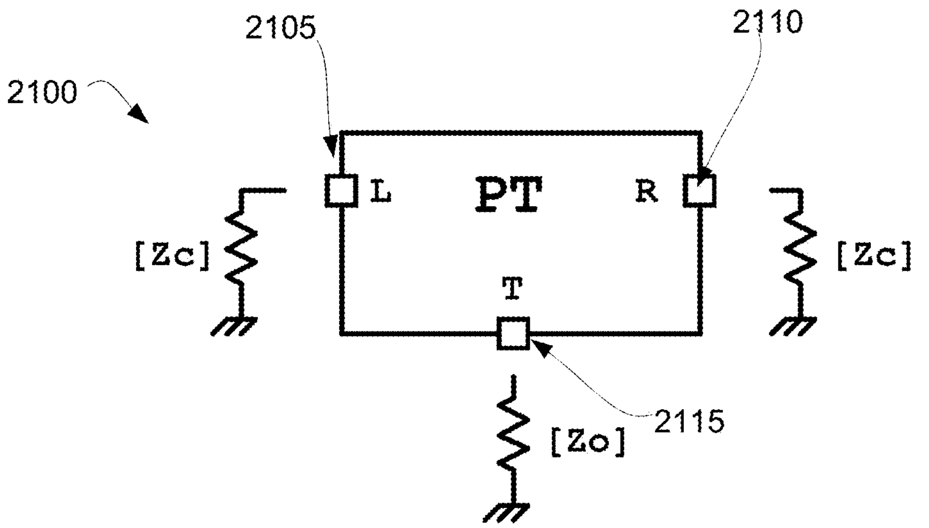
FIG. 21 is a schematic diagram of a model of the tap in FIG. 15.
Figure 23:
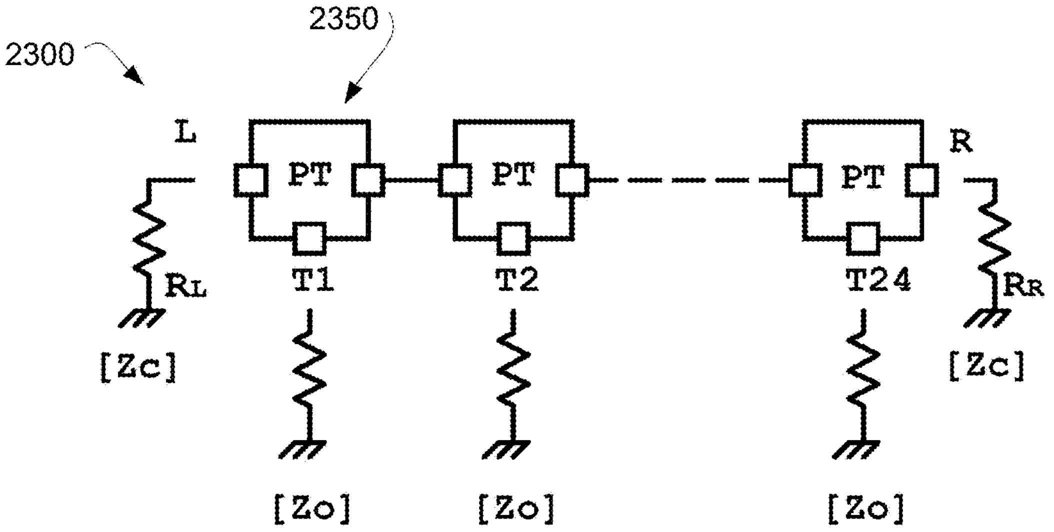
FIG. 23 is a schematic diagram of a model of the planar multi-tap transmission line in FIG. 13.

FIG. 21 shows the connection diagram of a planar tap PT 2100 modeled following illustrations in FIG. 15-20 and related description with the exception of the termination resistive element 230D3, the termination pad 230D1, and the termination microvia set 230D2. The model is symmetrical on the centerline of the tap connector for a total tap length of 18 mm to allow the model to be expanded to build a circuit model for the entire PMTL in FIG. 13 through simple concatenation of twenty-four planar tap PT models of FIG. 21 as depicted in FIG. 23. Tap port 2115 is analogous to tap port 403 of FIG. 4. Left port (L) 2105 is analogous to left port 430*a* of FIG. 4; and right port (R) 2110 is analogous to the right port (R) 430*b* of FIG. 4.

Figure 22:
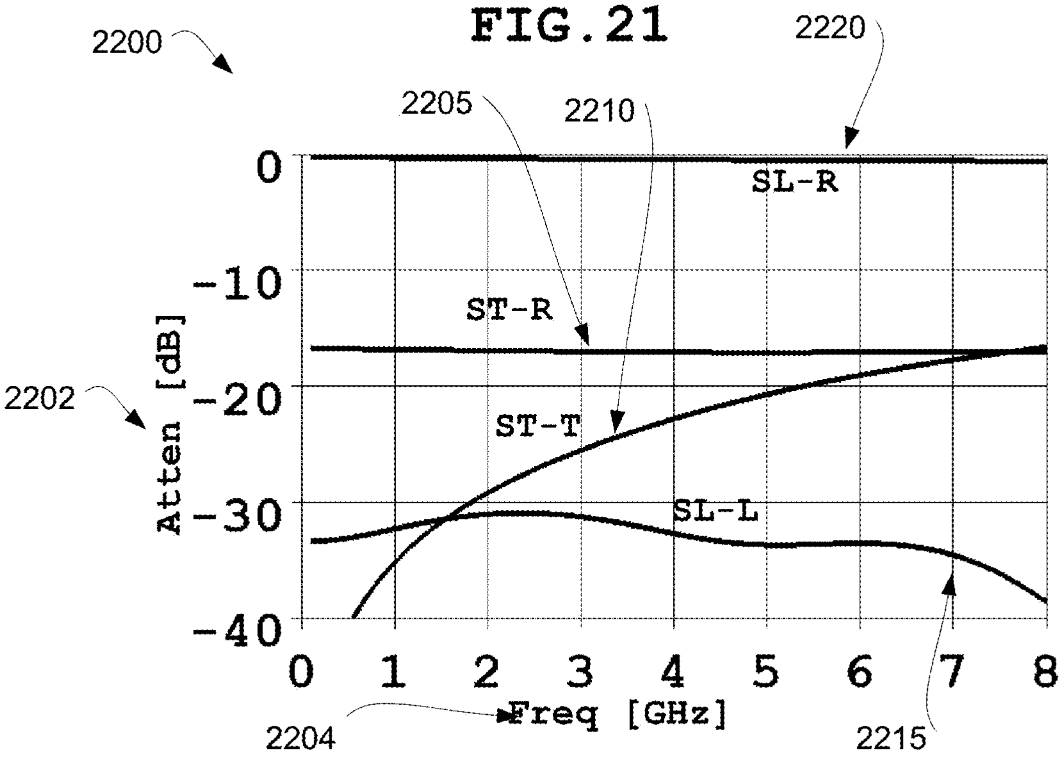
FIG. 22 is a plot of S parameters for the model in FIG. 21.

Reference is next made to FIG. 22, which illustrates the S-parameters extracted and plotted for a model of a planar tap PT, such as PT 2100 of FIG. 21. The S-parameters can be extracted using any 3D EM software. Graph 2200 shows attenuation on the y-axis 2202 as a function of frequency on x-axis 2204.

As shown, graph 2200 shows a first plot SL-R 2220, which indicates the insertion loss between a left port L 2105 and a right port R 2110 equivalent to the longitudinal insertion loss LIL defined by equation (8) and plotted in FIG. 7. Plot ST-R 2205 indicates the insertion loss between left port L 2105 and right port R 2110 equivalent to the transversal insertion loss TIL defined by equation (9) and shown in FIG. 7. Plot ST-T 2210 is the return loss at the tap port T 2115, and plot SL-L 2215 represents the return loss at left port L 2105.

As seen in FIG. 22, plot SL-R 2220 is low, as expected for a line 18 mm long and a tap port well isolated by an embedded resistive element Rt of very low parasitics, where the slope is caused mainly by the dielectric losses and copper losses. Plot ST-R 2205 is close to predicted TIL of about −17 dB for Zc=4.3 Ohms as seen in FIG. 7. Plot SL-L 2215 has attenuation of below −30 dB denoting little reflections along the tap 2115. Plot ST-T 2210 shows very low attenuation for low frequencies, while its performance degrades somewhat for higher frequencies. This degradation may be caused by the transition between the tap connector to the transmission stripline.

The S-parameters extracted for the tap modeled in FIG. 21 can be plugged into a circuit 2300 as in FIG. 23 to model the behavior of the entire PMTL in FIG. 13 using a suitable circuit simulator.

The tap circuits 2350 shown in FIG. 23 are analogous to tap circuits 400 of FIG. 5. Also shown in FIG. 23 are 24 tap ports 2350, T1 to T24.

Figure 24:
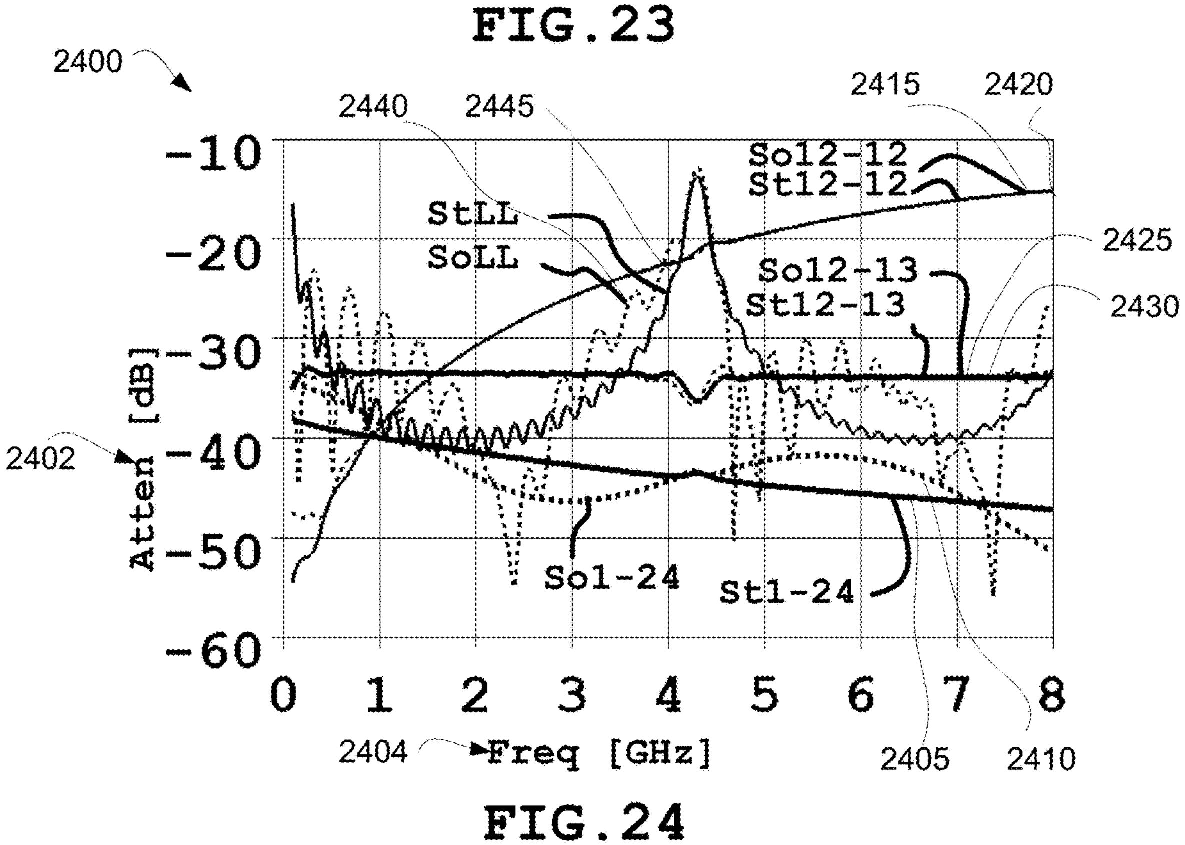
FIG. 24 is a plot showing the frequency dependency of S parameters for the model in FIG. 23.

The circuit modeled in FIG. 23 is tested and plotted in FIG. 24 for two conditions: (1) terminated condition, when all tap ports T are terminated into the nominal impedance Zo of 50 Ohm and (2) open condition when all tap ports not being tested are left open.

The ports under test are always terminated. While the terminated condition is the normal, the open condition measures the effect on the performance loss caused by the PMTL operated with unconnected or defective open taps. It was determined that a shorted tap condition produces similar levels of penalty as the open condition, and it was not plotted for a clearer illustration.

FIG. 24 provides plots 2400 for modelling the insertion losses 2402 as a function of frequency 2404. Plots (So1-24) 2410 and (St1-24) 2405 represent the insertion losses between tap ports at each end of the PMTL for respective open and terminated conditions, respectively. With respect to FIG. 23, tap ports at each end include the first tap port (T1) and the last tap port (T24).

Plots (So12-13) 2425 and (St12-13) 2430 represent the insertion losses between adjacent tap ports in the middle of the PMTL for respective open and terminated conditions, respectively. With reference to FIG. 23, adjacent tap ports in the middle of the PMTL include the $12^{th}$ tap port (T12) and the $13^{th}$ tap port (T13).

Plots (So12-12) 2415 and (St12-12) 2420 represent the return losses for a tap port in the middle of the PMTL for respective open and terminated conditions, respectively. With reference to FIG. 23, tap port in the middle of the PMTL includes the $12^{th}$ tap port (T12).

Plots (SoLL) 2440 and (StLL) 2445 represent the return losses on the left port of the PMTL for respective open and terminated conditions, respectively.

The taps in the middle of the PMTL were selected to evaluate the plot (So12-12) 2415 and plot (So12-13) 2425 for their worst location, as any tap closer to a termination of the PMTL sees a lower reflection, with less and less impact from tap discontinuities between said tap and said termination.

As seen in FIG. 24, plot (St1-24) 2405 is similar to plot (S1-24) for case (C) 1016 in FIG. 10, which validates the modeling. Plot (So1-24) 2410 follows plot (St1-24) 2405 with a superimposed swing caused by the cumulative effect of open tap disturbances, but the small amplitude causes little to no concern about PMTL operation. Plots (So12-13) 2425 and (St12-13) 2430 are close to the numbers predicted by equations (8) to (10) or FIG. 7, with little or no difference between open and terminated conditions, meaning a good isolation from the other taps. Plots (So12-12) 2415 and (St12-12) 2420 are almost identical, indicating a good isolation for the return loss of a tap from all the other taps. The small peak on the plots (So12-13) 2425 and (St12-13) 2430 at about 4.3 GHz is caused by the reflections of the traveling wave along the multi-tap line hitting the periodical structure created by the pitch of 18 mm between the taps, each tap causing a discontinuity due to having the resistance of resistive elements Rs reduced to zero and operating with lossy transmission lines. The reflections along the multi-tap transmission line quantified by plots (SoLL) 2440 and (StLL) 2425 concur with the plots in the FIG. 11 of the preliminary model, due to the same reasons as above.

Design Instructions for the PMTL

In at least one embodiment, the PMTL parameters are selected as follows. First, an optimal characteristic impedance (Zc) value is selected for the desired number of taps, such as from FIG. 8 or 9. Next, a test coupon made of the laminate of choice for the desired PMTL configuration, such as stripline or microstrip transmission line, is constructed. The insertion loss over frequency for the desired PMTL length is determined. This test may be low cost and offers a better prediction for the worst-case insertion loss compared to using material datasheets or other engineering approximations. Next, the insertion loss plot from previous step is shifted down by the worst-case insertion loss (TTLN) value read from FIG. 8 or FIG. 9 for the number of taps intended. This new plot provides a useful approximation for the maximum tap-to-tap insertion loss over the intended frequency range.

Next, the tap resistive element value is determined based on equation (5). In some cases, the tap resistive element is implemented with an embedded resistive layer in order to keep the lowest parasitic for the tap. Next, the lowest possible characteristic impedance value (Zc) is used. This provides the advantage of lowering PMTL radiated emissions and increasing its immunity against external interference and tap loading defects. The lowest possible characteristic impedance value (Zc) is determined based on the RF link budget or the allowed room on PCB. Further lowering the characteristic impedance value (Zc) can increase the insertion loss and the width of the transmission line.

Next, series resistive elements (Rs) are calculated based on equation (4). The series resistive elements of the same thin-film technology as the tap resistive elements (Rt) are used to lower the reflections along the line as needed. Further, the series resistive element value (Rs) is adjusted to optimize insertion loss and reflections performance. In addition, the geometry and the thin-film material used for series resistive elements (Rs) and tap resistive element (Rt) are adjusted to reduce geometrical discontinuities along the PMTL line, which results in lowest parasitic effects on the PMTL. This is done while keeping the area of the common node to a minimum, as the insertion of the series resistive element (Rs) may cause more reflections than it prevents.

The frequency response of a PMTL implemented on same layer without any transitions or connectors is practically flat over a frequency range extending into 100 GHz with the insertion loss in the PCB taking its expected toll over this range.

A Backplane Planar Multi-Tap Transmission Line bPMTL

Figure 25:
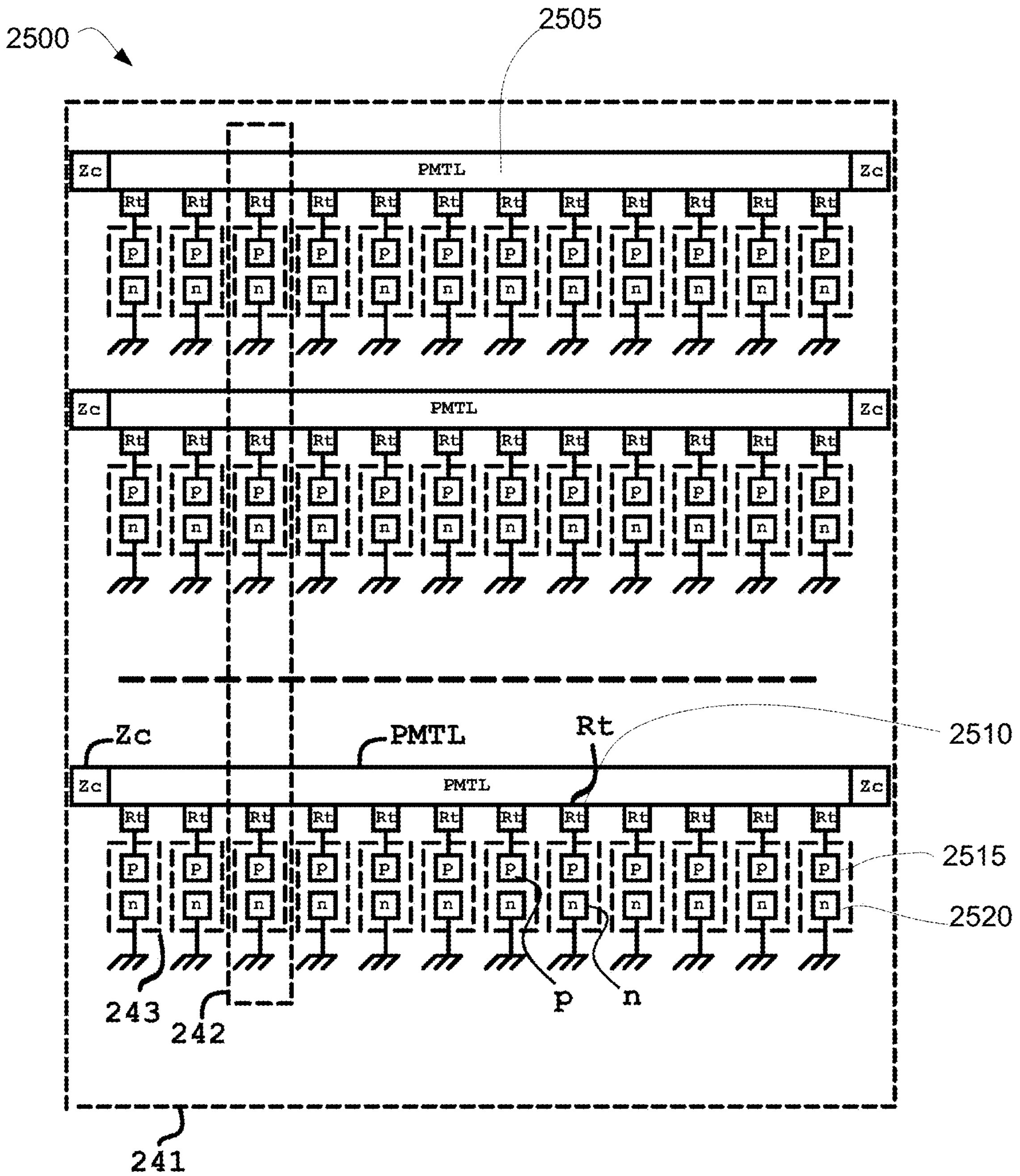
FIG. 25 is a diagram of a backplane multi-tap transmission line.

FIG. 25 is a schematic diagram of a backplane PMTL or bPMTL 2500 according to an embodiment. The backplane 2500 comprises a backplane 241, a plurality of properly terminated PMTL 2505, a plurality of tap resistive elements Rt 2510 and a plurality of slot connectors 242. Each slot connector 242 comprises a plurality of differential connector pin pairs 243. The plurality of PMTL 2505 are arranged side by side, with their respective tap resistive element Rt connected with the shortest transmission line to the p pin 2515 of the differential pin pair 243 and where the n pin 2520 of the differential pair 243 is grounded. The differential pin pairs 243 are arranged in groups as part of the slot connectors 242. Each slot may be equipped with a plugin card with mating pins and RF tap devices connected to corresponding taps ports of the bPMTL over the p pin 2515 of the mating differential pin pair 243. The grounded n pin 2520 serves to control the impedance of the differential pin pair 243 to achieve an effective impedance of about 50 Ohms for the line connected to p pin 2515.

The performance of the connection between the tap device on the plugin card and its tap resistor on the backplane is practically limited by the backplane connector. The impedance of this connection as a transmission line is chosen to match the connector impedance and provide a matching pad on the plugin card between the tap device and the connector. The impedance of the short line on the backplane between the connector and tap resistive element (Rt) is selected to match the connector impedance and the resistance value for the tap resistive element (Rt) is computed using the backplane connector impedance as Zo in equation (5).

An optimal bPMTL for specific end product requirements can be then constructed using the optimal values that are calculated.

A Coaxial Multi-Tap Transmission Line CMTL

Next, a coaxial multi-tap transmission line (CMTL) is discussed. Incomplete portions or segments of the CMTL are referred to herein as 'coaxial stack', whereas CMTL refers to precise and complete definition of a coaxial multitap transmission line.

Figure 26:
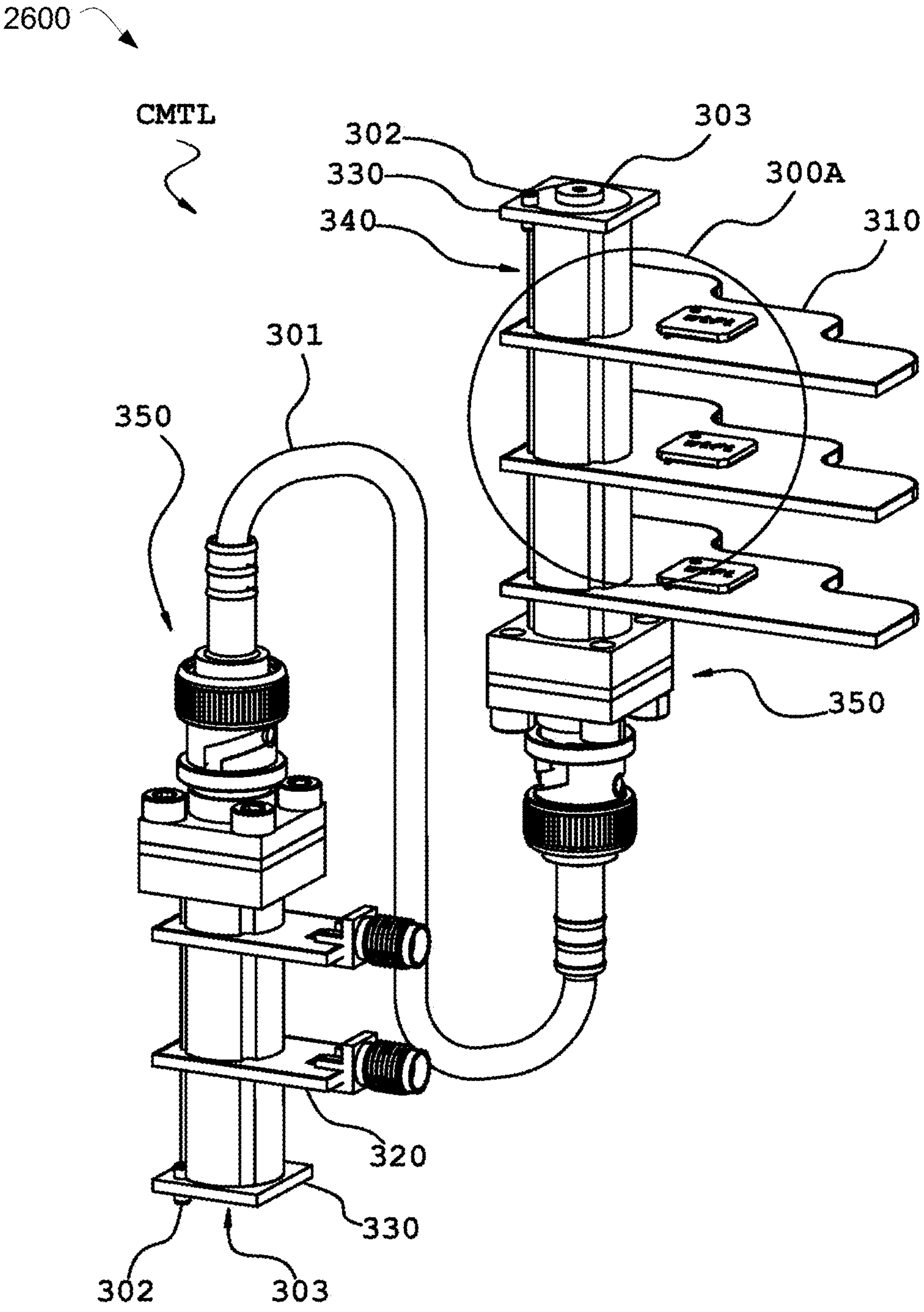
FIG. 26 is a perspective view of an embodiment of a coaxial multi-tap transmission line.
Figure 27:
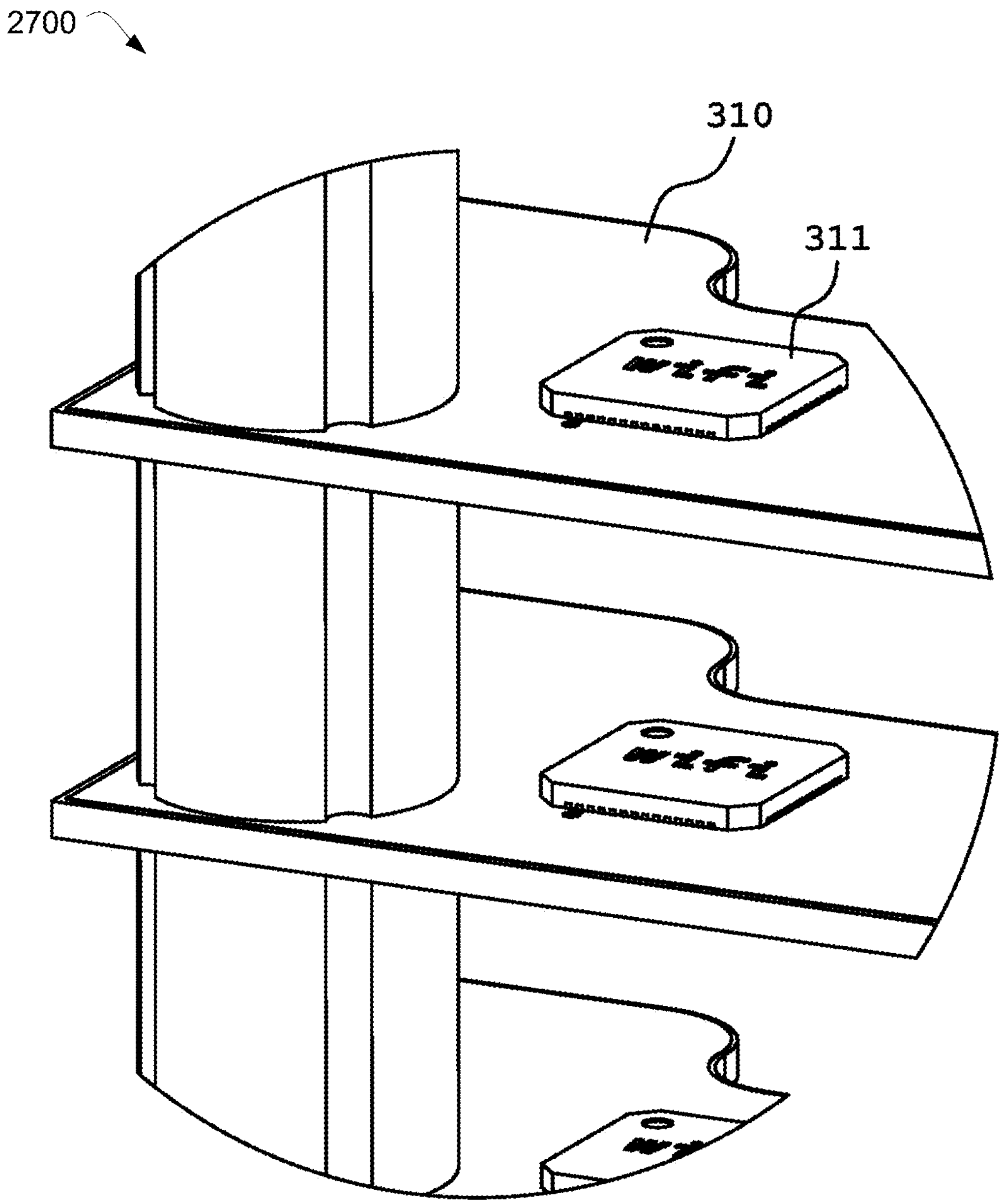
FIG. 27 is a magnified view of detail 300A in FIG. 26.

FIG. 26 and FIG. 27 illustrate an embodiment referred to as coaxial multi-tap transmission line 2600, 2700 or CMTL. The CMTL comprises a coaxial cable 301, and a plurality of spring pins 302, mounting bolts 303, coaxial taps 320, coaxial terminations 330, coaxial standoffs 340, coaxial connector adapters 350, and tap device cards 310 with tap devices 311.

The illustration 2600 in FIG. 26 illustrates how to assemble the CMTL from various parts in configurations adapted in size and composition to meet specific needs.

A Coaxial Standoff for the CMTL

Figure 28:
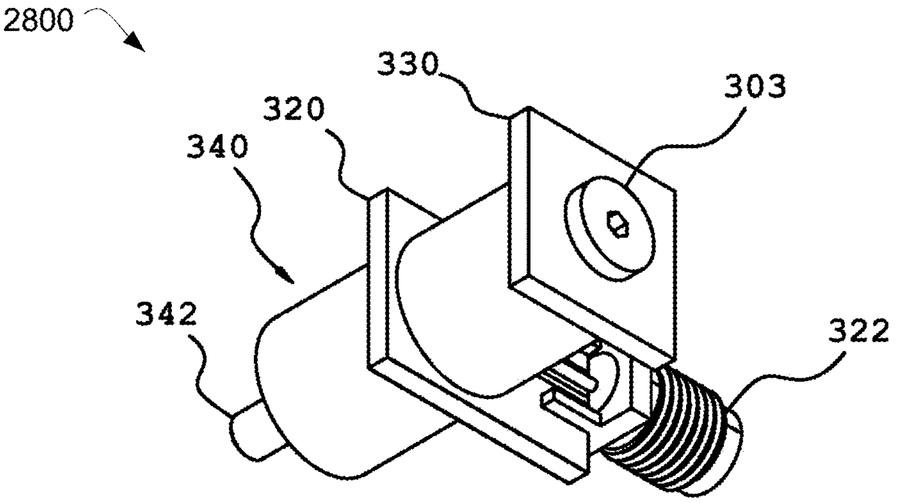
FIG. 28 is a perspective view of an embodiment of a coaxial stack comprising a coaxial tap, two coaxial standoffs and a coaxial termination.
Figure 29:
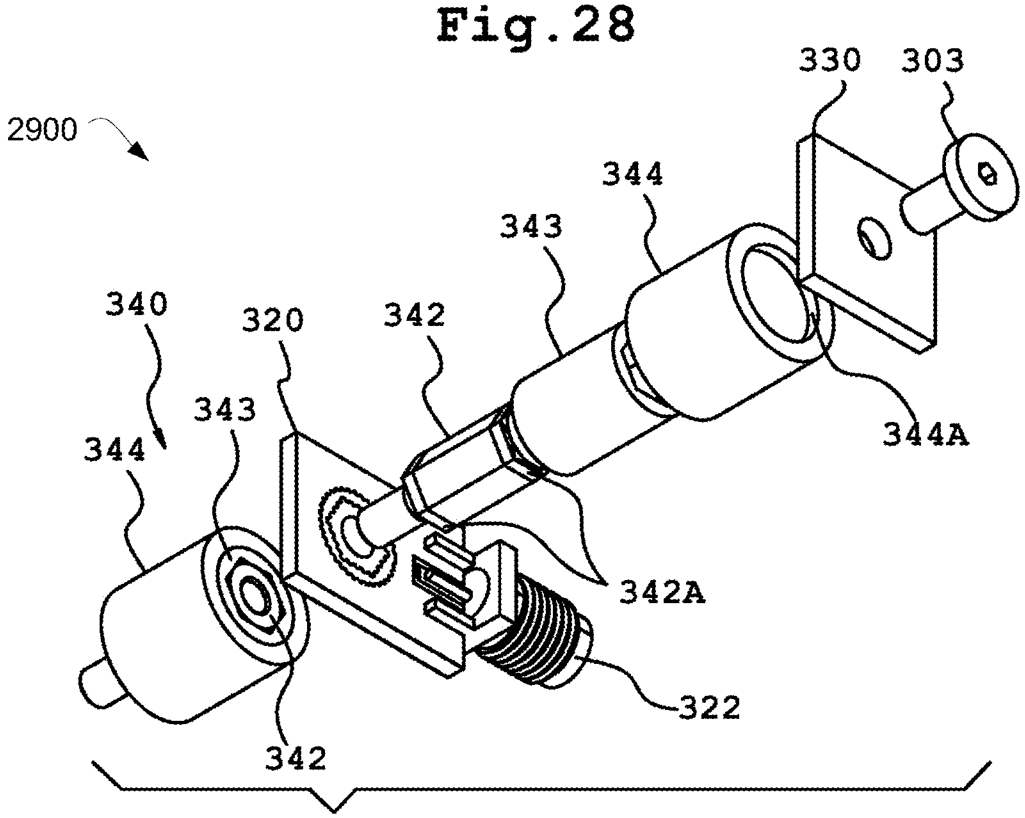
FIG. 29 is an exploded view of the coaxial stack of FIG. 28.
Figure 30:
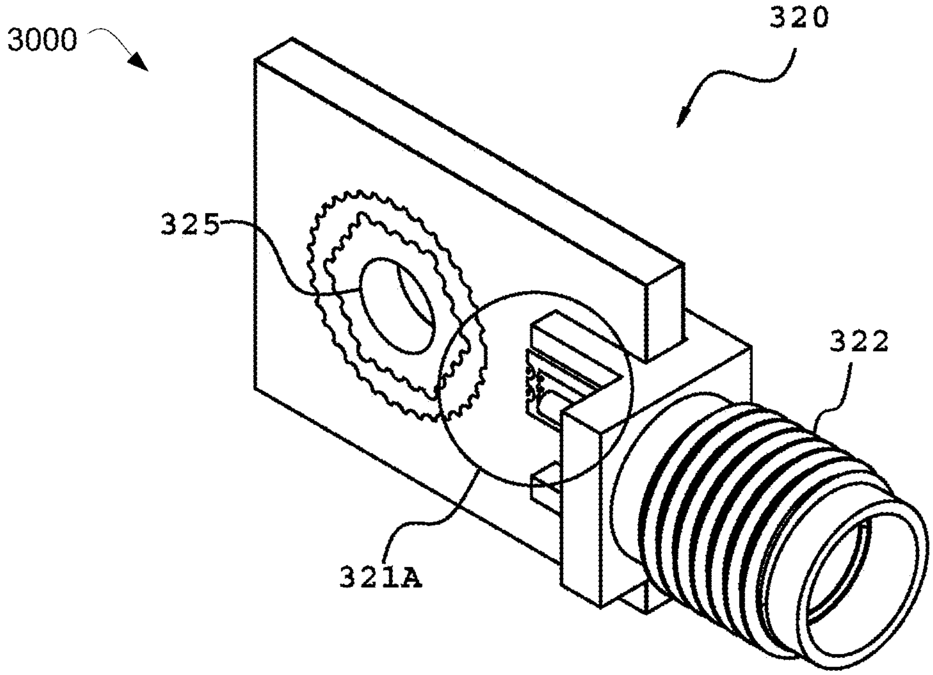
FIG. 30 is a front perspective view of a coaxial tap.
Figure 31:
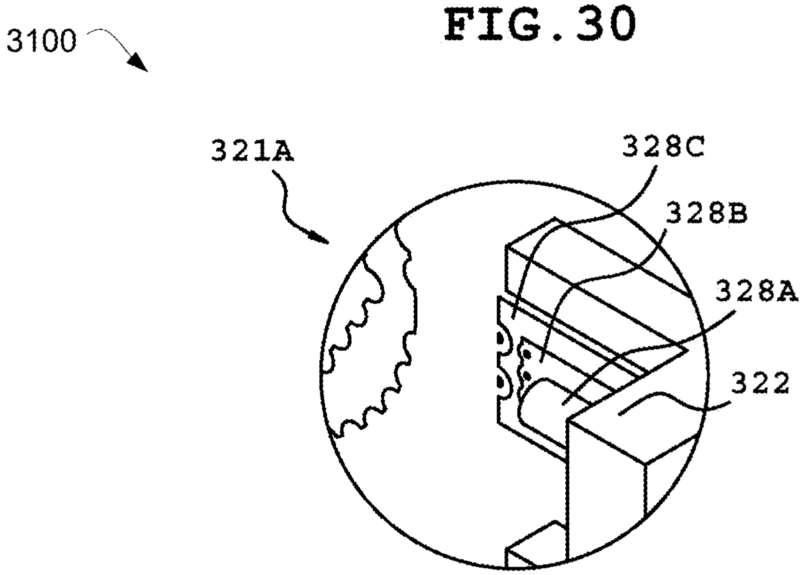
FIG. 31 is a magnified view of detail 321A in FIG. 30.
Figure 32:
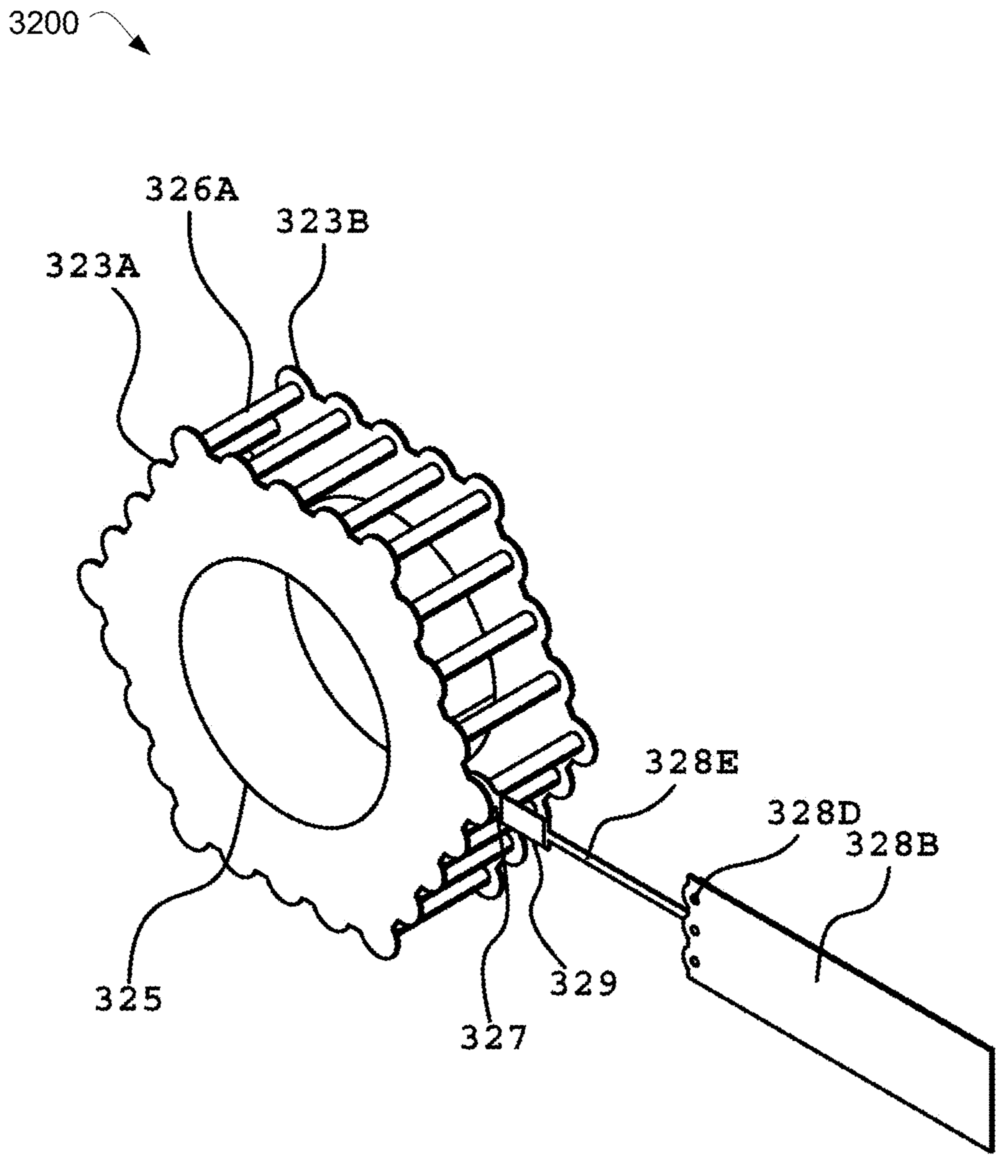
FIG. 32 is a magnified view of PCB active conductive features of the coaxial tap in FIG. 30.
Figure 33:
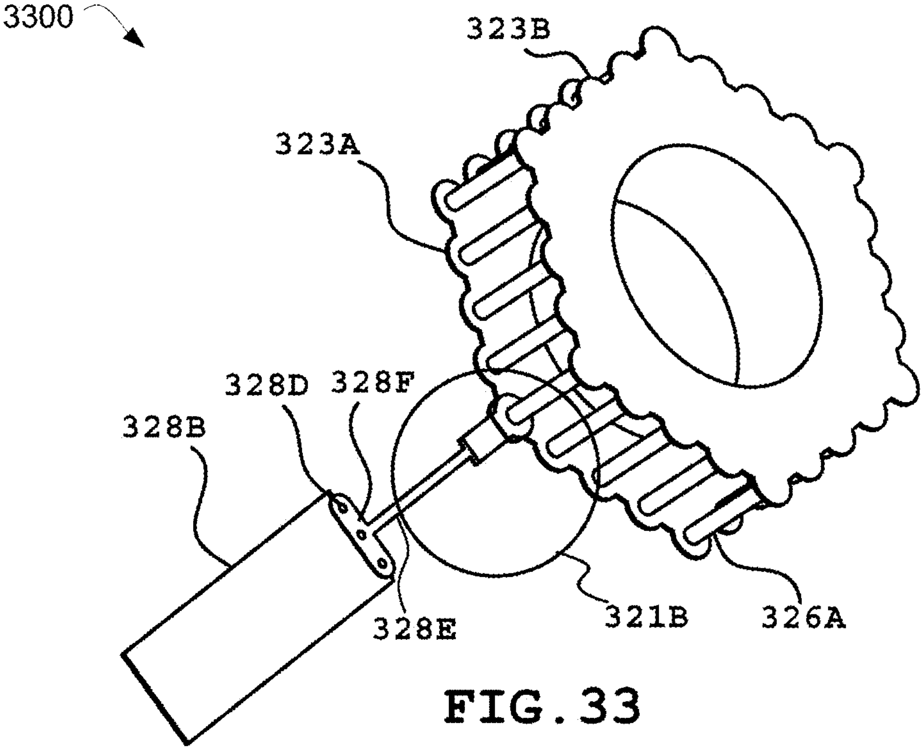
FIG. 33 is a rear view of the PCB active conductive features of the coaxial tap of FIG. 32.

FIG. 28 and FIG. 29 illustrate a portion of the CMTL 2800, 2900, comprising the mounting bolt 303, the coaxial termination 330, the coaxial standoffs 340, the coaxial tap 320, and inner standoffs 342 surrounded by dielectric standoffs 343 surrounded by outer standoffs 344.

The inner standoff 342 is holding adjacent cards such as the coaxial taps 320, the tap device cards 310, or the coaxial terminations 330 by clamping them together against the dielectric standoff 343 and the outer standoff 344. The required clamping force can be realized by using threaded features of screw-and-nut type, where the friction between the threads helps holding them together, or by using ball-and-socket joint of a snap fit assembly type, where the friction between the mating ball and its socket features holds them together. If examples where threaded standoffs are used, they are provided with means to lock them in place to prevent disengaging. If ball-and-socket standoffs are used, they are provided with means to separate them.

The inner standoffs 342 illustrated and referenced in FIG. 28, FIG. 29, FIG. 43 and FIG. 44 are shown in their threaded variant with a hexagonal profile for convenient tightening with a hex socket tool. The inner standoff 342 acts as the inner conductor of the coaxial standoff 340 conducting the coaxial RF currents mostly on its surface due to the skin effect. When it is a part of the coaxial standoff 340, the inner standoff 342 is operating under mechanical tension stress and needs to be provided with a compliant conductive gasket attached to one or both of its sitting surfaces to ensure proper contact between them and the PCB landing pad. This compliant conductive gasket can be realized as a formed-in-place gasket on the sitting surface of the inner standoff 342 or as a formed-in-place gasket on the attaching PCB landing pad.

In one embodiment, the dielectric standoff 343 is made of a material with relative permittivity that matches the one used for the PCB dielectric materials in the coaxial tap 320 or tap device card 310.

When it is a part of the coaxial standoff 340, the outer standoff 344 operates under mechanical compression stress between adjacent cards such as the coaxial termination 330, the coaxial tap 320 and the tap device card 310.

The compression on the outer standoff 344 practically equals the tension in the inner standoff 342, as the dielectric standoff 342 usually takes very little stress as it is made of a much softer material. The tension stress in the inner standoff 342 is transferred into the compression stress in the outer standoff 344 over the PCB area between them taking sheer and bending stresses. The outer standoff 344, the inner standoff 342 and the PCB area between them need also to support the structural integrity of the CMTL and dissipate the stresses from large, attached structures such as tap device cards 310 or coaxial cables connected to coaxial taps 320. These stresses are taken into consideration as they may affect the quality of the contact between the coaxial stack and its landing pad on corresponding PCB or the physical integrity of the CMTL parts.

Moreover, as the inner standoff 342 needs to be prevented against untightening and the whole coaxial standoff 340 needs to be prevented from spinning against the PCB, a solution is provided and illustrated in FIG. 26, where the outer standoff 344 has a profiled outer surface with four grooves that allow the coaxial standoff 340 to be locked at specific angles against the PCB using the spring pin 302 securely attached to the PCB through a compress-insert-release process.

The outer standoff 344 operates as the outer conductor for the coaxial transmission line formed within the structure of the coaxial standoff 340 and conducts the coaxial RF currents of the CMTL mostly on its inner cylinder surface due to skin effect.

The inner standoff 342, the dielectric standoff 343, and the outer standoff 344 need to have a coordinated construction, materials and geometry matching the mating PCB. It is observed that the bandwidth of the CMTL increases when the mean of the inner and outer diameters of the dielectric standoff 343 decreases. While operating the CMTL with a dielectric standoff 343 with (1) a hexagonal profile for the inner void of 5 mm across faces as driven by the choice of a fitting off-the-shelf M3 stainless steel standoff, (2) an outer diameter of 7.5 mm, and (3) made of an epoxy or other insulator material with DK of about 3.74 as coordinated with the PCB dielectric, a flat bandwidth of about 8 GHz was obtained.

In various embodiments, the manufacturing method for the dielectric standoff is through extrusion with tolerance control to minimize the gaps between the dielectric and surrounding conductive surfaces. In examples where the dielectric is made of a softer material, its softness can be used to fill any voids by cutting the dielectric standoff 343 a bit longer than the outer standoff 344 and using the inherent compression created by the inner standoff 342 to bulge the softer material and fill the unwanted gaps between the inner and outer standoffs.

The dielectric losses of the dielectric standoff 343 and conductive losses of the inner standoff 342 and outer standoff 344 influence the losses and reflection along the CMTL and they may be used to control to the performance of the CMTL. It is observed that higher dielectric or conductive losses on the CMTL dampen the reflections caused by discontinuities at the tap discontinuity points. Accordingly, in various embodiments, the coaxial standoffs are constructed for the highest acceptable insertion loss for best system performance predictability.

In some embodiments, the insertion losses and reflections along the CMTL are controlled as follows: (1) by controlling the dielectric material formulation to achieve a specific dielectric dissipation factor while preserving its relative permittivity; (2) by controlling the overall plating of the inner and outer standoffs to control the conductive losses of the coaxial standoff; or (3) by realizing local resistive elements (Rs) 342A or 344A as referenced in FIG. 29, constructed through a selective/sequential resistive plating on the respective standoffs, or by using resistive washers.

In another embodiment, the coaxial standoff 340 is constructed as a semi-rigid structure comprising the inner standoff 342 made of a bendable tubular profile with ball-and-socket fastening features at its ends, the outer standoff 344 is made with thick walls in the PCB contact zone and thin walls over its length, and the dielectric standoff 343 made of a compliant dielectric material.

The mounting bolt 303 serves to clamp the coaxial termination 330 against the coaxial standoff 340 by engaging a mating feature of the inner standoff 342 using clamping methods as described herein for the inner standoff 342. The mounting bolt 303 is illustrated in FIG. 26, FIG. 28 and FIG. 29 in its threaded variant. In various embodiments, the mounting bolt 303 is made of a dielectric material to avoid any interference with the operation of the CMTL.

A Coaxial Tap for the CMTL

FIG. 30 through FIG. 36 illustrates various embodiments 3000, 3100, 3200, 3300, 3400, 3500, and 3600 of the coaxial tap 320. The coaxial tap 320 comprising a tap connector 322, a center hole in 325, a tap pin 328A of the tap connector 322 soldered to a landing pad 328B surrounded by a gap 328C, a set of microvia 328D, a tap stripline 328E, a tap resistive element 329, a tap pad 327, a via structure 326A, an inner landing pad 323A, an inner landing pad 323B, a pad 328F, a via structure 326B, a via structure 326D, a via structure 326C, an outer landing pad 324A, and an outer landing pad 324B.

The construction of coaxial tap 320 is based on the stack-up 210 of FIG. 14. Various changes can often be made during the manufacturing of the coaxial tap 320 based on 210 to meet local process capabilities and material availability, and such changes can be coordinated with the geometries and parameters of the PCB structures described herein. Non-essential PCB layers such as plating, soldermask or silkscreen normally employed in PCB manufacturing are left out for clarity.

Figure 34:
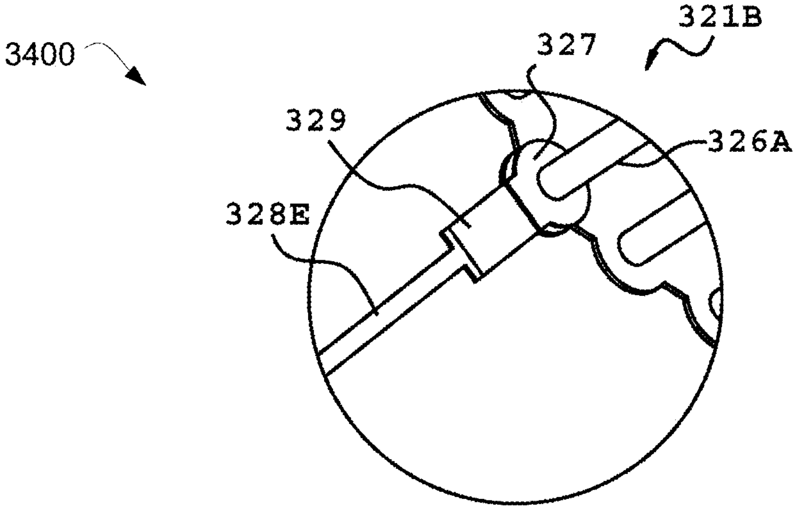
FIG. 34 is a magnified view of detail identified as 321B in FIG. 33.

With reference to FIG. 34, discussed next are layer assignments for the copper features of coaxial tap 320. The first layer 1402 includes the inner landing pad 323A, the landing pad 328B, and the outer landing pad 324A. The second layer 1404 includes the pad 328F, the tap stripline 328E, and the tap pad 327. The fourth layer 1408 includes the inner landing pad 323B and the outer landing pad 324B.

Figure 35:
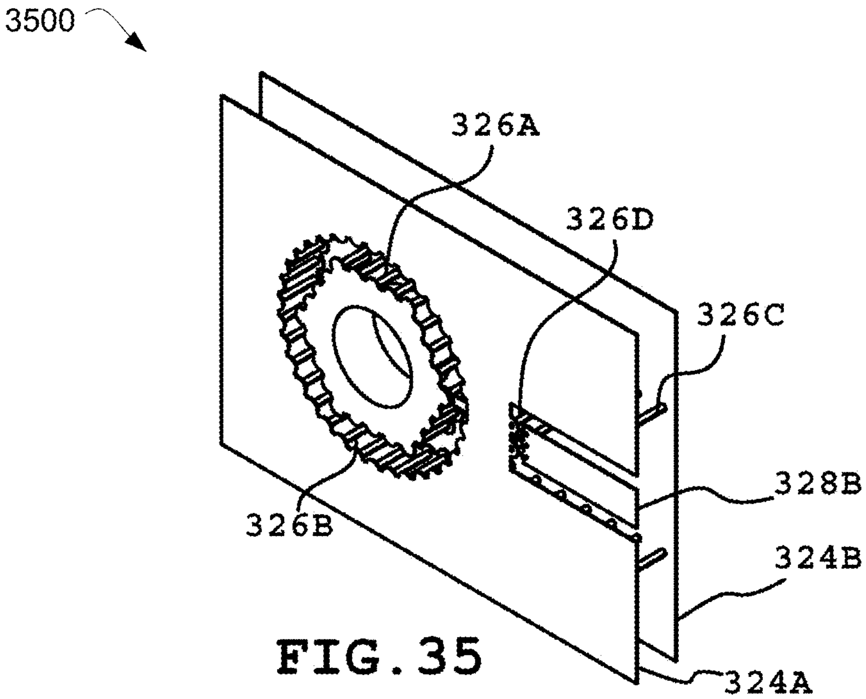
FIG. 35 is a front perspective view of the PCB conductive features of the coaxial tap in FIG. 30.
Figure 36:
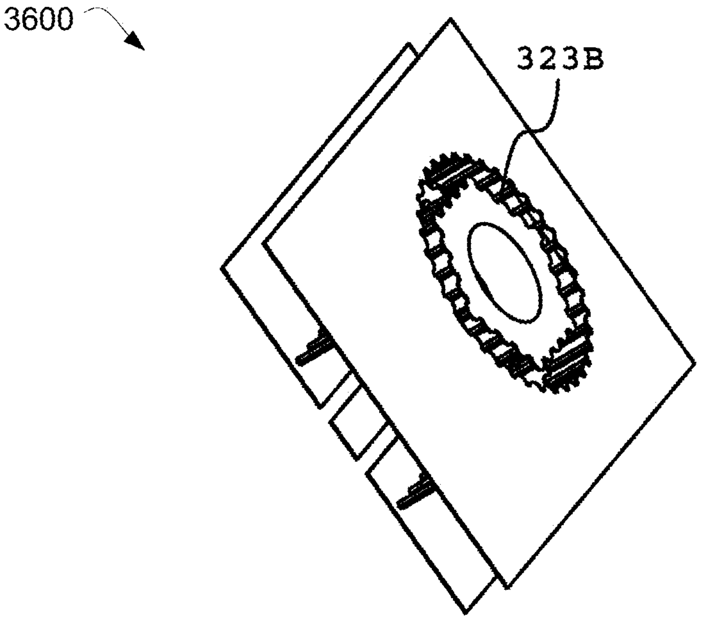
FIG. 36 is a rear view of the PCB conductive features of the coaxial tap in FIG. 35.
Figure 37:
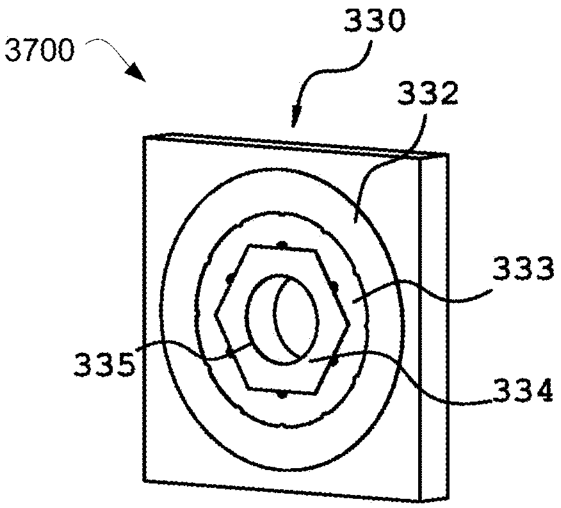
FIG. 37 is a front perspective view of a coaxial termination.
Figure 38:
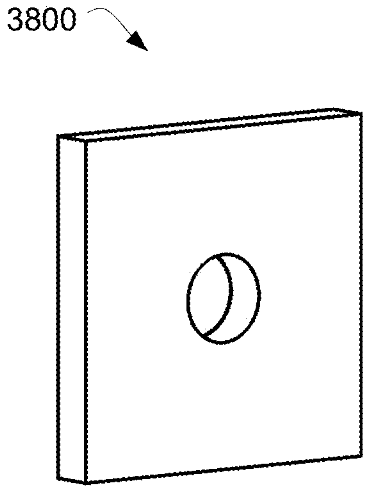
FIG. 38 is a rear view of the coaxial termination of FIG. 37.
Figure 39:
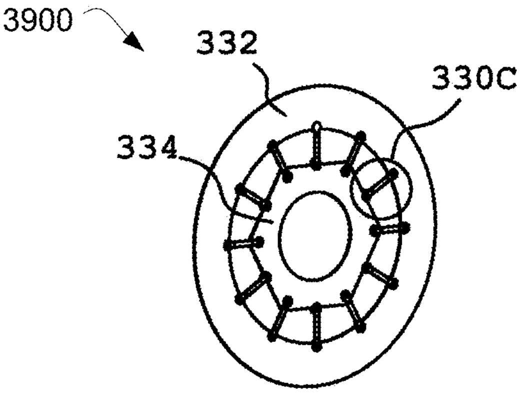
FIG. 39 is a perspective view of PCB conductive features of the coaxial termination in FIG. 37.
Figure 40:
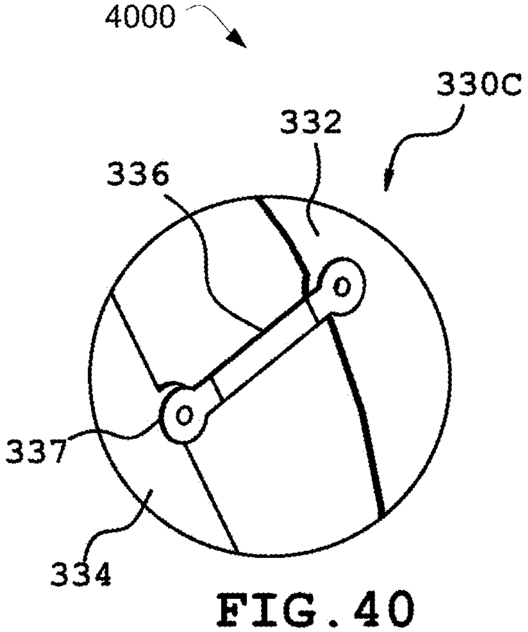
FIG. 40 is a magnified view of detail 330C in FIG. 38.
Figure 41:
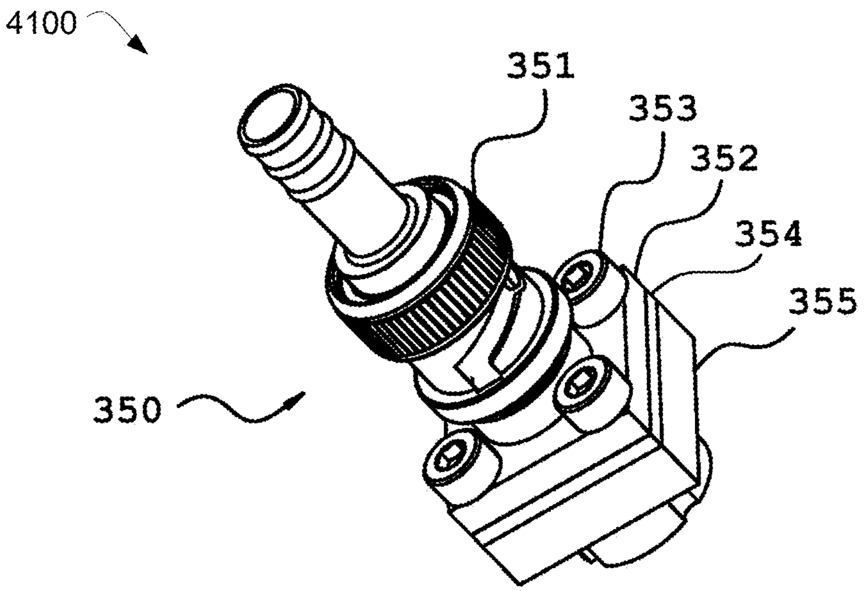
FIG. 41 is a top perspective view of an embodiment of a coaxial connector adapter.
Figure 42:
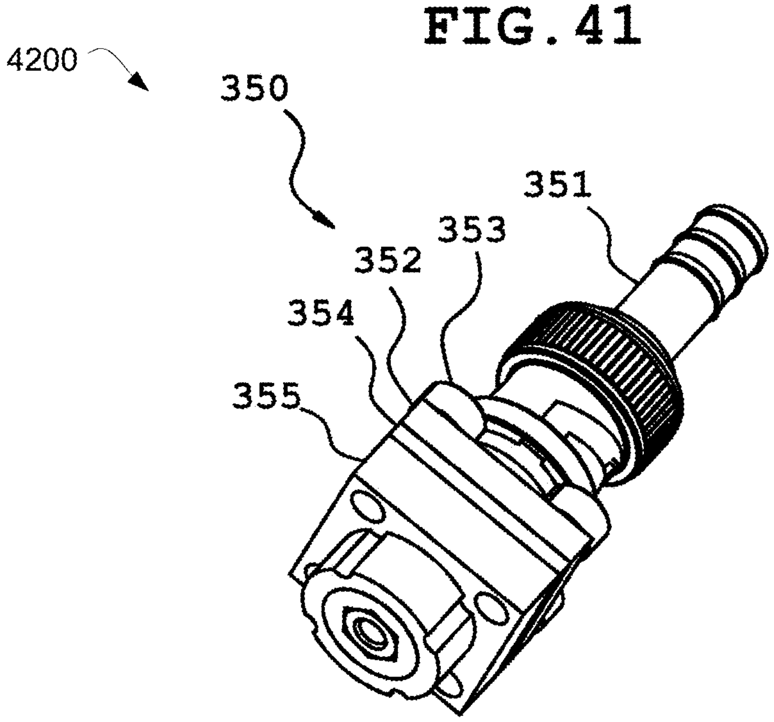
FIG. 42 is a bottom view of an embodiment of the coaxial connector adapter of FIG. 41.
Figure 43:
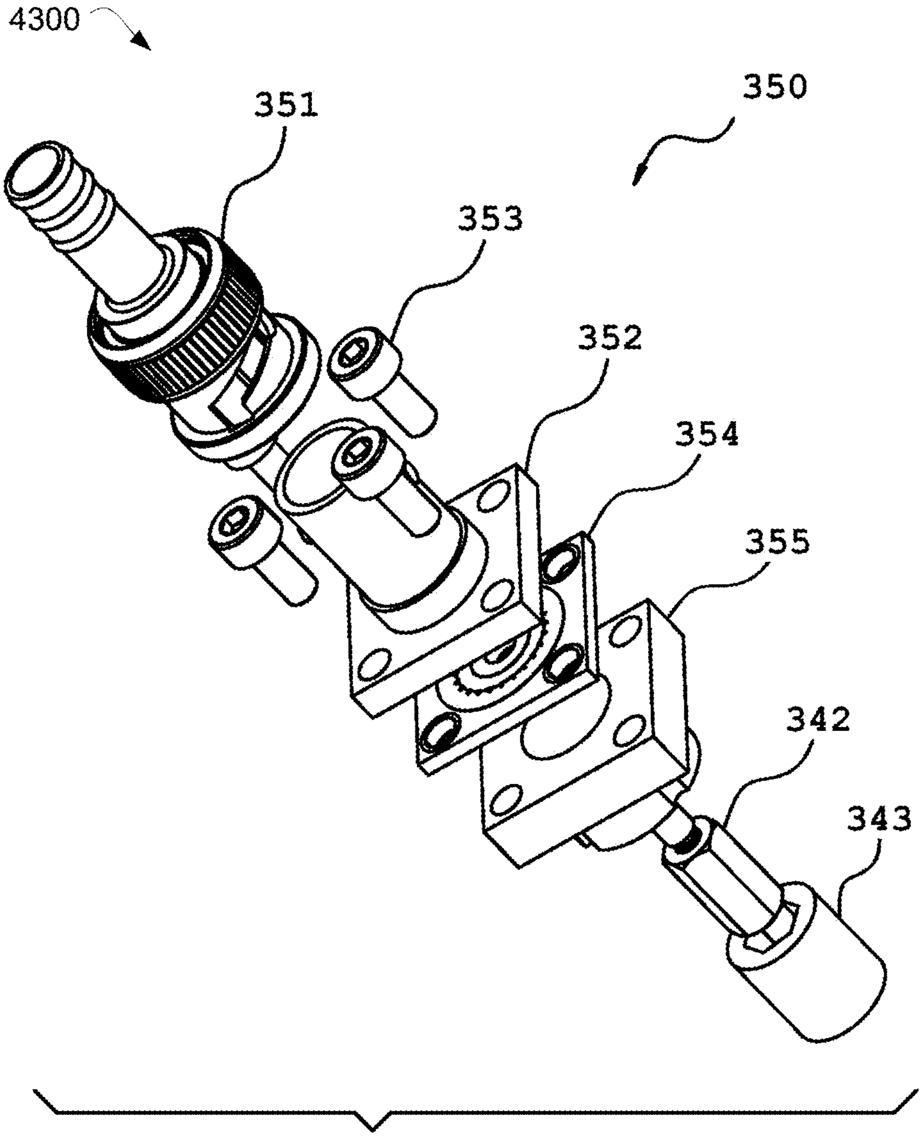
FIG. 43 is an exploded view of an embodiment of the coaxial connector adapter of FIG. 41.
Figure 44:
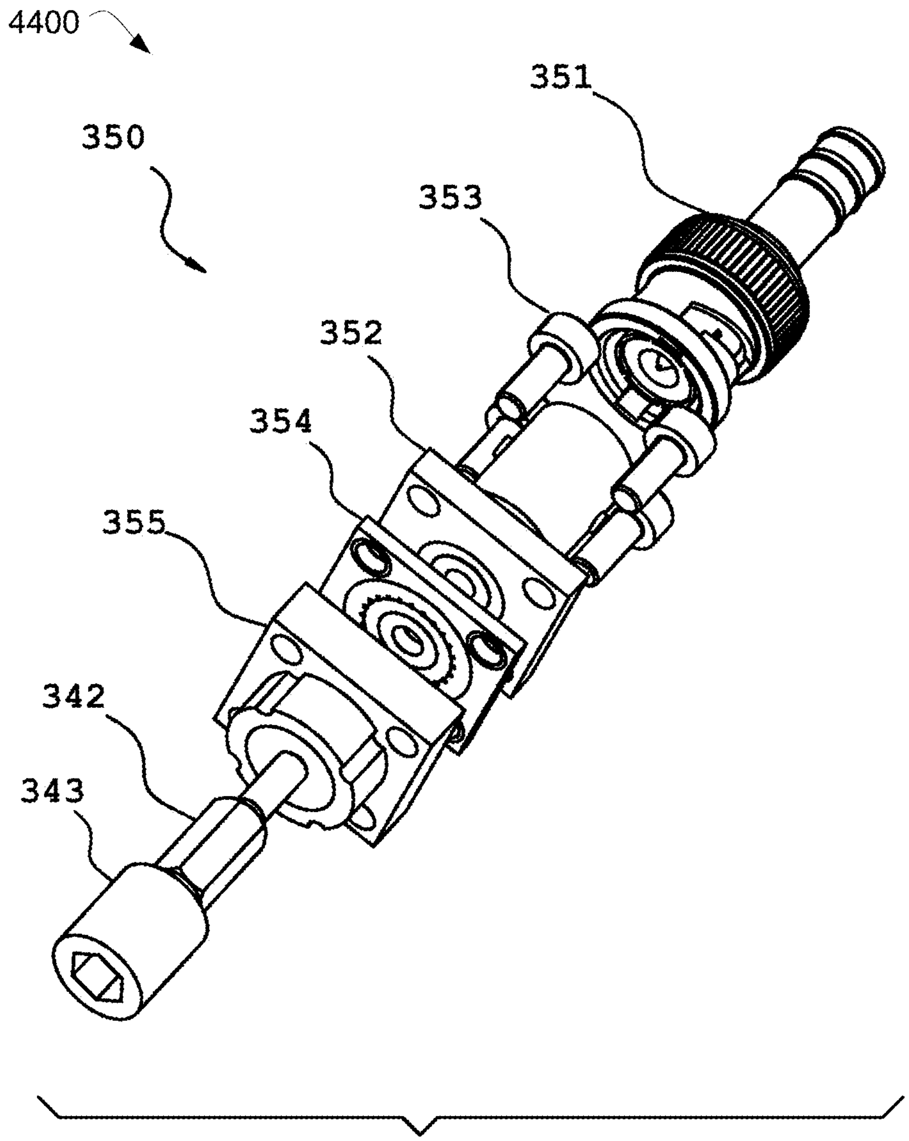
FIG. 44 is an exploded view of an embodiment of the coaxial connector adapter of FIG. 41.

With reference to FIG. 35, in some embodiments, the via structures 326A, 326B, 326C and 326D use vias of type V1-4 and have a finished hole diameter of 0.16 mm with landing pads on outer layers L1 1402 and L4 1408 of 0.55 mm diameter. In some embodiments, the set of microvia 328D uses microvia of type V1-2 and have a finished hole diameter of 0.1 mm and a landing pad diameter of 0.35 mm on layer L1 1402 and a landing pad diameter of 0.325 mm on layer L2 1404.

In some embodiments, the via structure 326A is built with a pitch of about 0.67 mm, forms the inner conductor of the coaxial structure of the CMTL over the thickness of the PCB, and connects the inner landing pads 323A and 323B. The geometry of the via structure 326A is coordinated with the geometry of the inner landing pads 323A and 323B and with the outer geometry of the inner standoffs 342 for the best match to limit the wave reflections at their contact interface. Further, the plating of the inner landing pads 323A and 323B is coordinated with the plating of the inner standoffs 342 and their conductive compliant gasket to prevent corrosion or electromigration at their contact interface.

In some embodiments, the compliant conductive gasket used between the inner standoff 342 and the inner landing pads 323A and 323B is realized through a form-in-place technology that deposits a layer of the desired material that is cured before the assembly and may be done onto the standoff 342 sitting surfaces or onto the said pads on PCB.

In some embodiments, the via structure 326B is built with a pitch of about 0.63 mm between vias, forms the outer conductor of the coaxial structure of the CMTL through the PCB, and connects the outer landing pads 324A and 324B. The geometry of the via structure 326B is coordinated with the geometry of inner void of the outer landing pads 324A and 324B and with the inner geometry of the outer standoffs 344 for the best match to limit the wave reflections in the coaxial waveguide at their contact interface. The plating of the outer landing pads 324A and 324B is coordinated with the plating and the size of the outer standoffs 344 to prevent corrosion or electromigration at their contact surface. The via structure 326C connecting the outer landing pads 324A and 324B serves to prevent RF fringe leaks from the tap stripline 328E on layer L2 1404 and is built with a pitch of about 1 mm between the vias.

In some embodiments, the via structure 326D is made of two vias between the outer landing pads 324A and 324B and is an integral part of the transition between the tap connector 322 and the tap stripline 328E.

In various embodiments, a tap transmission line is formed between the tap connector 322 and the tap resistive element 329 comprising the landing pad 328B, the set of microvia 328D, the pad 328F and the tap stripline 328E.

In one example, the tap stripline 328E is realized as a controlled impedance of 50 Ohm matching the impedance of the tap connector 322 on layer L2 1404 and has a nominal width of about 0.125 mm and an approximate length of 2 mm. The pad 328F has a width of about 0.35 mm and a length of about 0.8 mm to fit the set of microvia 328D over the width of the landing pad 328B. The tap stripline 328E passes between the vias of the via structure 326D and through a gap in the via structure 326B. In various examples, the length of the via stripline 328E is kept to a minimum.

In one example, the tap resistive element 329 in is realized through sequential etching on a thin-film resistive layer of 25 Ohms per square embedded with the copper layer L2 1404, has a finished length of 0.63 mm and width of 0.35 mm for a final resistance of 45 Ohm, and is connected at one end with the tap stripline 328E and to the other end with the tap pad 327. The tap pad 327 is connected to one of the vias of the via structure 326A and its size is kept to a minimum in a preferred embodiment.

A Tap Device Card for the CMTL

One or more stacked data terminals cards 310 can be connected in a CMTL, if provided with adequate coaxial structures in the printed circuit cards similar to the ones used for the coaxial tap 320. The realization of the coaxial tap circuit of the tap device card 310 follows the teachings given for the coaxial tap 320 with the following differences.

In at least one embodiment, the PCB dielectric for the tap device card 310 can match the dielectric of all coaxial dielectrics used in the CMTL.

In at least one embodiment, if a dielectric match is not possible, then there may be a performance loss in the way that the wave reflections along CMTL line will increase and create accentuated peaks and valleys for the tap-to-tap insertion loss characteristics with the problem worsening as the number of tap device cards grows. A simulation can be used for an accurate performance prediction.

In at least one embodiment, tap pad 327, resistive element 329, and the tap stripline 328E can be implemented in the closest layer to the layer of the tap device 311 to minimize via parasitics.

In at least one embodiment, the tap stripline is connected to the tap device 311 through a via-in-pad microvia, wherein the tap stripline is straddled by a pair of through hole vias connecting the reference ground planes used for the stripline in the immediate proximity of the said microvia.

In at least one embodiment, the impedance of the tap stripline is matched with the impedance of the tap device.

In at least one embodiment, the value of the tap resistive element is determined using equation (5).

In at least one embodiment, stray RF currents are avoided in the via structure 326B by connecting it to the tap device card 310 ground planes only at the two vias straddling the stripline 328E at its exit from the coaxial structure.

In at least one embodiment, the coaxial structure zone is kept clear from any routing on the tap device card 310.

A Coaxial Termination for the CMTL

FIG. 37 through FIG. 40 illustrate various embodiments showing construction details 3700, 3800, 3900, 4000 for the coaxial termination 330 according to another embodiment of present disclosure. The coaxial termination 330 comprising a landing pad 332, a gap 333, a landing pad 334, a hole 335, a plurality of termination resistive elements 336 and a plurality of copper attachment features 337.

The coaxial termination 330 is implemented on a PCB manufactured based on stack-up 210 of FIG. 14. The landing pads 332 and 334 are constructed on layer L1 1402 with their geometry and manufacturing details matching the geometry and manufacturing details given for the coaxial tap 320 and coaxial standoff 340.

In this embodiment, there are twelve termination resistive elements 336 identically realized through sequential etching on a thin-film resistive layer of 25 Ohms per square embedded with the copper layer L2 1404. Each such resistive element has a finished length of 0.8 mm and width of 0.162 mm for an individual resistance of 123 Ohm and total equivalent termination resistance of 10 Ohm that matches the impedance of the coaxial standoff 340 and coaxial tap 320 driven by their geometry and dielectric choice.

The radial structure of the termination resistive element 336 optimizes the frequency bandwidth of the termination alone well beyond 20 GHz. The termination resistive elements 336 are connected between the inner landing pad 334 and the outer landing pad 332 over the copper attachment features 337 using microvia of type V1-2. The termination resistive elements 336 may be realized on same layer L1 1402 as the landing pads 332 and 334 realizing the coaxial termination 330 on a PCB with a single layer including the embedded thin-film resistive layer.

A Coaxial Connector Adapter for the CMTL

FIG. 41 through FIG. 44 illustrate various embodiments showing construction details 4100, 4200, 4300, 4400 for another embodiment that is a coaxial connector adapter 350 comprising a male coaxial connector 351, a female coaxial connector 352, four mounting bolts 353, a coaxial PCB adapter 354, a coaxial standoff adapter 355.

In various embodiments, the coaxial connector adapter 350 is built to match the geometry and impedance of the other coaxial elements of the CMTL of 10 Ohm. The male coaxial connector 351 is of BNC style with its dielectric and geometry adapted to match the CMTL impedance of 10 Ohm, has a coaxial cable crimping features at one end and engages into the mating female coaxial connector 352 at the other end.

The coaxial PCB adapter 354 is of a dielectric, structure, dimensions, and construction details similar to the coaxial tap 320 with the exception of the tap resistive element 329 and associated elements and with the addition of four pass through mounting holes matching the hole size and pattern of the female coaxial connector 352.

The construction of the inner standoff 342, the dielectric standoff 343 and the coaxial standoff adapter 355 as a group follows the details given for the coaxial standoff 340. The coaxial standoff adapter 355 has a geometry and construction derived from the outer standoff 344 with its outer construction facing the female coaxial connector 352 matching respective geometry with four threaded holes matching the position of the pass-through holes in the female coaxial connector 352 and the coaxial PCB adapter 354. The rest of the construction of the coaxial standoff adapter 355 is identical to the outer standoff 344 to complete the adaptation. The coaxial standoff adapter 355 is clamped against the female coaxial connector 352 with the coaxial PCB adapter 354 as an interface between them, by the four threaded bolts 353. The inner standoff 342 is threaded against its matching thread in the female coaxial connector 352.

An assembly made of two coaxial connector adapters 350 with the matching coaxial cable 301 is intended to increase the flexibility and reach of the CMTL.

Modeling and Simulations for the CMTL

Figure 45:
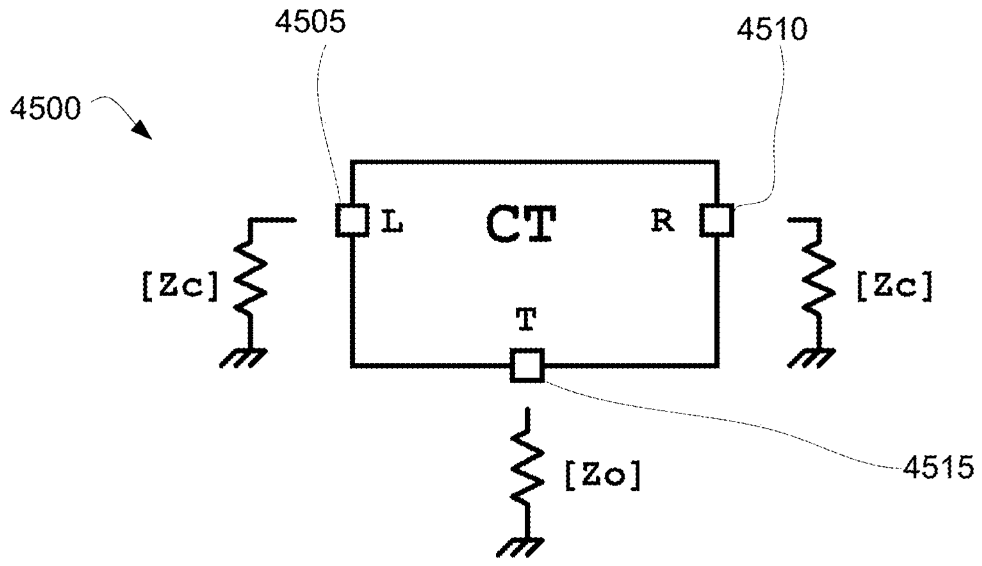
FIG. 45 is a schematic diagram of a model of a coaxial tap.

FIG. 45 shows the connection diagram of a coaxial tap CT 4500 modeled in a manner analogous to that discussed with respect to FIGS. 28-36. In the illustrated embodiment of FIG. 45, the coaxial tap model has the coaxial tap 320 at the center with two coaxial standoffs 340 7 mm long on each side with their respective open ends identified as port L and port R, and the open end of tap connector 322 is identified as port T.

Figure 46:
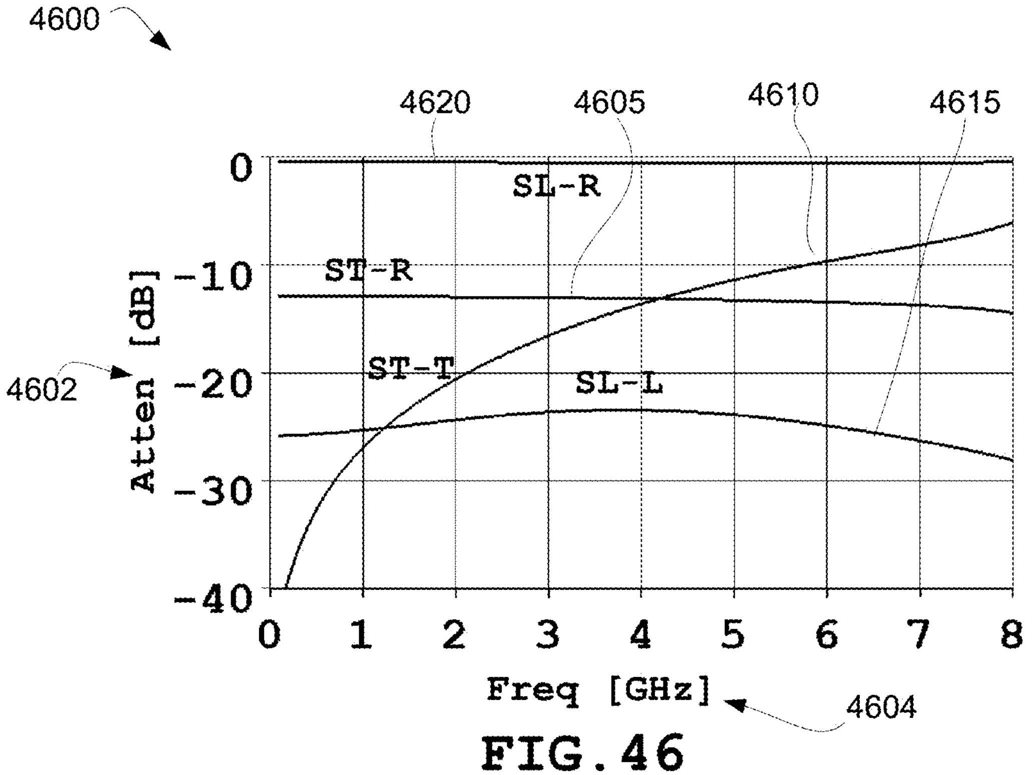
FIG. 46 is a plot showing the frequency dependency of S parameters for the model in FIG. 45.

FIG. 46 illustrates the S-parameters for a coaxial tap model, such as coaxial tap model 4500 of FIG. 45. The S-parameters can be extracted and plotted using a 3D EM software. Graph 4600 shows attenuation on the y-axis 4602 as a function of frequency on x-axis 4604.

As shown, graph 4600 shows a first plot SL-R 4620, which indicates the insertion loss between a left port L 4505 and a right port R 4510 equivalent to the longitudinal insertion loss LIL defined by equation (8) and plotted in FIG. 7. Plot ST-R 4605 indicates the insertion loss between left port L 4505 and right port R 4510 equivalent to the transversal insertion loss TIL defined by equation (9) and shown in FIG. 7. Plot ST-T 4610 is the return loss at the tap port T 4515, and plot SL-L 4615 represents the return loss at left port L 4605.

As seen in FIG. 46, plot SL-R 4620 is low, as expected for a line about 15 mm long and a tap port well isolated by an embedded tap resistive element (Rt) of very low parasitics, where the slope is caused mainly by the dielectric and conductive losses in the coaxial standoff and the PCB. Plot ST-R 4605 is close to predicted TIL of about −13 dB for Zc=10 Ohms as seen in FIG. 7. Plot SL-L 4615 has an attenuation below −20 dB denoting little reflections along the tap. Plot ST-T 4610 shows very low attenuation for low frequencies, while its performance degrades at higher frequencies. The sources for this degradation may stem from the following two causes: (1) the transition between the tap connector 322 and the tap stripline 329E and (2) the transition of tap stripline 329E through the dielectric zone between the via outer structure 326B and the inner via structure 326A.

Figure 47:
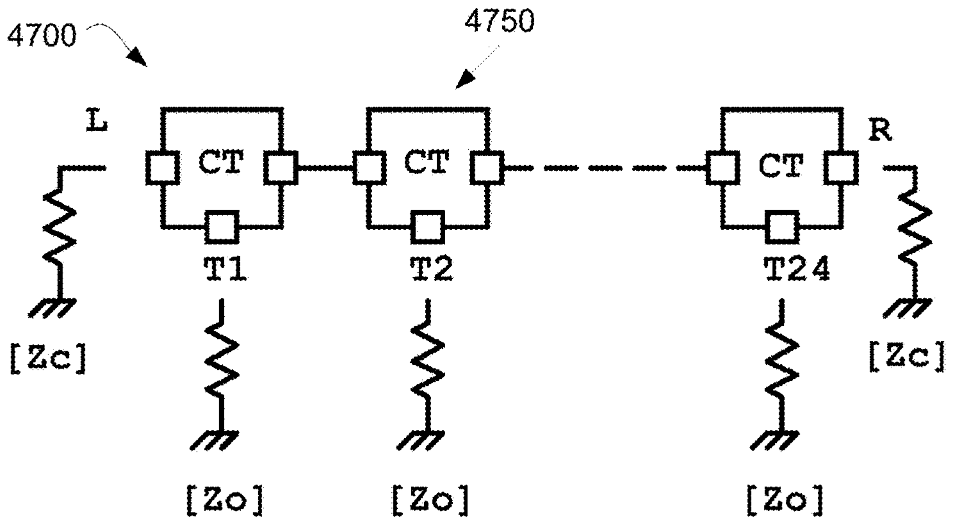
FIG. 47 is a schematic diagram of a model of a coaxial multi-tap transmission line.

The S-parameters extracted for the tap modeled in FIG. 45 can be plugged into a circuit as in FIG. 47 to model the behavior of a CMTL assembled of 24 identical coaxial taps 320 separated by coaxial standoffs 340 each 14 mm long and terminated at both ends on its characteristic impedance of Zc=10 Ohm.

Figure 48:
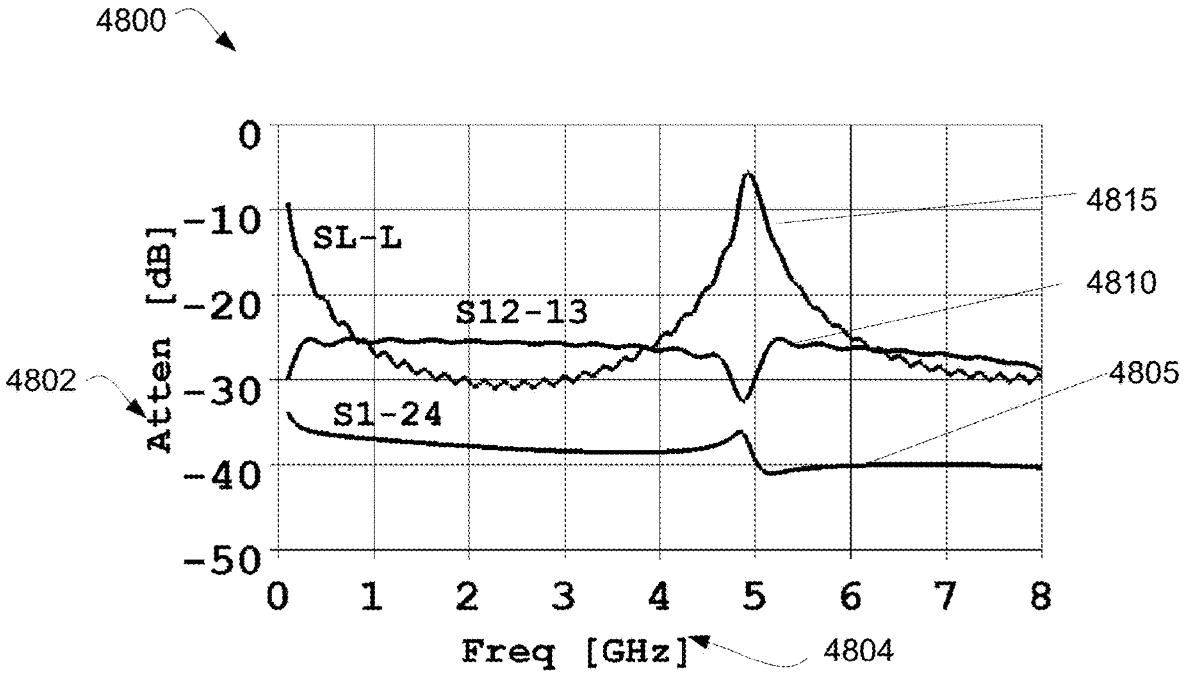
FIG. 48 is a plot showing the frequency dependency of S parameters for the model in FIG. 47.

FIG. 48 provides plots 4800 for modelling the insertion losses 4802 as a function of frequency 4804. Plot (S1-24) 4805 represents the insertion loss between tap ports at each end of the CMTL to evaluate the highest insertion loss. With respect to FIG. 47, tap ports at each end include the first tap port (T1) and the last tap port (T24).

Plot (S12-13) 4810 represents the insertion losses between adjacent tap ports to evaluate the lowest insertion loss. With reference to FIG. 48, adjacent tap ports in the middle of the CMTL include the 12th tap port (T12) and the 13th tap port (T13).

Plot (SL-L) 4815 represents the return losses on the left port to evaluate the reflections along the CMTL.

Plot (SL-L) 4815 replicates a similar behavior observed for the PMTL with a poorer overall performance caused by missing a higher optimal resistive element (Rs) from the tap circuit in FIG. 4 (comparatively about 0.1 Ohm missing for the PMTL versus 0.5 Ohm missing for the CMTL).

The peak value for plot (SL-L) 4815 is at 4.9 GHz for CMTL compared to about 4.3 GHz found for the PMTL. This is caused by the shorter tap length for the CMTL. Plot (S12-13) 4810 is in average as predicted by equations (1) to (3) or FIG. 7 with a low at 4.9 GHz correlated with the high on plot (SL-L) 4815 and caused by the reflections along the CMTL. Plot (S1-24) 4805 show a satisfactory insertion loss around −40 dB, matching expectations, but with lower slope as compared to PMTL.

Design Recommendations for the CMTL

In at least one embodiment, the CMTL is designed and constructed using the following method, including evaluating the instructions given for the PMTL design and considering the lowest possible transversal sectional geometry for the coaxial. Next, the method includes computing its impedance and then evaluating the worst-case loss for the highest number of taps planned for the CMTL. The method further includes building a coaxial line of the intended geometry and measuring its insertion loss over frequency. Next, the method includes repeating the insertion loss measurement for multiple plating formulations for the inner metallic structure to separate the dielectric losses from conductive losses and using selective resistive ring plating or resistive washers to implement the resistive elements (Rs) 342A and/or 344A illustrated in FIG. 29 to optimize the CMTL for lowest reflections, and using metallic shielding caps over the mounting bolts 303 if the RF radiated emissions by the aperture of the coaxial termination 330 are too high.

Figure 49:
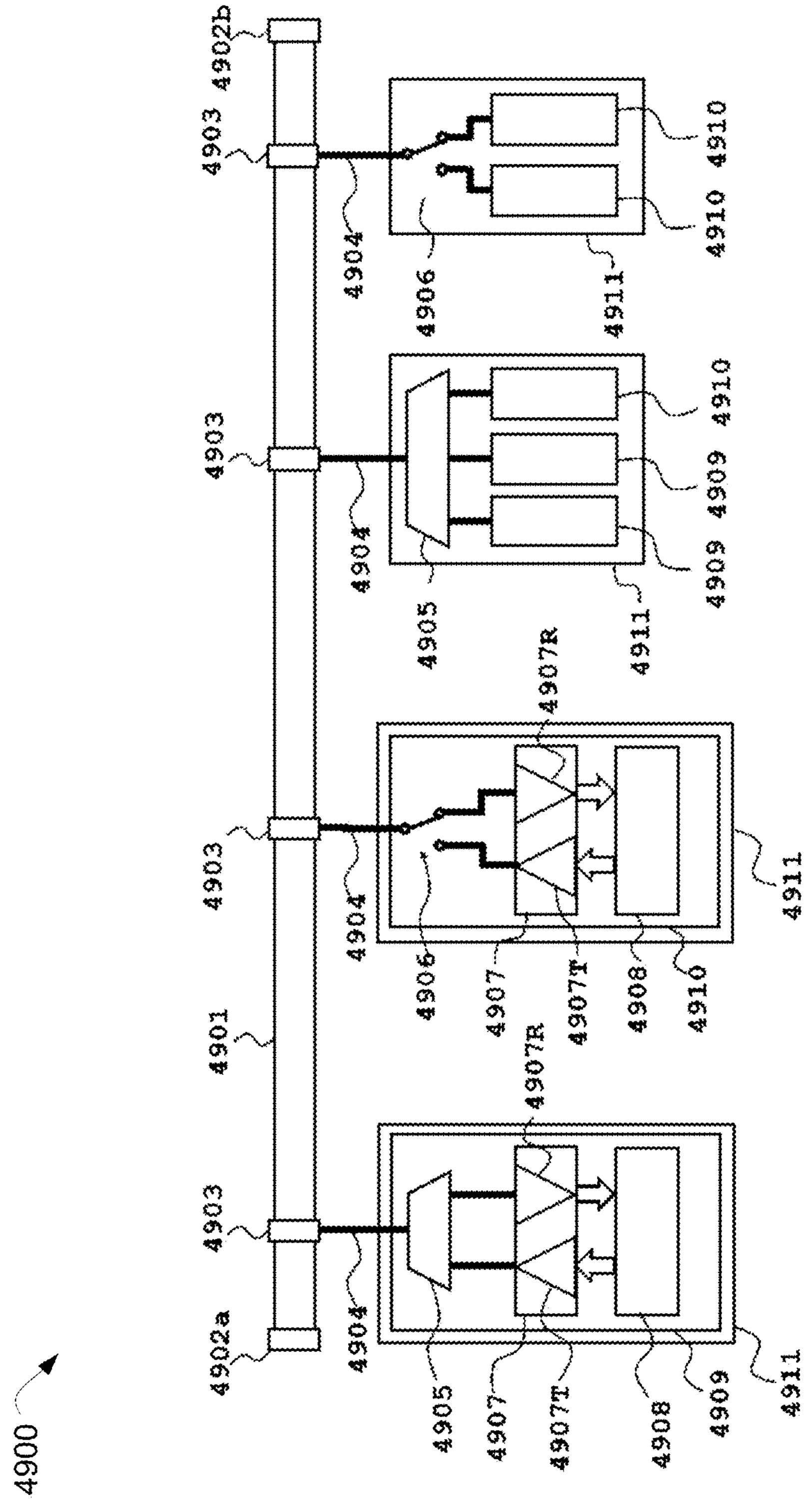
FIG. 49 is a diagram showing a frequency division multiple access tap device, a time division multiple access tap device, and a combination tap device.

FIG. 49 provides a representation 4900 of a multi-tap transmission line 4901 according to an embodiment. As shown, the multi-tap transmission line 4901 includes a first end 4902*a* and a second end 4902*b*. The multi-tap transmission line 4901 also includes two or more tap circuits connected to the transmission line 4901 at a corresponding tap port 4903.

In the illustrated embodiment, the transmission line 4901 includes various tap devices 4909, 4910, and 4911. In one embodiment, the tap device includes at least one of a frequency division multiple access tap device 4909, a time division multiple access tap device 4910, and a combination tap device 4911. Frequency division multiple access and time division multiple access are techniques widely known in wireless communications that can be conveniently applied to the new transmission medium provided by the multi-tap transmission line 4901.

In this embodiment, terminations 4902*a,b* have an impedance that is the same as the characteristic impedance Zc, which provides the advantage of minimizing or eliminating signal reflections within the transmission line 4901. The transmission line serves as a communication medium between a plurality of tap devices 4911 connected to the multi-tap transmission line 4900 through a plurality of tap ports at a tap line 4904.

The tap devices 4911 may come in the form of a RF transmitter output 4907T, a RF receiver input 4907R, combined input and output of a RF transceiver 4907, RF multiplexer 4905, an RF switch 4906, data terminal 4908, combined streams of one or multiple RF transceivers, the test port of a vector network analyzer VNA, the test port of a time domain reflectometry TDR analyzer, a termination, or any other suitable RF device. In some cases, the tap device 4911 may be similar to an antenna tower that provides access for a plurality of RF appliances to the transmission medium provided by the multi-tap transmission line 4901. Various known techniques of wireless technology can be applied to fully take advantage of the multi-tap transmission line 4901.

In at least one embodiment, the tap line 4904 can be connected to a tap line 4904 of another multi-tap transmission line, such as transmission line 4901.

Figure 50:
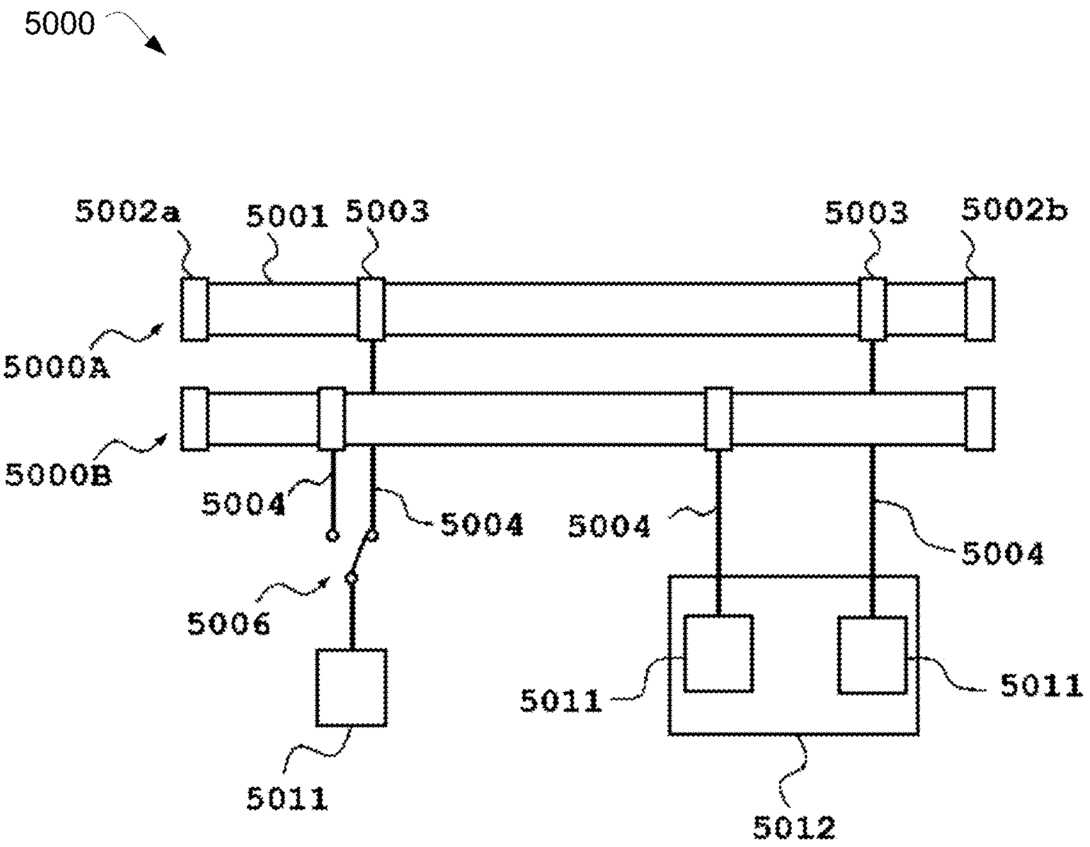
FIG. 50 is a diagram showing a redundant multi-tap transmission line system.

Reference is next made to FIG. 50, which illustrates a schematic representation 5000 of a redundant multi-tap transmission line system consisting of a first multi-tap transmission line 5000A and a second multi-tap transmission line 5000B. As shown, the tap port 5003 of the first multi-tap transmission line 5000A is connected to the second multi-tap transmission line 5000B, providing redundancy to the first line 5000A. In this embodiment, the multi-tap transmission lines 5000A and 5000B are terminated at both ends with terminations 5002*a*, 5002*b*.

In some embodiments, the transmission line 5001 may need to have higher availability or reliability. For these cases, it can be useful to conveniently deploy multiple transmission lines to increase system redundancy. When a first line 5000A is severed, the tap device 5011 can be switched to the secondary 5000B using the RF switch 5006. In some embodiments, the secondary line 5000B can be useful for doubling the tap devices 5011. As shown, a dual tap device 5012 can be used for digital switching. The tap device 5012 can be connected to the tap port 5003 by a tap line 5004. This may be more convenient than an RF switch 5006. The secondary line 5000B can therefore provide the advantage of providing extra bandwidth in normal operation, or as a backup of the first line 5000A.

Figure 51:
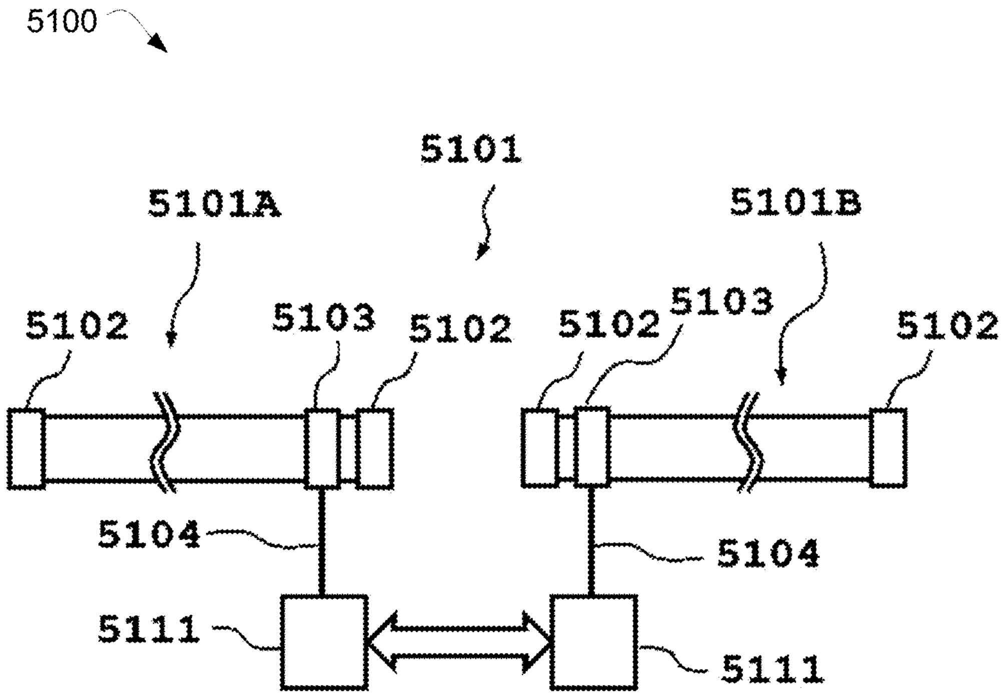
FIG. 51 is a diagram showing bridging of a multi-tap transmission line.

Reference is next made to FIG. 51, which illustrates a schematic representation 5100 of bridging of a multi-tap transmission line 5101. In this embodiment, the multi-tap transmission line comprises a first section 5101A and a second section 5101B. Each of the sections 5101A,B are terminated at a first and a second end 5102, and can include at least one tap port 5103 on each section. The tap ports 5103 are connected to a tap device 5111 by a tap line 5104. A tap device 5111 on the first section 5101A is connected or coupled to a tap device 5111 on the second section 5101B, bridging the first section 5101A to the second section 5101B. Multi-tap transmission line bridging can be used to expand the length of a transmission line for specific frequency channels, or to simply bridge certain data links across multiple MTLs.

Figure 52:
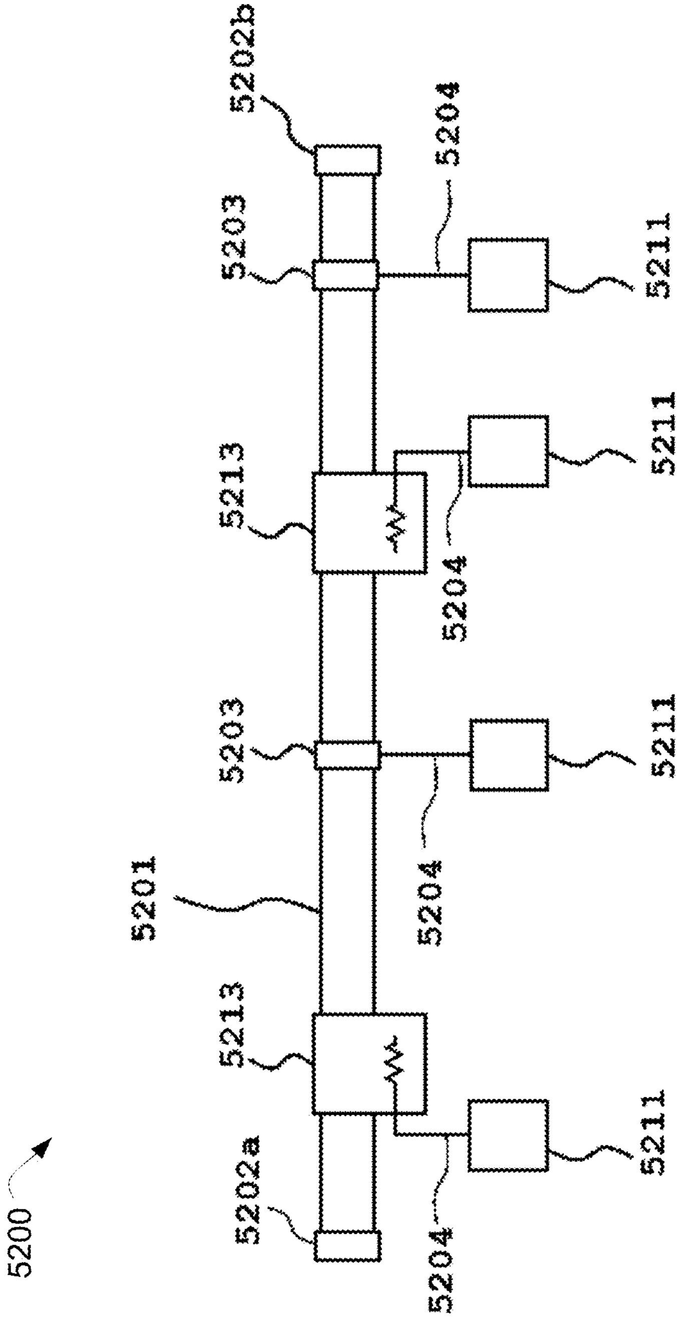
FIG. 52 is a diagram showing a multi-tap transmission line with narrowband couplers and taps.

Reference is next made to FIG. 52, which illustrates a schematic representation 5200 of a multi-tap transmission line 5201 according to an example embodiment. In this embodiment, the multi-tap transmission line 5201 terminates at ends 5202*a*, 5202*b*. The multi-tap transmission line 5201 is coupled to narrowband couplers 5213 as well as taps 5203 connected to tap devices 5211 with a tap line 5204. A narrowband coupler 5213 can be used where lower insertion loss is needed in a specific frequency band. They may be directional, which may provide advantages in specific configurations.

Use Cases for the Multi-Tap Transmission Line

The multi-tap transmission line described in at least one of the above embodiments can be used in a plurality of applications or use cases in which a plurality of RF devices are communicatively connected to one another to transmit at least one RF signal.

Figure 53:
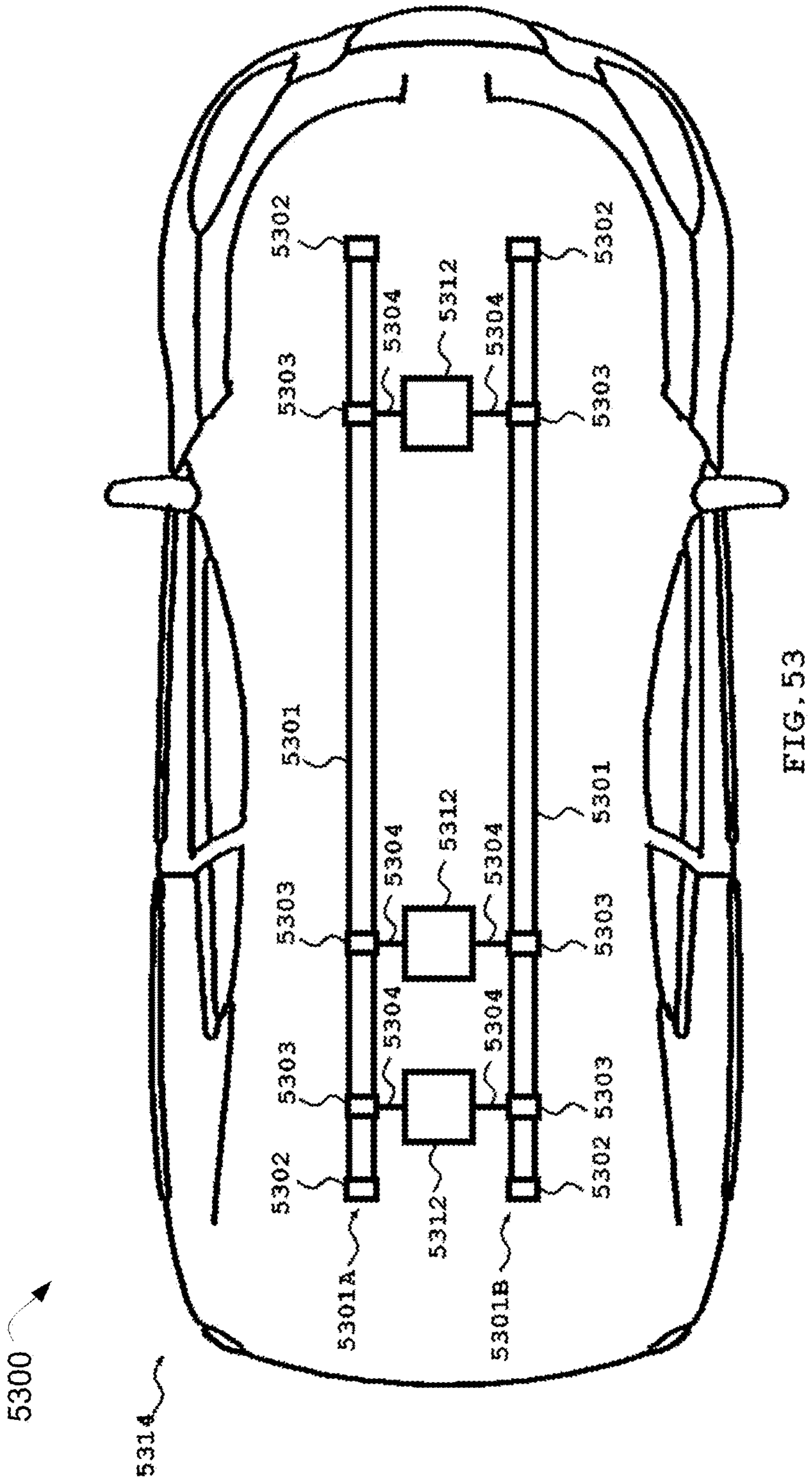
FIG. 53 is a diagram showing a multi-tap transmission line system adapted for an automotive use-case.

In at least one embodiment, the multi-tap transmission line is implemented for use in a vehicle including, but not limited to cars, trains, boats, trucks, or any other vehicle which requires a plurality of devices that are communicatively coupled to transmit and receive data. FIG. 53 is a schematic representation 5300 showing a multi-tap transmission line system 5301 adapted for an automotive use-case 5314.

As shown, the system 5300 consists of a first multi-tap transmission line 5301A and a second multi-tap transmission line 5301B. Each multi-tap transmission line 5301A, 5301B terminates at termination points 5302. The tap devices 5312 are coupled to the first and the second transmission lines 5301A, 5301B at respective tap ports 5303 through respective tap lines 5304. Each transmission line 5301A, 5301B has a corresponding characteristic impedance value (Zc). The tap devices coupled to the transmission line 5301 at a corresponding tap port 5303 has a corresponding tap impedance value (Zo). In at least one embodiment, the characteristic impedance value Zc is lower than, and in some case, substantially lower than each tap impedance value Zo. In at least one embodiment, the first end impedance and second end impedance remain matched to the transmission line as the tap devices 5312 are connected to the multi-tap transmission line 5300.

The MTL, such as MTL 5301A, 5301B shown in FIG. 53, used in cars allows heterogeneous software defined radio networking architectures to interconnect a wide variety of sensors and compute nodes over a shielded shared transmission medium. The MTL of FIG. 53 can be constructed as a flex printed circuit board in a self-adhesive tape. This may provide advantages, such as, low weight, ease of design, fabrication and installation as compared traditional and conventional wiring systems used in cars. Redundant MTL can be easily installed and operated to provide increased system reliability. A tap device is built in this embodiment with capability to switch from a MTL that lost its function through physical damage to an alternate MTL.

In at least one embodiment, the tap devices 5312 can be vehicle sensors, an Engine Control Unit (ECU), a gateway, and an AI node. In a vehicle, the sensors can collect data about various parameters such as speed, temperature, pressure, and more. These sensors send signals to the Engine Control Unit (ECU), which is responsible for controlling various functions like fuel injection, ignition timing, and emissions control. AI nodes in vehicles are nodes that incorporate artificial intelligence algorithms. These nodes can be used for various purposes, such as autonomous driving, predictive maintenance, and advanced driver assistance systems (ADAS).

As such, these signals need to be transmitted in real time, and require high frequency and bandwidth to transmit. In at least one embodiment, the multi-tap transmission line has at least 24 tap devices 5312. This is typical for an automotive implementation, but it can be appreciated that any number of tap devices can be used.

In at least one embodiment, the multi-tap transmission line is constructed as a flex printed circuit board having a self-adhesive tape. In at least one embodiment, a multi-tap transmission line further comprises a secondary multi-tap transmission line to provide redundancy for improving vehicle safety. In at least one embodiment, the tap device switches from the primary multi-tap transmission line 5301A to the secondary multi-tap transmission line 5301B using an RF switch.

Figure 54:
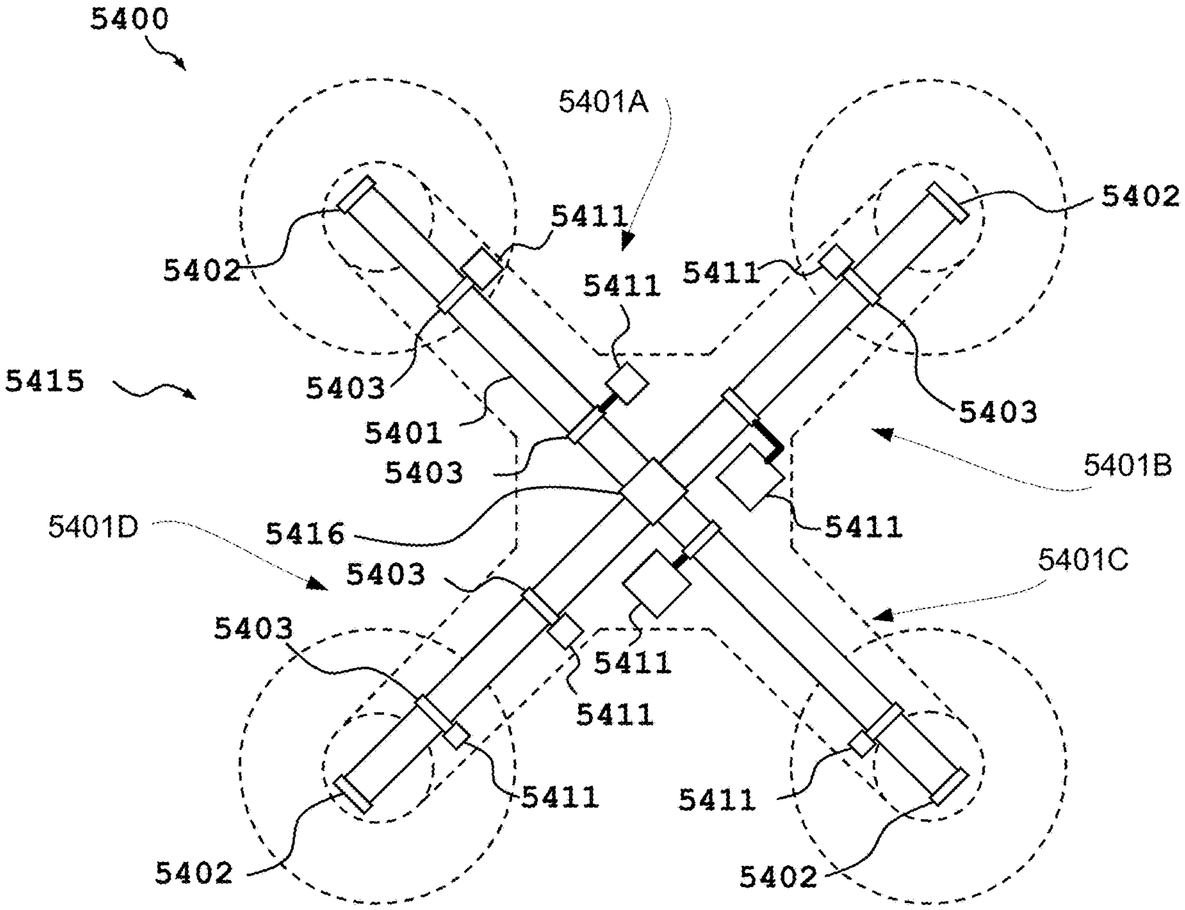
FIG. 54 is a diagram showing a multi-tap transmission line system in a branched configuration, adapted for a drone use-case.

Reference is next made to FIG. 54, which illustrates a schematic representation of a multi-tap transmission line system in a branched configuration 5400 according to an example embodiment. The multi-tap transmission line system 5400 can be adapted for any remotely operated vehicle (ROV), manned or unmanned aerial vehicles (UAV/AV) or drones 5415, etc.

As shown, the system 5400 consists of four MTL branches, such as a first transmission line 5401A, a second transmission line 5401B, a third transmission line 5401C and a fourth transmission line 5401D. Each transmission line 501A-501D has a first end 5402 on one side, and a common node 5416 in the middle. Common node 5416 is a resistive power splitter with four ports, each port coupled to each transmission line 5401A-5401D, as shown in FIG. 55. Each transmission line 5401A-5401D has the same corresponding characteristic impedance value (Zc).

Further, each transmission line 5401A-5401D has two or more tap devices 5411 connected to it at a corresponding tap port 5403. Each tap port 5403 has a corresponding tap impedance value (Zo), where the characteristic impedance value Zc is lower, and in some cases substantially lower, than each tap impedance value Zo. In various embodiments, transmission lines 5401A-5401D are configured and optimized based on the teachings herein.

In at least one embodiment, the tap devices 5411 can be ROV sensors, an ROV Engine Control Unit (ECU), an ROV gateway, and an ROV AI node. In an ROV, the sensors can collect data about various parameters such as airspeed, temperature, pressure, and more. These sensors send signals to the ROV Engine Control Unit (ECU), which is responsible for controlling various functions like battery life, takeoff, landing and flight path. ROV AI nodes in vehicles are nodes that incorporate artificial intelligence algorithms. These nodes can be used for various purposes, such as autonomous flying, predictive maintenance, and flight path determination.

As such, the placement of the tap devices 5411, such as sensors, can have limitations as the ROV may need to be weight-balanced and as lightweight as possible to optimize operation. Implementing the multi-tap transmission line, as shown in FIG. 54, can provide a light-weight system that can replace cables such as ethernet or coaxial cables. This also provides the advantages and ability to place devices 5411, such as sensors, strategically to distribute weight evenly.

Referring to FIGS. 54 and 55 in conjunction, shown in FIG. 55 is a schematic representation 5500 of the power splitter 5516 with the same characteristic impedance Zc as the multi-tap transmission lines 5401A-5401D. In the embodiment, shown in FIGS. 54 and 55, four branches are shown. However, it can be understood that the power splitter 5516 can comprise any number of branches, such as 2, 3, 4, 5, 6 . . . N, and accordingly the transmission line 5400 can consist of different number of branches corresponding to the number of branches in the power splitter 5516. In at least one embodiment, the multi-tap transmission line can be multiply branched, where one transmission line, such as transmission line 540A, 5401B, 5401C or 5401D, is further branched into a plurality of lines.

In one embodiment, a second multitap transmission line can be added to the first multitap transmission line as a tap device. In one embodiment, the tap device is another multitap transmission line.

In the embodiment shown in FIG. 55, a branched transmission medium is shown. This can be useful in drone and similar applications where compute and sensor nodes are ideally placed under tight weight balancing allowing them to be interconnected with a lightweight transmission medium and switch-less wide data bandwidth. In essence, the branched MTL allows constructing of a shared transmission medium for compute and sensor nodes placed arbitrarily on the drone body, following drone static and dynamics balancing requirements with no penalties on data transmission.

Figure 56:
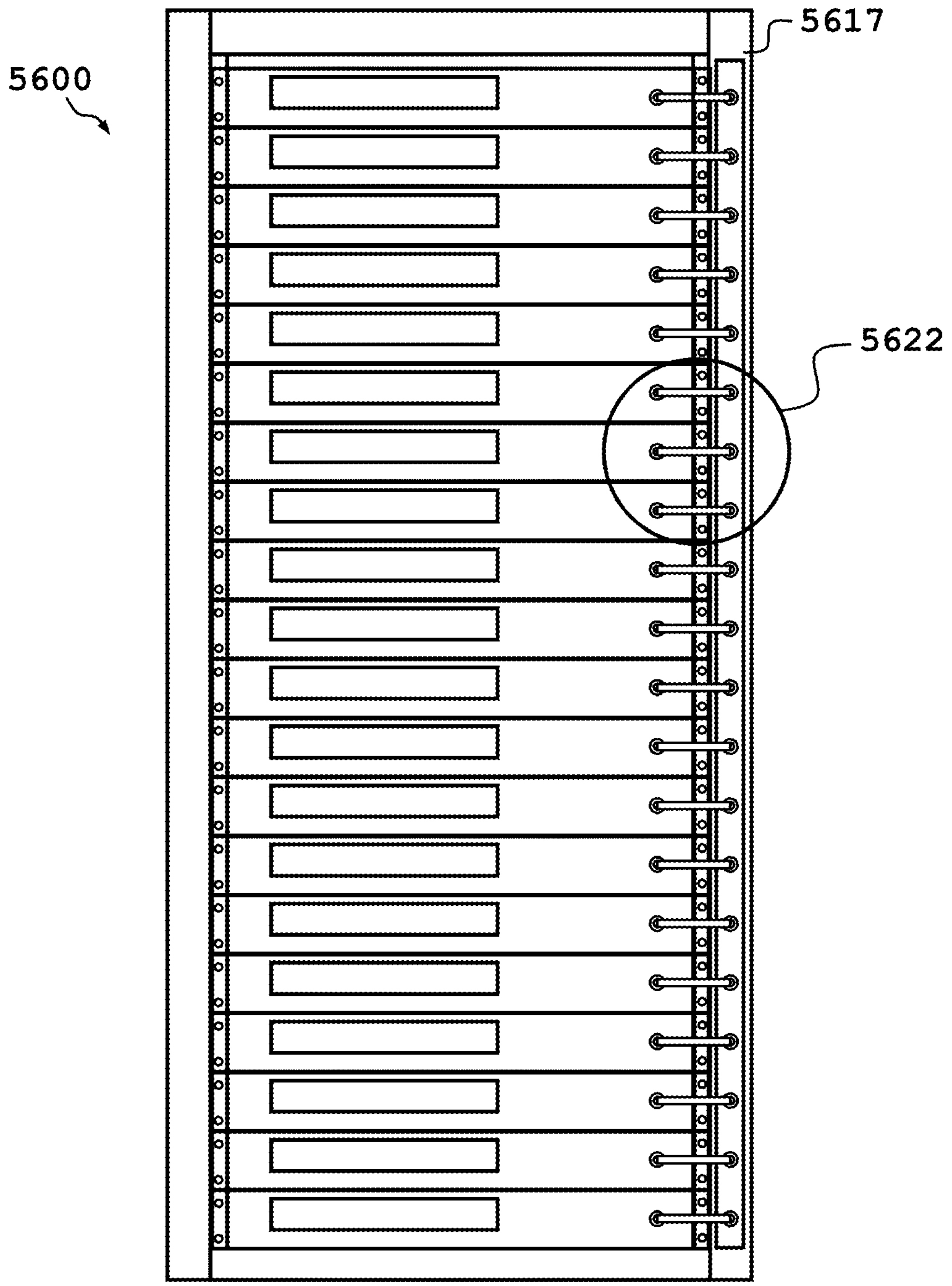
FIG. 56 is a diagram a multi-tap transmission line system adapted for a server-rack use-case.
Figure 57:
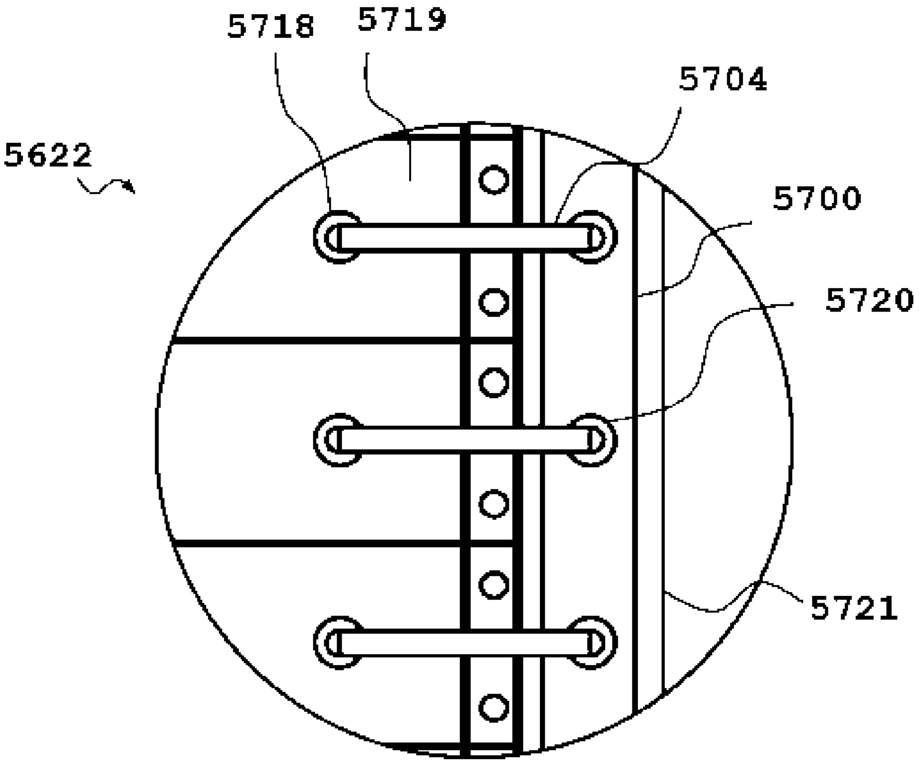
FIG. 57 is a diagram of the multi-tap transmission line detailing the connections 5622 of FIG. 56.

Turning now to FIG. 56, which provides a schematic representation 5600 of a multi-tap transmission line system adapted for a server-rack use-case. Reference number 5617 shows a server rack according to an example embodiment. FIG. 57 is a schematic representation 5700 of the multi-tap transmission line detailing the connections 5622 of FIG. 56.

The multi-tap transmission line of FIGS. 56 and 57 allows the servers in a server rack to be interconnected without the use of data switches or cables that can cause cable management issues.

As shown in FIGS. 56 and 57, the system 5600 includes a multi-tap transmission line 5700 that is coupled to a plurality of tap lines 5704. The tap lines 5704 are coupled to the transmission line 5700 at a reinforced attachment point 5720. The tap lines 5704 are connected, on the other end, to a RF connector 5718 on a faceplate of a server 5719, where the servers 5719 are the tap devices.

In this embodiment, the multi-tap transmission line is implemented as a flex printed circuited board, attached to the rack frame 5617, at an upright member 5721 of the rack frame 5617. In some embodiments, the multi-tap transmission line is constructed in shorter lengths of rigid PCB or installed horizontally in the rack among the servers.

As such, every server 5719 can broadcast its data to all other servers concurrently over the shared, interference free transmission medium 5700. Each tap provides an extra wide band access to the MTL 5700, for fast and easy transmission of data across the line.

Figure 58:
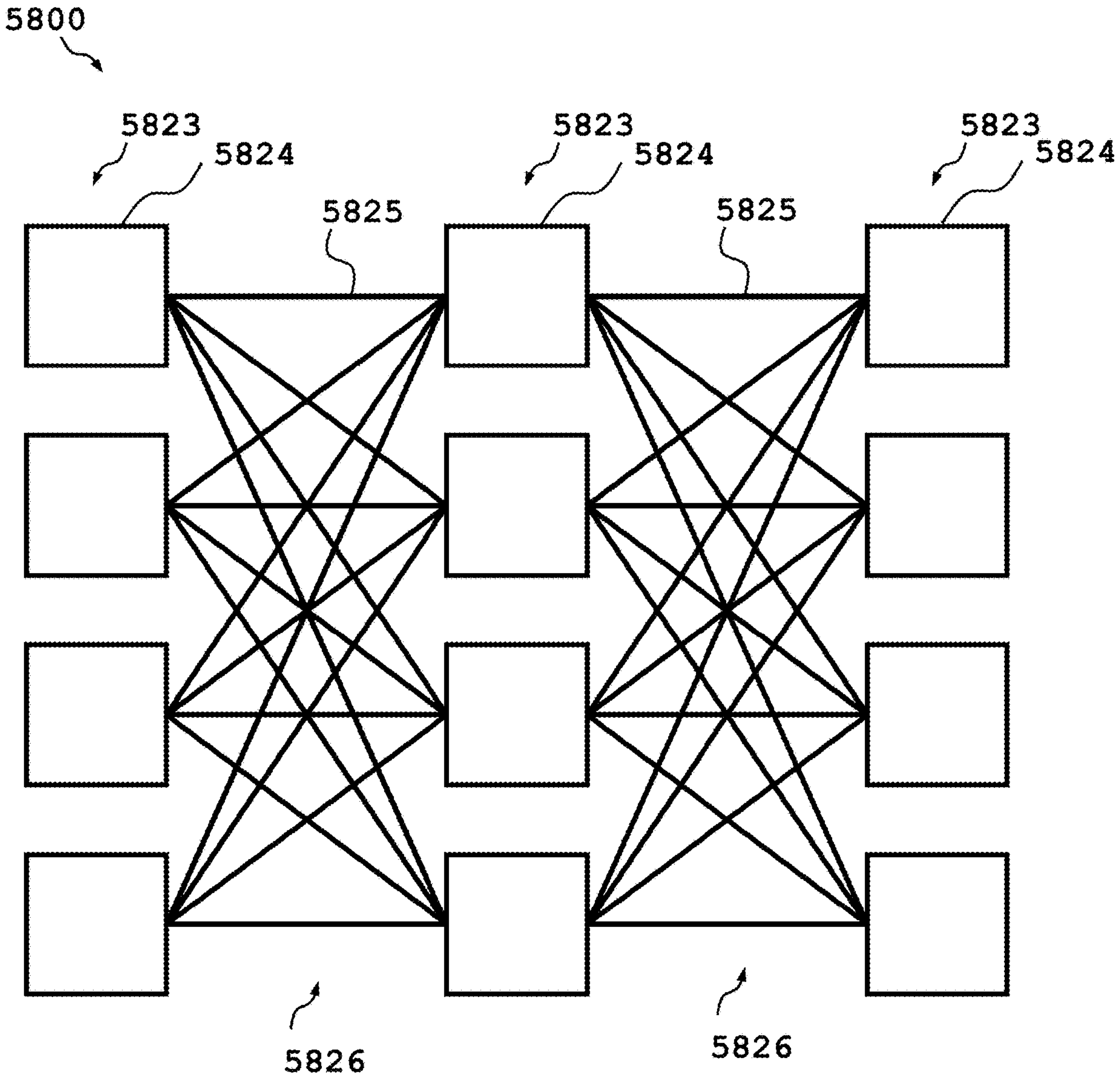
FIG. 58 is a diagram of a simplified three layers AI network.

FIG. 58 is a schematic representation 5800 of a simplified three-layered AI network. Reference number 5823 shows a layer of compute nodes 5824. Each compute node 5824 is shown with integrated tap devices 5911 in FIG. 59. Reference number 5825 shows a data link coupling the compute nodes 5824 of adjacent layers 5823. Reference number 5826 indicates a mesh network between compute nodes 5824 organized in compute nodes layers 5823.

Figure 59:
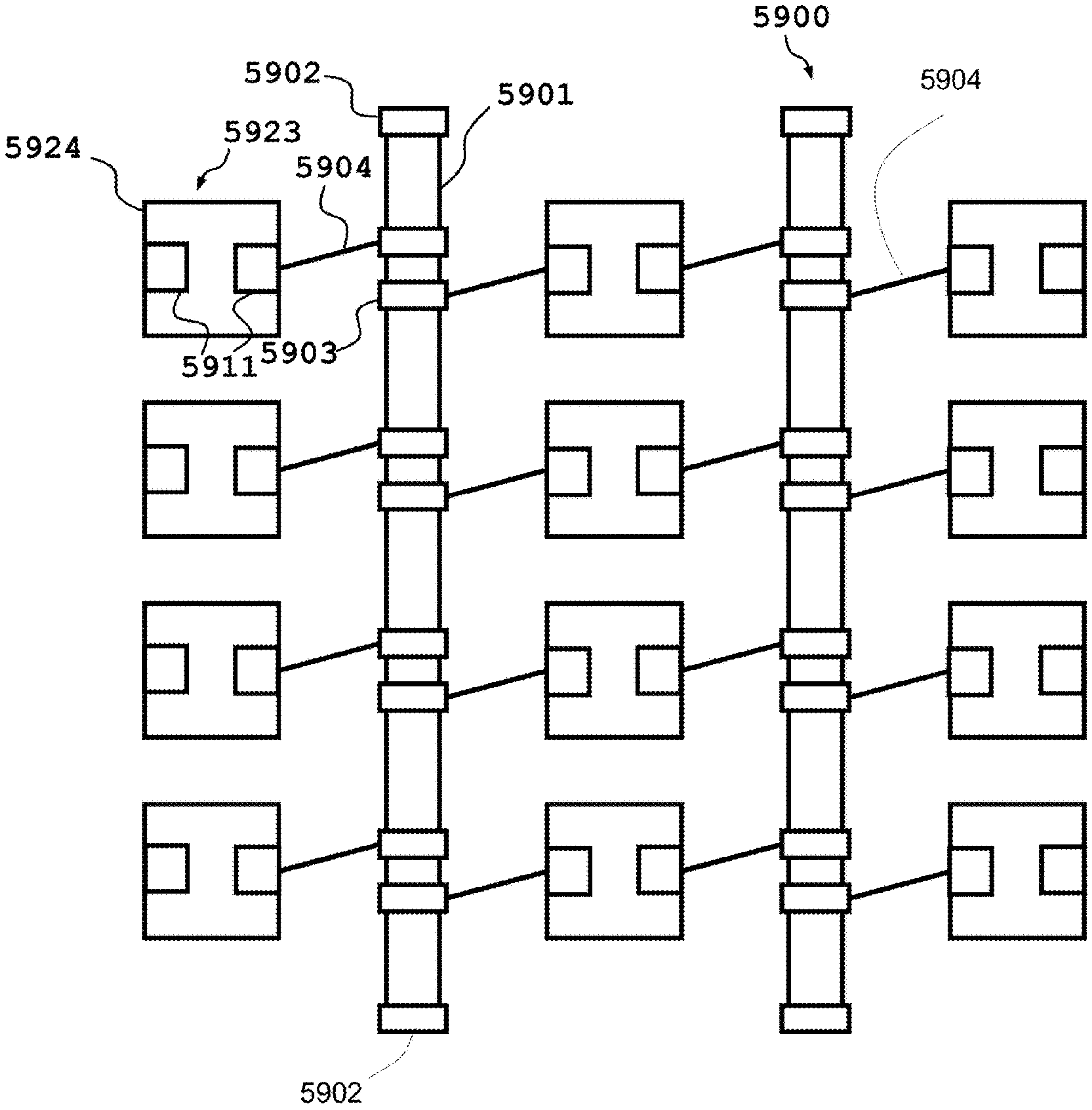
FIG. 59 is a diagram of the AI network in FIG. 58 implemented with a multi-tap transmission line.

FIG. 59 is a representation 5900 of the AI network in FIG. 58 implemented with a multi-tap transmission lines 5901. As shown in FIG. 59, three layers 5923, analogous to layers 5823 of FIG. 58, of compute nodes 5924, analogous to compute nodes 5824, are connected via two transmission lines 5901, with the first transmission line 5901 provided between the first two layers 5923, and the second transmission line 5901 provided between the second and the third layers 5923.

Each transmission line 5901 is terminated at each end with termination points 5902. Each transmission line 5901 has multiple tap ports 5903, and a corresponding tap line 5904 connects a compute node 5924 to the transmission line 5901 at the corresponding tap port 5903. In this illustrated embodiment, each compute node 5924 has two integrated tap devices 5911. In some other examples, a different number of integrated tap devices may be provided in each compute node.

In the illustrated embodiment, each multi-tap transmission line 5901 has a corresponding characteristic impedance value (Zc), and each tap port has a corresponding tap impedance value (Zo). In at least one embodiment, the characteristic impedance value Zc is lower than, and in some cases, substantially lower, than each tap impedance value Zo. The illustrated MTL system 5900 solves the communication between the successive computing layers 5923 of machine learning neural networks with efficiency by using RF data broadcasting on different radio frequency channels. Each connected compute node 5924 can share its data instantly directly, with every connected node 5924 over the multi-tap transmission line 5901 operated as a broadband transmission medium.

In this embodiment, the MTL can be implemented in a rigid printed circuited board (PCB) prevalent in data server motherboard design or as a discrete flexible printed circuits board where needed to supplement rigid existing PCB constructions. In some other cases, the illustrated MTL can be implemented in chip silicon substrates, chiplets or interposers, among other implementations.

While the invention has been illustrated and described with reference to preferred embodiments thereof, it will be recognized by those skilled in the art that various changes in form and detail may be made therein without departing from the spirit and scope of the invention as defined by the appended claims. While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

Items

1. In one item, a broadband radiofrequency transmission line using waveguides and taps to connect a plurality of radiofrequency terminals and create data networks is disclosed herein. This transmission line includes a left termination, a right termination, and a plurality of tap circuits. Each tap circuit comprises a left port; a right port; a tap port; a left transmission line; a right transmission line; a left resistive element; a right resistive element; and a tap resistive element. In the transmission line, the left and right resistive element are substantially characterized by their respective resistances of substantially same value Rs, and the tap resistive element is substantially characterized by its resistance of Rt value. In the transmission line, the left and right transmission lines have their respective characteristic impedance of substantially same value Zc. The left transmission line is connected between the left port and the left resistive element, the left resistive element is connected between the left transmission line and the right resistive element, the right resistive element is connected between the left resistive element and the right transmission line, the right transmission line is connected between the right resistive element and the right port, and the tap resistive element is connected with one end on the common connection between respective left and right resistive elements and with the other end on the tap port. In the transmission line, the tap port connects to an external radiofrequency terminal of impedance Zo value as measured at the said tap port. The left and right terminations are constructed as resistive elements and are substantially characterized by their resistance of Zc value. The plurality of tap circuits are concatenated such way the first tap circuit has its left port connected to the left termination, the last tap circuit has its right port connected to the right termination and all other right ports of said tap circuits are connected each to one and only one left port of said tap circuits.
2. In another item, the impedance of the transmission lines and the resistive elements of its tap circuits are optimized for power transfer.

3. In another item, the terminations, the resistive elements and transmission lines are substantially constructed as planar waveguide.
4. In another item, the terminations, the left and right resistive elements and the transmission lines are substantially constructed as a coaxial waveguide.
5. In one item, a multi-tap transmission line is provided.
6. In another item, the multi-tap transmission line comprises: a first end and at least one second end; the transmission line having a corresponding characteristic impedance value (Zc); the first end with a corresponding first end impedance, the first end impedance being same as the characteristic impedance; the at least one second end with a corresponding at least one second end impedance, the corresponding at least one second end impedance being same as the characteristic impedance; at least two tap circuits connected to the transmission line; wherein each tap circuit comprises a tap port, wherein each tap port has a corresponding tap impedance value (Zo); and wherein the characteristic impedance value Zc is lower than each tap impedance value Zo.
7. In another item, the multi-tap transmission line further comprises, for each tap circuit: a first resistive element corresponding to a first port of the tap circuit, and having a corresponding first resistance value; and a second resistive element corresponding to a second port of the tap circuit, and having a second resistance value, the first and the second resistive values being substantially equal to a series resistance value (Rs); a corresponding tap device connected to the corresponding tap port; and a tap resistive element corresponding to the tap port, the tap resistive element having a tap resistance value (Rt); wherein the first resistance element, the second resistive element and the tap resistive element are connected at a connection point in a T-configuration.
8. In another item, the tap devices are selected from the group consisting of an output RF transmitter, an input RF receiver, a combined input and output RF transceiver, an RC transceiver, a plurality of RF transceivers, a test port of a vector network analyzer VNA, a test port of a time domain reflectometry TDR analyzer, a tap of another multi-tap transmission line, any RF device, and a termination.
9. In another item, the first end impedance and second end impedance remain matched to the transmission line as the tap devices are connected to the multi-tap transmission line.
10. In another item, the transmission line comprises a splitter configuration, and the at least one second end comprises two second ends.
11. In another item, the multi-tap transmission line is implemented as a rigid printed circuited board.
12. In another item, the multi-tap transmission line is implemented as a discrete flexible printed circuits board.
13. In another item, the multi-tap transmission line is constructed as a flexible printed circuit board having a self-adhesive tape.
14. In another item, the multi-tap transmission line is constructed in a branched configuration.
15. In another item, the multi-tap transmission line is operated with at least one of a tap device being disconnected, shorted, or damaged. In such embodiments, the multi-tap transmission line operates with the remaining tap devices.
16. In another item, the first and second resistive elements have a corresponding series resistance value of approximately 0 ohms.
17. In one item, a method of optimizing the multi-tap transmission line is provided.
18. In another item, method comprises: for each corresponding tap impedance value (Zo), and for a total number of tap ports in the transmission line: determining an optimal characteristic impedance value (Zc); based on the optimal characteristic impedance value (Zc), determining the series resistance value (Rs) and the tap resistance value (Rt) value such that a loss between a first tap circuit and a last tap circuit is minimized.
19. In another item, determining the optimal characteristic impedance value (Zc) comprises: selecting a candidate impedance value, the candidate impedance value being selected from a range of values between 0 and an end impedance value; for each candidate impedance value: determining a worst-case insertion loss between the first tap circuit and the last tap circuit based on the candidate impedance value and a tap impedance value corresponding to a tap port, the worst-case insertion loss being determined based on determining a longitudinal insertion loss and a transverse insertion loss according to:

$$TTLN\,[\text{dB}] = TIL(1) + LIL(2) + LIL(3) + \ldots + LIL(j) + \ldots\ LIL(N-1) + TIL(N);$$

wherein LIL is a longitudinal insertion loss value determined according to:

LIL (j)=20 LOG 10(1-Zc/2Zo(j)), where j is a range of values indicative of tap index, ranging from 2 to (N−1), N representing the total number of tap ports; wherein TIL is a transverse insertion loss value determined according to:

TIL (j)=10 LOG 10(Zc/4Zo(j)), wherein j is 1 or N,—determining the optimal characteristic impedance value (Zc) based on the candidate impedance value which minimizes the worst-case insertion loss.

20. In another item, the series resistance value (Rs) is determined according to:

$$R_S(j) = \frac{Z_c^2}{4Z_O(j) - Z_C};$$

wherein Zoo) is a tap impedance value of a tap port j; j is a range of values indicative of tap index, ranging from 1 to N, N representing the total number of tap ports; and Zc is the optimal characteristic impedance value.

21. In another item, the tap resistance value (Rt) is determined according to: $R_t$(j)=

$$\frac{4(Z_{O(j)})^2 - 3Z_C Z_{O(j)}}{4Z_O(j) - Z_C};$$

wherein Zo(j) is a tap impedance value of a tap port j; j is a range of values indicative of tap index, ranging from 1 to N, N representing the total number of tap ports; and Zc is the optimal characteristic impedance value.

22. In another item, the method further comprises choosing an alternative characteristic impedance value (Zc) from a range between −30% to +30% of the optimal characteristic impedance value.

23. In another item, determining the optimal characteristic impedance value (Zc) is done by graphical analysis by plotting, as a function of candidate impedance value, a loss function according to:

$$TTLN(Zc) = TIL(1) + LIL(2) + LIL(3) + \ldots + LIL(j) + \ldots\ LIL(N-1) + TIL(N);$$

and selecting the optimal characteristic impedance value based on the candidate impedance value corresponding to a minimum value of the loss function.

24. In one item, a multi-tap transmission line for use in an automotive vehicle is provided.

25. In another item, the multi-tap transmission line comprises: a first end and at least one second end; the transmission line having a corresponding characteristic impedance value (Zc); the first end with a corresponding first end impedance, the first end impedance being same as the characteristic impedance; the at least one second end with a corresponding at least one second end impedance, the corresponding at least one second end impedance being same as the characteristic impedance; at least two tap circuits connected to the transmission line; wherein each tap circuit comprises a tap port, wherein each tap port has a corresponding tap impedance value (Zo); and wherein the characteristic impedance value Zc is lower than each tap impedance value Zo.

26. In another item, the multi-tap transmission line further comprises, for each tap circuit: a first resistive element corresponding to a first port of the tap circuit, and having a corresponding first resistance value; and a second resistive element corresponding to a second port of the tap circuit, and having a second resistance value, the first and the second resistive values being substantially equal to a series resistance value (Rs); a corresponding tap device connected to the corresponding tap port; and a tap resistive element corresponding to the tap port, the tap resistive element having a tap resistance value (Rt); wherein the first resistance element, the second resistive element and the tap resistive element are connected at a connection point in a T-configuration.

27. In another item, the multi-tap transmission line further comprises at least 24 tap devices.

28. In another item, the tap devices are selected from the group consisting of: vehicle sensors, an Engine Control Unit (ECU), a gateway, and an AI node.

29. In another item, the multi-tap transmission line is constructed as a flex printed circuit board having a self-adhesive tape.

30. In another item, the multi-tap transmission line further comprises a secondary multi-tap transmission line to provide redundancy.

31. In another item, the tap device switches from the multi-tap transmission line to the secondary multi-tap transmission line.

32. In one item, a multi-tap transmission line for use in a remotely operated vehicle (ROV) is provided.

33. In another item, the tap devices are selected from the group consisting of: ROV sensors, an ROV Engine Control Unit (ECU), am ROV gateway, and an ROV AI node.

34. In another item, the multi-tap transmission line is constructed in a branched configuration.

35. In another item, the multi-tap transmission line comprises a resistive power splitter to branch the multi-tap transmission line into a plurality of lines.

36. In one item, a multi-tap transmission line for use in a server rack is provided.

37. In another item, the tap devices are servers.

38. In one item, a multi-tap transmission line for use with a plurality of processor chips in an inter-chip configuration is provided.

39. In another item, the multi-tap transmission line is external to the plurality of processor chips and coupled to nodes within the plurality of processor chips.

40. In another item, the multi-tap transmission line is implemented as a rigid printed circuited board.

41. In another item, the multi-tap transmission line is implemented as a discrete flexible printed circuits board.

42. In another item, the multi-tap transmission line is implemented in at least one of: chip silicon substrates, chiplets and interposers.

The invention claimed is:

1. A multi-tap transmission line comprising:

a first end and at least one second end;

the transmission line having a corresponding characteristic impedance value (Zc);

the first end with a corresponding first end impedance, the first end impedance being same as the characteristic impedance;

the at least one second end with a corresponding at least one second end impedance, the corresponding at least one second end impedance being same as the characteristic impedance;

at least two tap circuits connected to the transmission line, wherein each tap circuit comprises a tap port, and wherein each tap port has a corresponding tap impedance value (Zo), wherein the characteristic impedance value Zc is lower than each tap impedance value Zo, and wherein, each tap circuit comprises:

a first resistive element corresponding to a first port of the tap circuit, and having a corresponding first resistance value;

a second resistive element corresponding to a second port of the tap circuit, and having a second resistance value;

the first and the second resistive values being substantially equal to a series resistance value (Rs), a corresponding tap device connected to the corresponding tap port;

a tap resistive element corresponding to the tap port, the tap resistive element having a tap resistance value (Rt), wherein the first resistance element, the second resistive element and the tap resistive element are connected at a connection point in a T-configuration, and wherein the characteristic impedance value (Zc) minimizes a worst-case insertion loss (TTLN) between a first tap circuit and a last tap circuit of the at least two tap circuits, the worst-case insertion loss being determined based on a longitudinal insertion loss (LIL) and a transverse insertion loss (TIL) according to:

$$TTLN\,[\mathrm{dB}] = TIL(1) + LIL(2) + LIL(3) + \ldots + LIL(j) + \ldots\ LIL(N-1) + TIL(N);$$

wherein LIL is a longitudinal insertion loss value determined according to:

$$LIL\,(j) = 20\mathrm{LOG10}(1 - Zc/2Zo(j)),$$

wherein Zo(j) is a tap impedance value of a tap port j, j is a range of values indicative of tap index ranging from 2 to (N−1), N representing a total number of tap ports;

wherein TIL is a transverse insertion loss value determined according to:

$$TIL\,(j) = 10\mathrm{LOG10}(Zc/4Zo(j)),$$

wherein Zo(j) is a tap impedance value of a tap port j, and j is 1 or N.

2. The multi-tap transmission line of claim 1, wherein the tap devices are selected from the group consisting of an output radiofrequency (RF) transmitter, an input RF receiver, a combined input and output RF transceiver, a radio control (RC) transceiver, a plurality of RF transceivers, a test port of a vector network analyzer VNA, a test port of a time domain reflectometry TDR analyzer, a tap of another multi-tap transmission line, any RF device, and a termination.

3. The multi-tap transmission line of claim 1, wherein the first end impedance and second end impedance remain matched to the transmission line as the tap devices are connected to the multi-tap transmission line.

4. The multi-tap transmission line of claim 1, wherein the transmission line comprises a splitter configuration, and the at least one second end comprises two second ends.

5. The multi-tap transmission line of claim 1, wherein the multi-tap transmission line is implemented as a rigid printed circuited board.

6. The multi-tap transmission line of claim 1, wherein the multi-tap transmission line is implemented as a flexible printed circuits board.

7. The multi-tap transmission line of claim 1, wherein the first and second resistive elements have a corresponding series resistance value of approximately 0 ohms.

8. A method of optimizing a multi-tap transmission line, the multi-tap transmission line comprising:

a first end and at least one second end;

the transmission line having a corresponding characteristic impedance value (Zc);

the first end with a corresponding first end impedance, the first end impedance being same as the characteristic impedance;

the at least one second end with a corresponding at least one second end impedance, the corresponding at least one second end impedance being same as the characteristic impedance;

at least two tap circuits connected to the transmission line, wherein each tap circuit comprises a tap port, and wherein each tap port has a corresponding tap impedance value (Zo);

for each tap circuit:

a first resistive element corresponding to a first port of the tap circuit, and having a corresponding first resistance value; and a second resistive element corresponding to a second port of the tap circuit, and having a second resistance value, the first and the second resistive values being substantially equal to a series resistance value (Rs);

a corresponding tap device connected to the corresponding tap port; and a tap resistive element corresponding to the tap port, the tap resistive element having a tap resistance value (Rt), the first resistance element, the second resistive element and the tap resistive element connected at a connection point in a T-configuration;

wherein the method comprises, for each corresponding tap impedance value (Zo), and for a total number of tap ports in the transmission line:

determining an optimal characteristic impedance value (Zc); and based on the optimal characteristic impedance value (Zc), determining the series resistance value (Rs) and the tap resistance value (Rt) value such that a loss between a first tap circuit and a last tap circuit is minimized, wherein determining the optimal characteristic impedance value (Zc) comprises:

selecting a candidate impedance value, the candidate impedance value being selected from a range of values between 0 and an end impedance value;

for each candidate impedance value:

determining a worst-case insertion loss between the first tap circuit and the last tap circuit based on the candidate impedance value and a tap impedance value corresponding to a tap port, the worst-case insertion loss (TTLN) being determined based on determining a longitudinal insertion loss (LIL) and a transverse insertion loss (TIL) according to:

$$TTLN[\mathrm{dB}] = TIL(1) + LIL(2) + LIL(3) + \ldots + LIL(j) + \ldots\ LIL(N-1) + TIL(N);$$

wherein LIL is a longitudinal insertion loss value determined according to:

$$LIL(j) = 20\mathrm{LOG10}(1 - Zc/2Zo(j)),$$

wherein j is a range of values indicative of tap index, ranging from 2 to (N−1), N representing the total number of tap ports;

wherein TIL is a transverse insertion loss value determined according to:

$$TIL(j) = 10\mathrm{LOG10}(Zc/4Zo(j)),$$

wherein j is 1 or N, and determining the optimal characteristic impedance value (Zc) based on the candidate impedance value which minimizes the worst-case insertion loss.

9. The method of claim 8, wherein the series resistance value (Rs) is determined according to:

$$R_S(j) = \frac{Z_c^2}{4Z_O(j) - Z_C}$$

wherein Zo(j) is a tap impedance value of a tap port j; j is a range of values indicative of tap index, ranging from 1 to N, N representing the total number of tap ports; and Zc is the optimal characteristic impedance value.

10. The method of claim 9, wherein the tap resistance value (Rt) is determined according to:

$$R_t(j) = \frac{4(Z_{O(j)})^2 - 3Z_C Z_{O(j)}}{4Z_O(j) - Z_C}$$

wherein Zo(j) is a tap impedance value of a tap port j; j is a range of values indicative of tap index, ranging from 1 to N, N representing the total number of tap ports; and Zc is the optimal characteristic impedance value.

11. The method of claim 8, further comprising choosing an alternative characteristic impedance value (Zc) from a range between-30% to +30% of the optimal characteristic impedance value.

12. The method of claim 8, wherein the optimal characteristic impedance value (Zc) is determined by graphical analysis by plotting, as a function of candidate impedance value, a loss function according to:

$$TTLN\,(Zc) = TIL(1) + LIL(2) + LIL(3) + \ldots + LIL(j) + \ldots\ LIL(N-1) + TIL(N);$$

and selecting the optimal characteristic impedance value based on the candidate impedance value corresponding to a minimum value of the loss function, wherein TTLN defines a worst-case insertion loss, LIL defines a longitudinal insertion loss and TIL defines a transverse insertion loss.

13. The method of claim 8, wherein the first and second resistive elements have a corresponding series resistance value of approximately 0 ohms.

14. A multi-tap transmission line for use in a vehicle, the multi-tap transmission line comprising:

a first end and at least one second end;

the transmission line having a corresponding characteristic impedance value (Zc);

the first end with a corresponding first end impedance, the first end impedance being same as the characteristic impedance;

the at least one second end with a corresponding at least one second end impedance, the corresponding at least one second end impedance being same as the characteristic impedance;

at least two tap circuits connected to the transmission line, wherein each tap circuit comprises a tap port, and wherein each tap port has a corresponding tap impedance value (Zo), and wherein the characteristic impedance value Zc is lower than the tap impedance value Zo, and wherein each tap circuit comprises:

a first resistive element corresponding to a first port of the tap circuit, and having a corresponding first resistance value;

a second resistive element corresponding to a second port of the tap circuit, and having a second resistance value;

the first and the second resistive values being substantially equal to a series resistance value (Rs), a corresponding tap device connected to the corresponding tap port;

a tap resistive element corresponding to the tap port, the tap resistive element having a tap resistance value (Rt), wherein the first resistance element, the second resistive element and the tap resistive element are connected at a connection point in a T-configuration, and wherein the characteristic impedance value (Zc) minimizes a worst-case insertion loss (TTLN) between a first tap circuit and a last tap circuit of the at least two tap circuits, the worst-case insertion loss being determined based on a longitudinal insertion loss (LIL) and a transverse insertion loss (TIL) according to:

$$TTLN[\text{dB}] = TIL(1) + LIL(2) + LIL(3) + \ldots + LIL(j) + \ldots\ LIL(N-1) + TIL(N);$$

wherein LIL is a longitudinal insertion loss value determined according to:

$$LIL(j) = 20\text{LOG}10\big(1 - Zc/2Zo(j)\big),$$

wherein Zo(j) is a tap impedance value of a tap port i, i is a range of values indicative of tap index ranging from 2 to (N−1), N representing a total number of tap ports;

wherein TIL is a transverse insertion loss value determined according to:

$$TIL(j) = 10\text{LOG}10\big(Zc/4Zo(j)\big),$$

wherein Zo(j) is a tap impedance value of a tap port i, and i is 1 or N.

15. The multi-tap transmission line of claim 14, wherein the vehicle is an automotive vehicle comprising at least 24 tap devices.

16. The multi-tap transmission line of claim 15, wherein the tap devices are selected from the group consisting of: vehicle sensors, an Engine Control Unit (ECU), a gateway, and an AI node.

17. The multi-tap transmission line of claim 15, wherein the multi-tap transmission line is constructed as a flex printed circuit board having a self-adhesive tape.

18. The multi-tap transmission line of claim 14, further comprising a secondary multi-tap transmission line to provide redundancy.

19. The multi-tap transmission line of claim 18, wherein one or more tap devices switch from the multi-tap transmission line to the secondary multi-tap transmission line during a failure event.

20. The multi-tap transmission line of claim 14, wherein the vehicle is a remotely operated vehicle (ROV) and wherein the tap devices are selected from the group consisting of: ROV sensors, an ROV Engine Control Unit (ECU), am ROV gateway, and an ROV AI node.

21. The multi-tap transmission line of claim 20, wherein the multi-tap transmission line is constructed in a branched configuration.

22. The multi-tap transmission line of claim 21, further comprising a resistive power splitter to branch the multi-tap transmission line into a plurality of transmission lines.

23. A multi-tap transmission line for use with a plurality of processor chips in an interchip configuration, wherein the multi-tap transmission line is external to the plurality of processor chips and coupled to nodes within the plurality of processor chips, the multi-tap transmission line comprising:

a first end and at least one second end;

the transmission line having a corresponding characteristic impedance value (Zc);

the first end with a corresponding first end impedance, the first end impedance being same as the characteristic impedance;

the at least one second end with a corresponding at least one second end impedance, the corresponding at least one second end impedance being same as the characteristic impedance;

at least two tap circuits connected to the transmission line;

each tap circuit comprises a tap port, wherein each tap port has a corresponding tap impedance value (Zo), and wherein the characteristic impedance value Zc is lower than the tap impedance value Zo, wherein each tap circuit comprises:

a first resistive element corresponding to a first port of the tap circuit, and having a corresponding first resistance value;

a second resistive element corresponding to a second port of the tap circuit, and having a second resistance value;

the first and the second resistive values being substantially equal to a series resistance value (Rs), a corresponding tap device connected to the corresponding tap port;

a tap resistive element corresponding to the tap port, the tap resistive element having a tap resistance value (Rt), wherein the first resistance element, the second resistive element and the tap resistive element are connected at a connection point in a T-configuration, and wherein the characteristic impedance value (Zc) minimizes a worst-case insertion loss (TTLN) between a first tap circuit and a last tap circuit of the at least two tap circuits, the worst-case insertion loss being determined based on a longitudinal insertion loss (LIL) and a transverse insertion loss (TIL) according to:

$$TTLN[\text{dB}] = TIL(1) + LIL(2) + LIL(3) + \ldots + LIL(j) + \ldots\ LIL(N-1) + TIL(N);$$

wherein LIL is a longitudinal insertion loss value determined according to:

$$LIL(j) = 20\text{LOG}10(1 - Zc/2Zo(j)),$$

wherein Zo(j) is a tap impedance value of a tap port i, i is a range of values indicative of tap index ranging from 2 to (N−1), N representing a total number of tap ports;

wherein TIL is a transverse insertion loss value determined according to:

$$TIL(j) = 10\text{LOG}10(Zc/4Zo(j)),$$

wherein Zo(j) is a tap impedance value of a tap port i, and j is 1 or N.

24. The multi-tap transmission line of claim 23, wherein the multi-tap transmission line is implemented as a rigid printed circuited board.

25. The multi-tap transmission line of claim 23, wherein the multi-tap transmission line is implemented as a flexible printed circuits board.

26. The multi-tap transmission line of claim 23, wherein the multi-tap transmission line is implemented in at least one of: chip silicon substrates, chiplets and interposers.

* * * * *